US006782402B1

(12) United States Patent (10) Patent No.: US 6,782,402 B1
Hidaka et al. (45) Date of Patent: Aug. 24, 2004

(54) NETWORK MANAGEMENT SYSTEM, COMPUTER SYSTEM, COPY SERVER, FILE SERVER, NETWORK COPY FILE MANAGEMENT METHOD, AND COMPUTER READABLE MEDIUM

(75) Inventors: Takeo Hidaka, Tokyo (JP); Shinji Hirabayashi, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/563,816

(22) Filed: May 3, 2000

(30) Foreign Application Priority Data

| May 6, 1999 | (JP) | 11-126074 |
| May 6, 1999 | (JP) | 11-126075 |
| May 6, 1999 | (JP) | 11-126076 |

(51) Int. Cl.[7] .............................................. G06F 17/30
(52) U.S. Cl. ........................ 707/203; 707/500; 707/3; 709/217; 355/36; 358/1.15
(58) Field of Search ............................... 707/1–10, 503, 707/522, 413, 515, 505, 103 R, 500, 200–205; 709/217, 317, 247, 219; 345/502, 418, 659; 703/500, 503, 522, 4, 515, 505, 103 R; 355/36; 358/1.15

(56) References Cited

U.S. PATENT DOCUMENTS

| 4,907,188 A | * | 3/1990 | Suzuki et al. ................ 709/219 |
| 5,586,316 A | * | 12/1996 | Tanaka et al. .................. 707/4 |
| 5,826,035 A | * | 10/1998 | Hamada et al. ............. 709/247 |
| 6,356,283 B1 | * | 3/2002 | Guedalia .................... 345/760 |
| 2002/0004802 A1 | | 1/2002 | Shima |

FOREIGN PATENT DOCUMENTS

| EP | 0 651 296 A2 | 5/1995 |
| EP | 0 756 414 A2 | 1/1997 |
| JP | 3-85838 | 4/1991 |
| JP | 06103359 | 4/1994 | .......... G06F/15/62 |
| JP | 07-049805 | 2/1995 |
| JP | 10-173897 | 6/1998 |
| JP | 10-233860 | 9/1998 |
| JP | 10-320615 | 12/1998 |
| JP | 10-326288 | 12/1998 |
| JP | 11-96194 | 4/1999 |
| JP | 11-103367 | 4/1999 |
| JP | 11-120148 | 4/1999 |
| JP | 2957816 | 7/1999 | ............. G06T/1/00 |
| WO | WO 99/08438 A1 | 2/1999 |

OTHER PUBLICATIONS

Japanese Office Action issued on Apr. 11, 2003 (during examination of counterpart Japanese Application No. Hei. 11–126075).
Patent Abstract of Japanese Publication No. 07–049805.
Patent Abstract of Japanese Publication No. 10–320615.
Japanese Abstract No. 09200394, dated Jul. 31, 1997.
Japanese Abstract No. 10233880, dated Sep. 2, 1998.
Japanese Abstract No. 09284448, dated Oct. 31, 1997.
"Web Programming Secrets with HTML, CGI, and Perl", published in 1996.
Patent Abstracts of Japan, English–language Abstract for JP 11–103367.
Patent Abstracts of Japan, English–language Abstract for JP 10–326288.

* cited by examiner

*Primary Examiner*—Mohammad Ali
(74) *Attorney, Agent, or Firm*—Sughrue Mion, PLLC

(57) ABSTRACT

Image data gathered by a scanner portion is stored into an image file, and stored into a hard disc. A client terminal requests a copy server to send management information of the image files in the hard disc. A control portion that receives the file management information request reads out file management information on the image files in a requested directory, from the hard disc, and sends it to a client terminal. An operator selects an image file on the basis of the management information, and the copy server is requested to down load a corresponding image file.

16 Claims, 50 Drawing Sheets

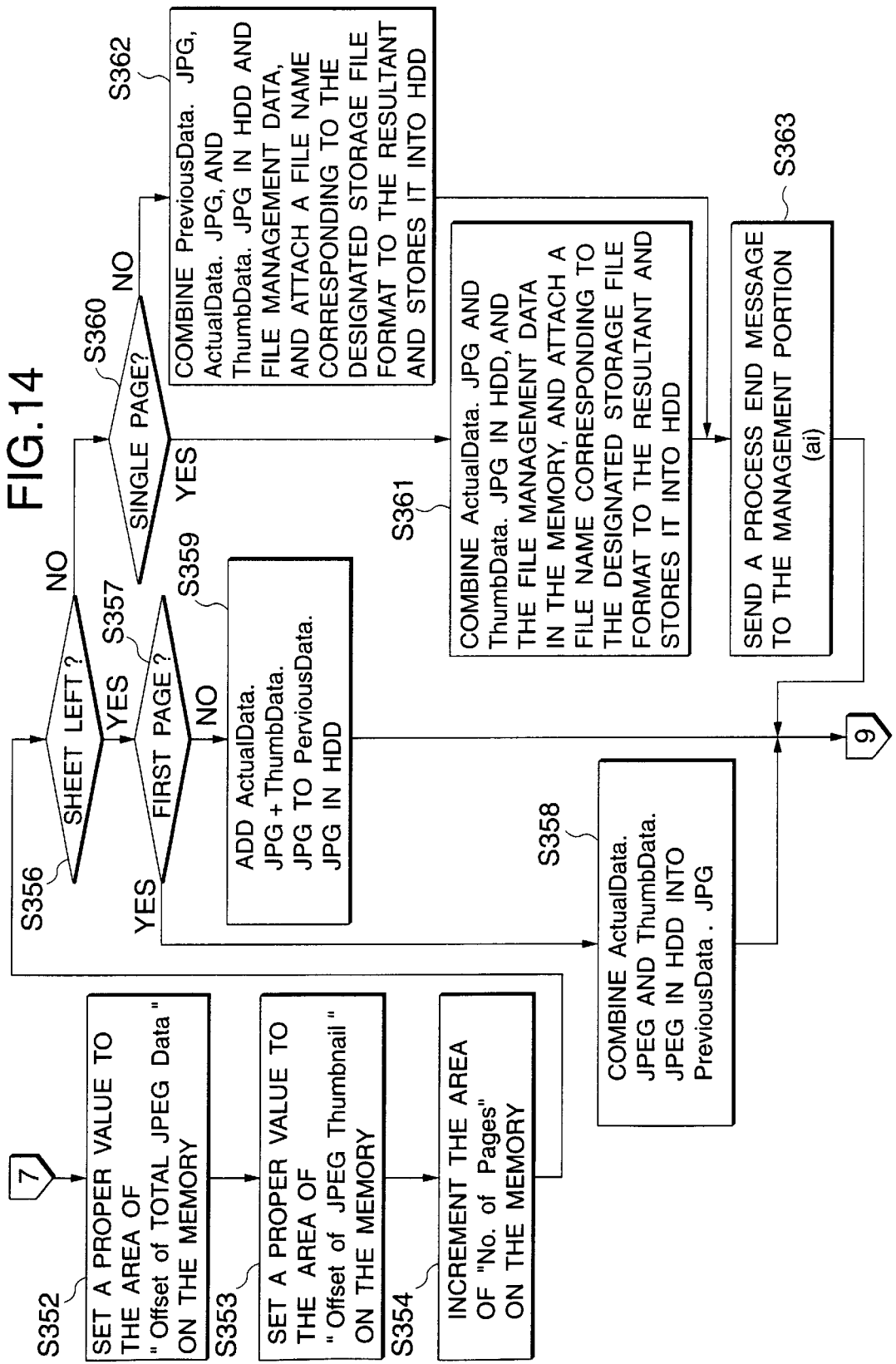

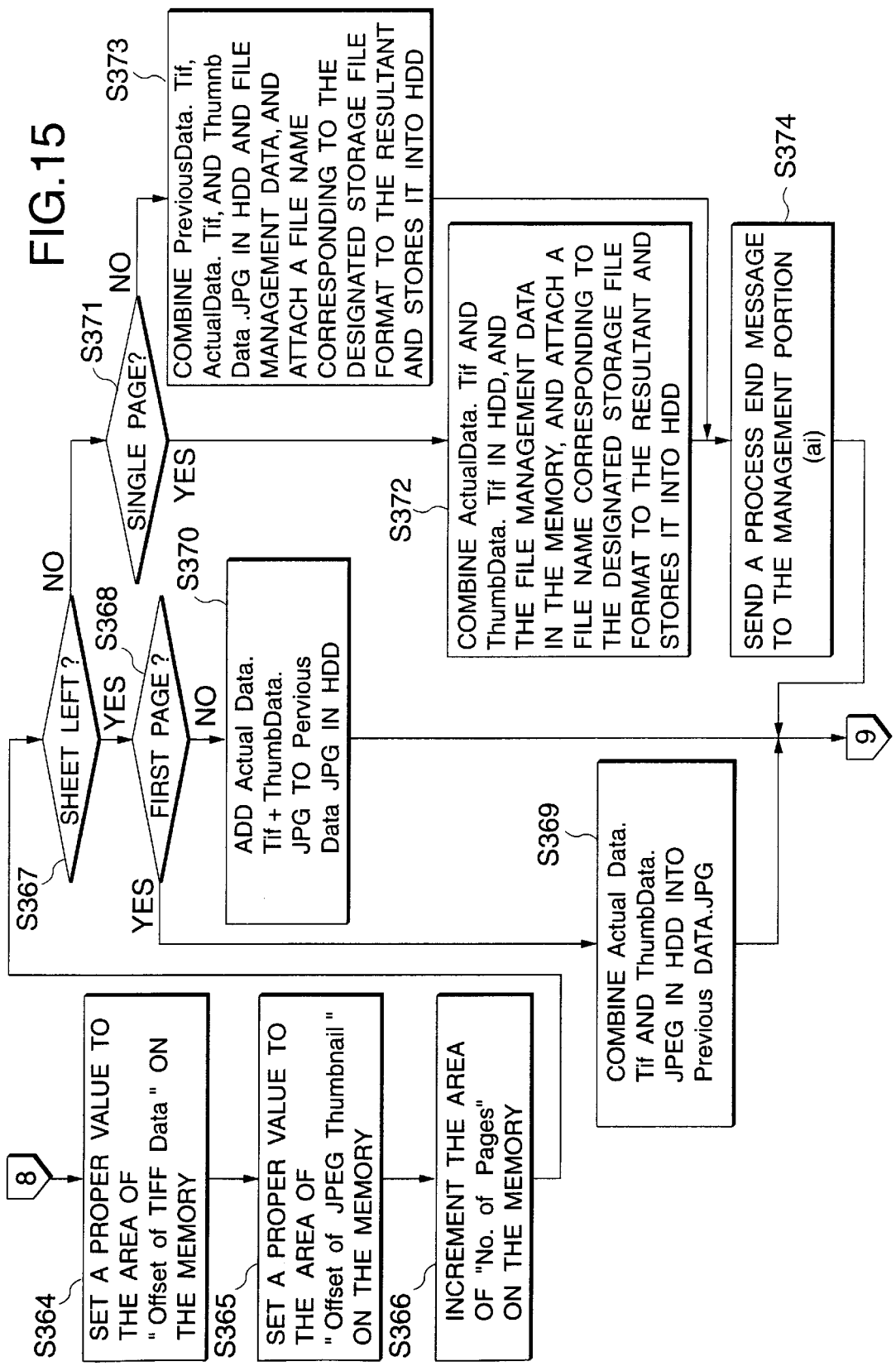

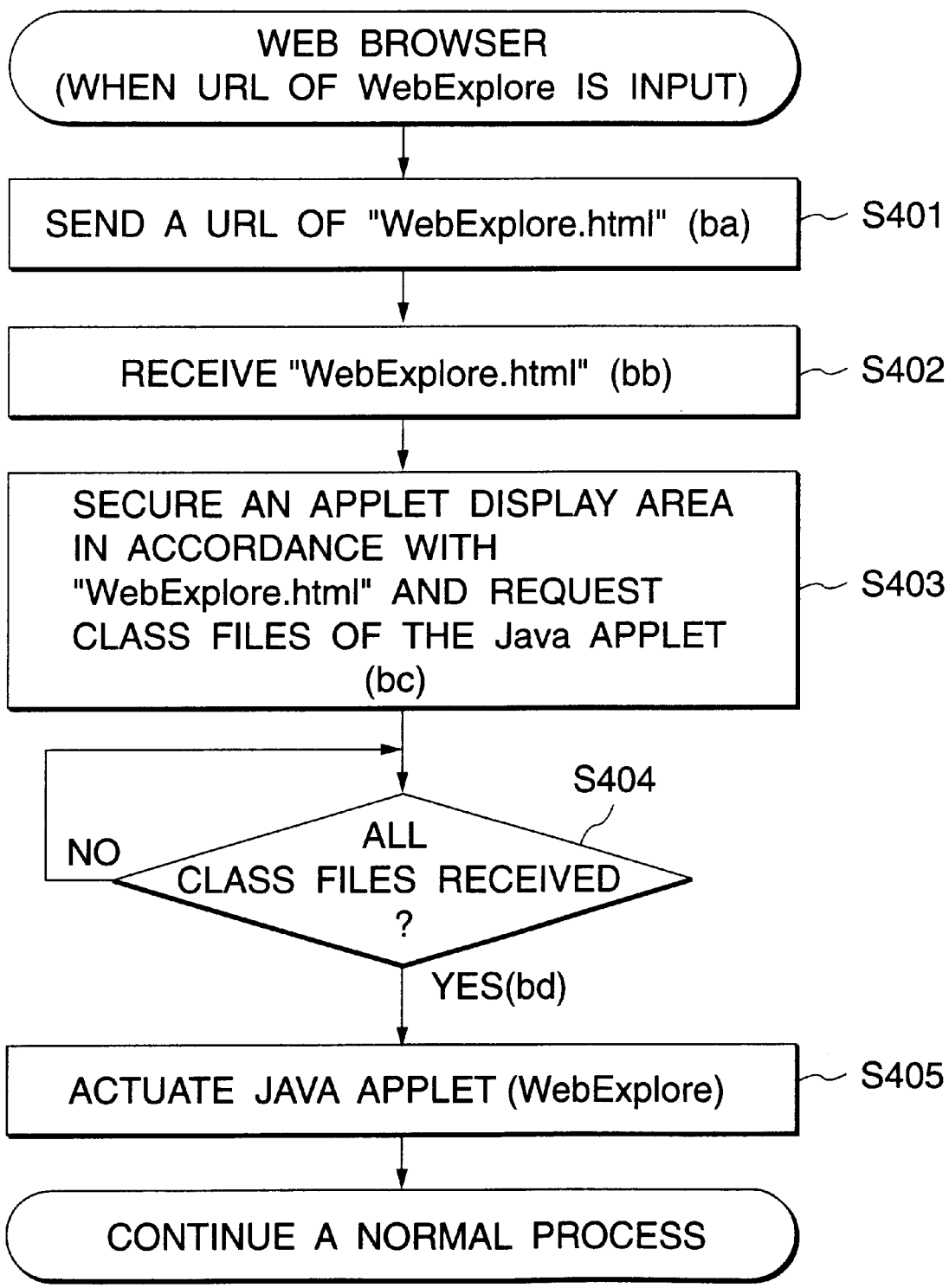

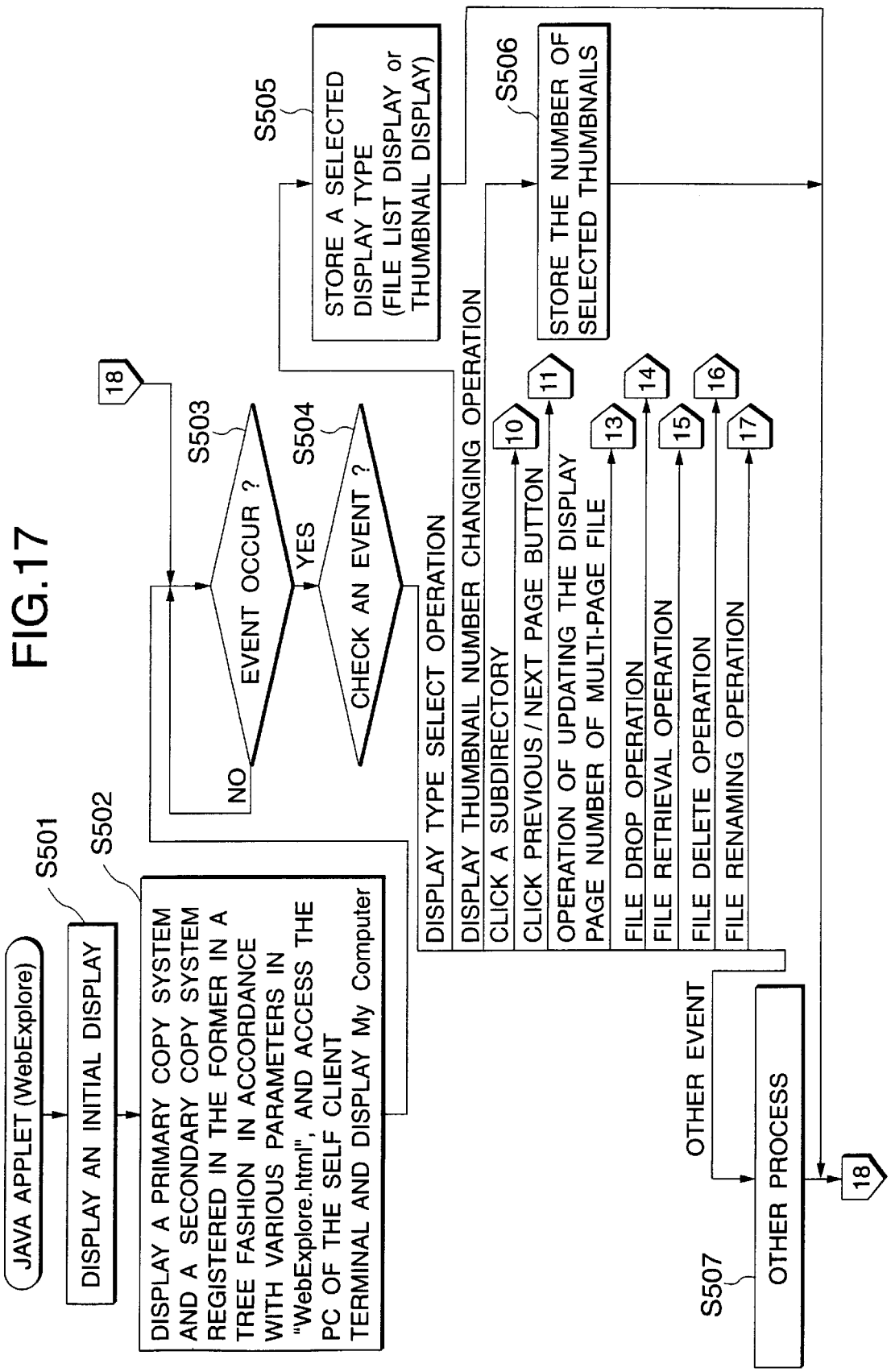

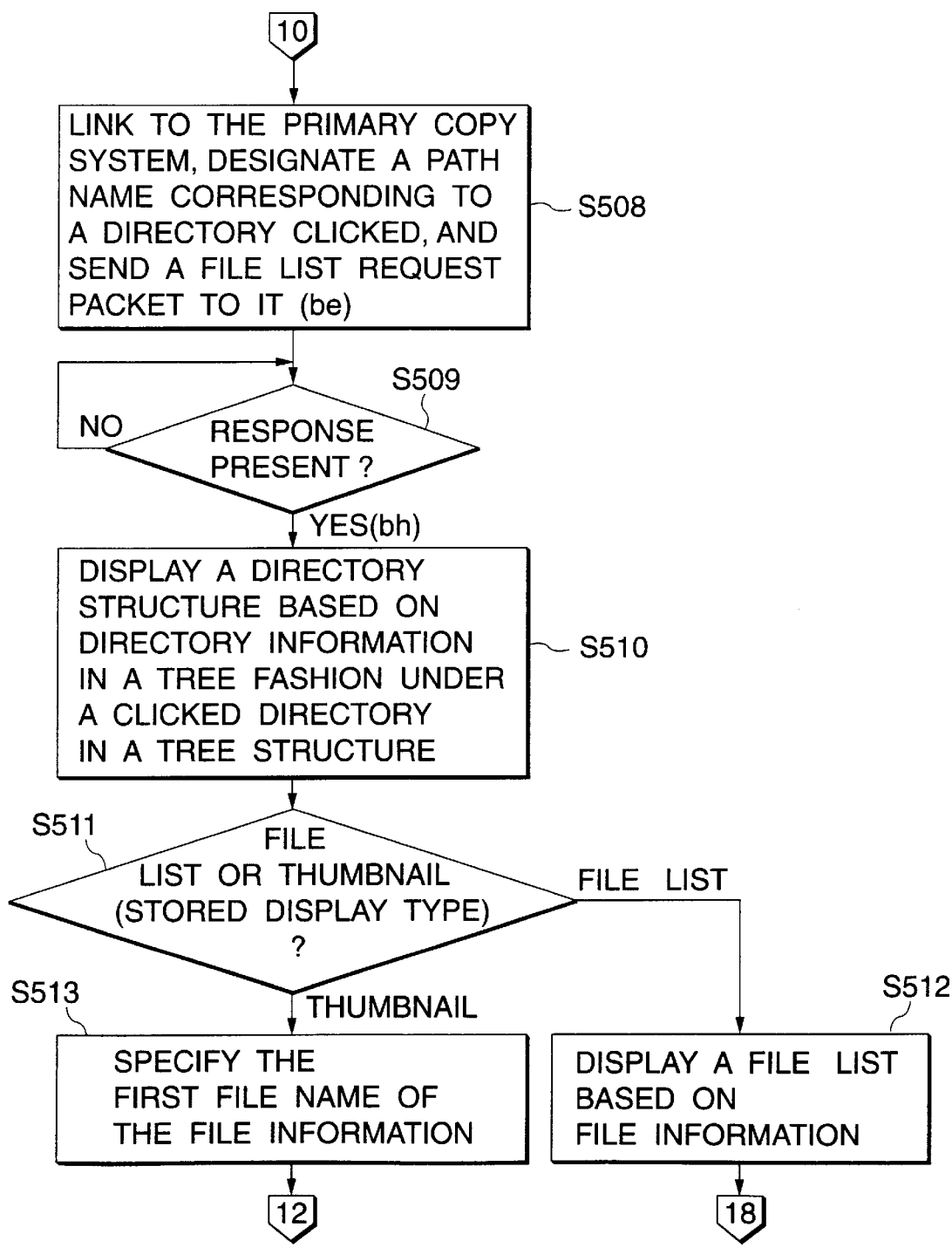

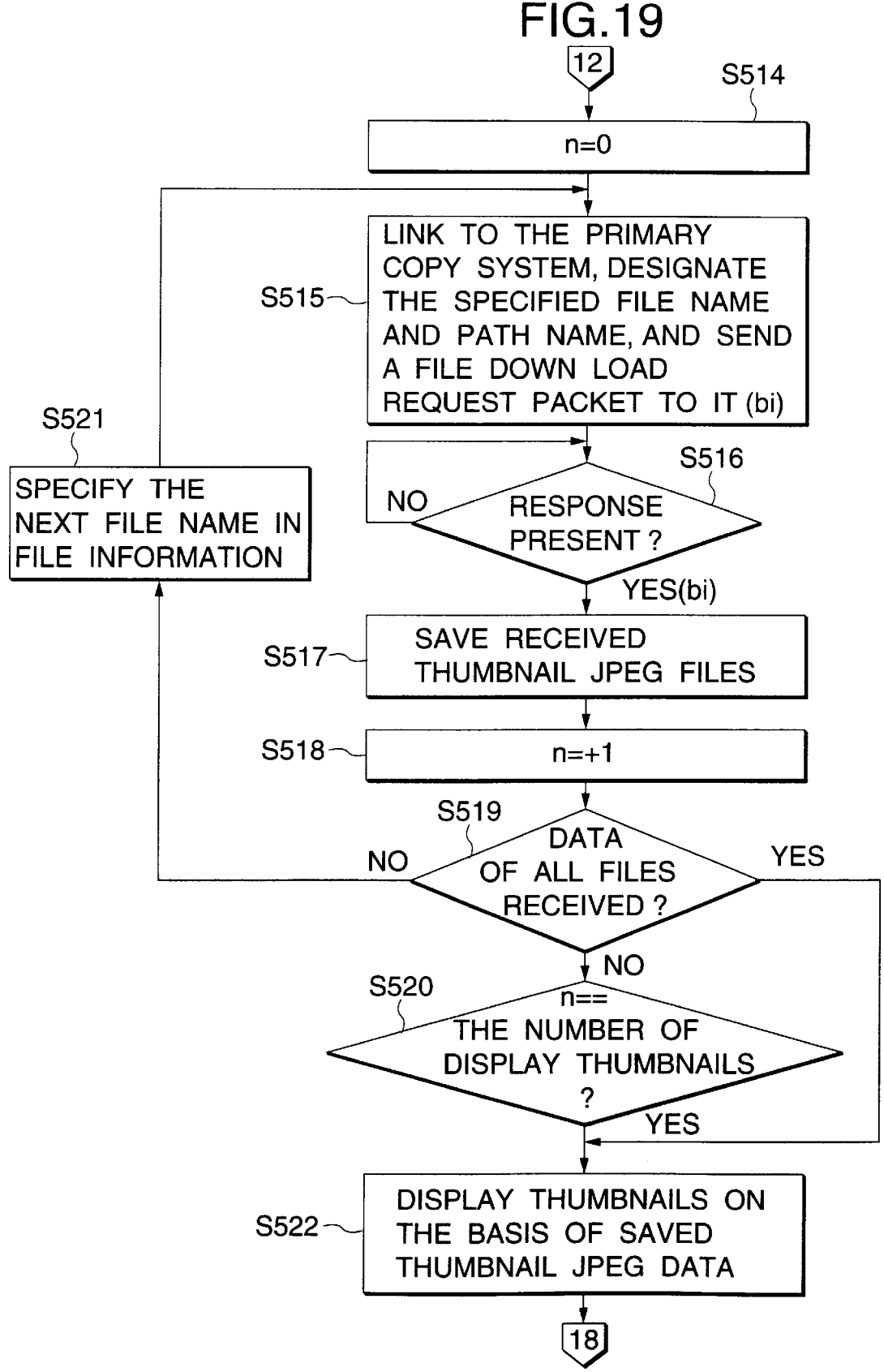

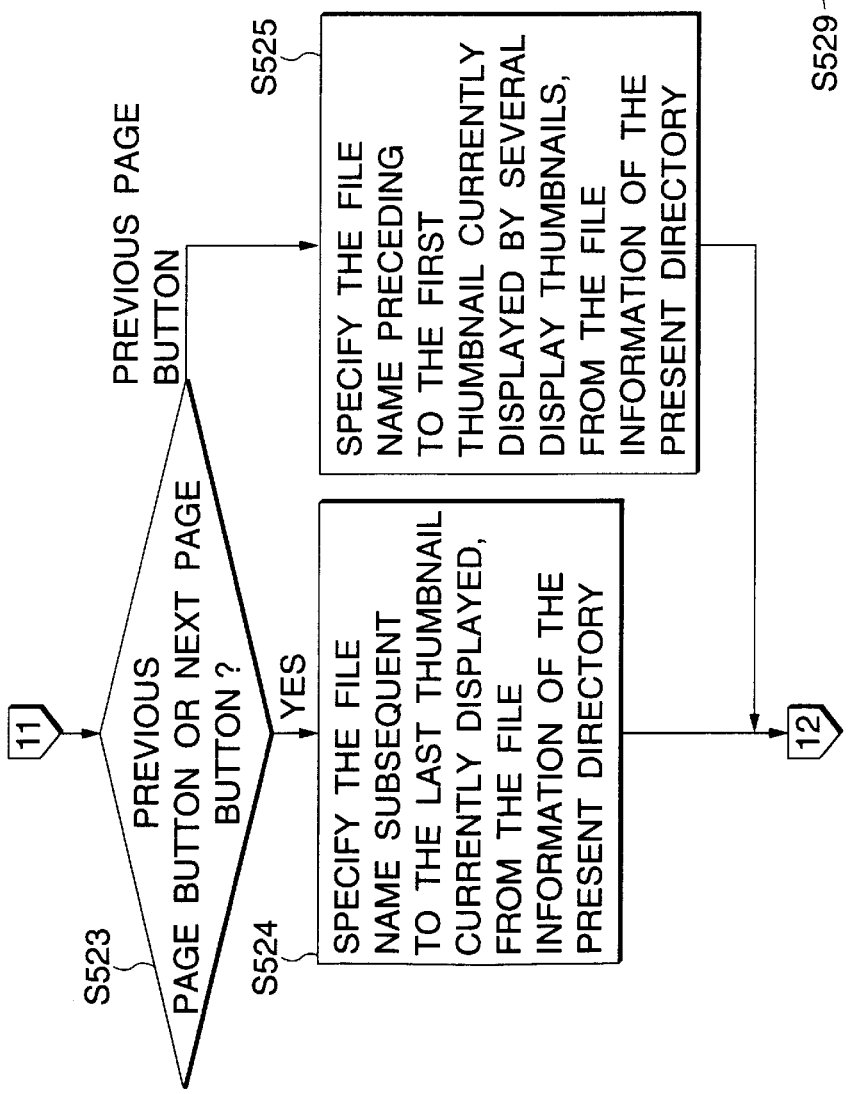
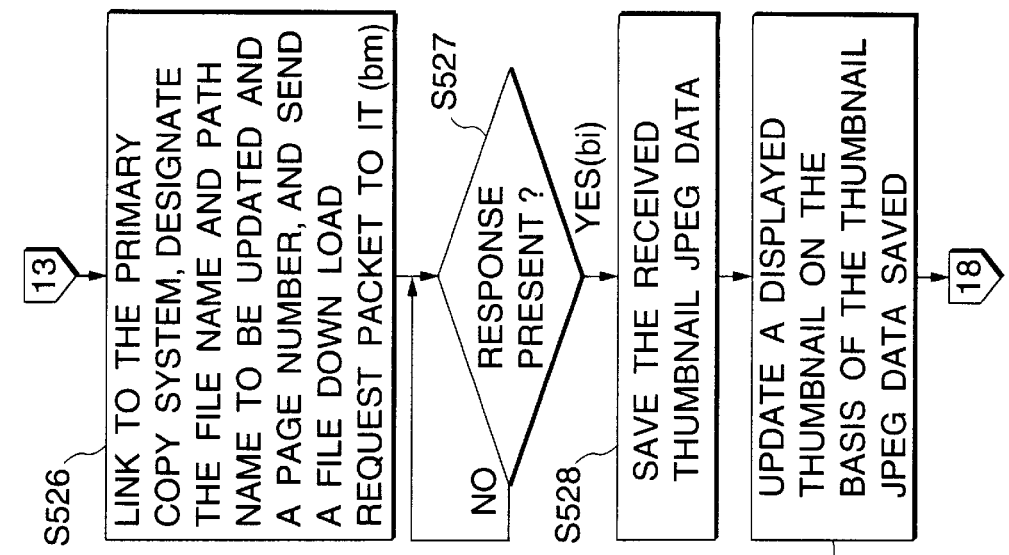

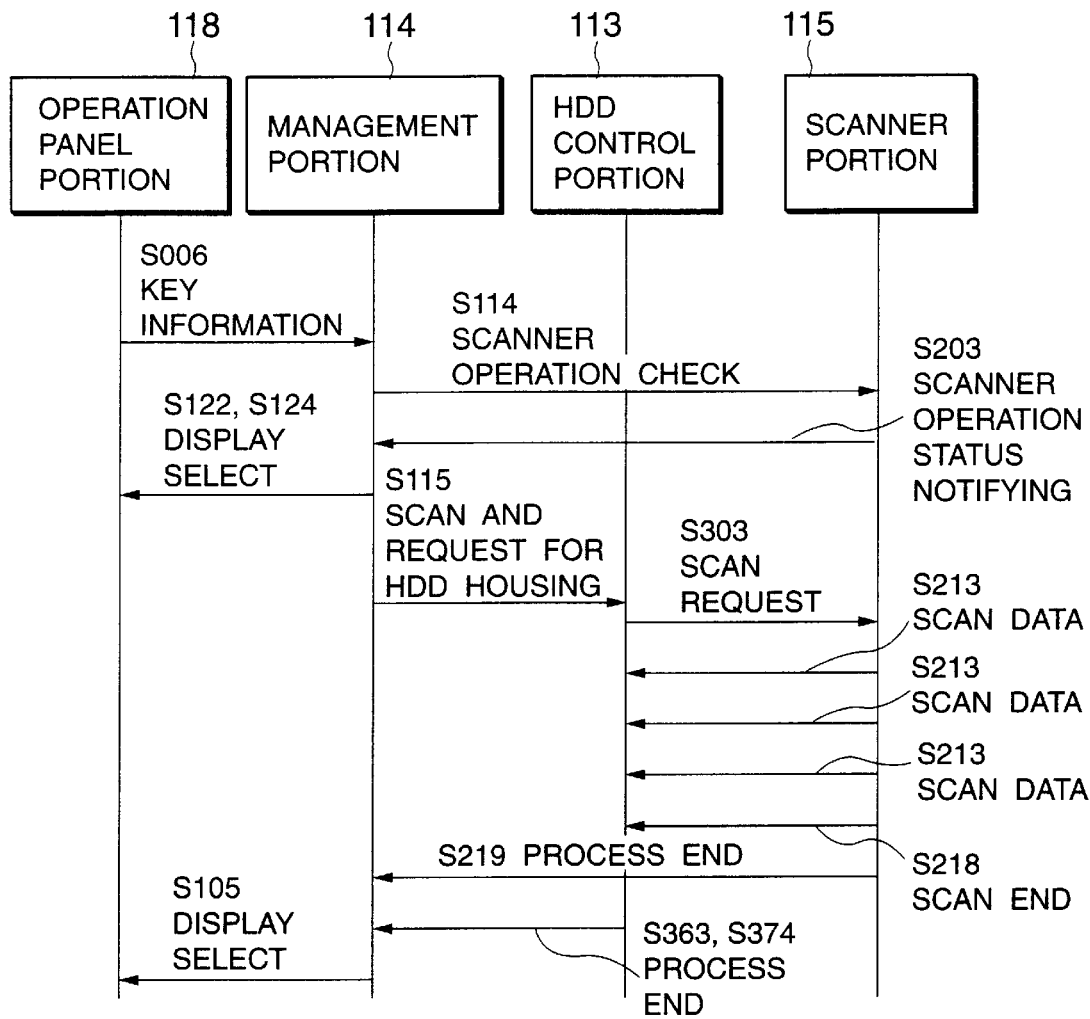
FIG. 46 SCAN DATA STORAGE
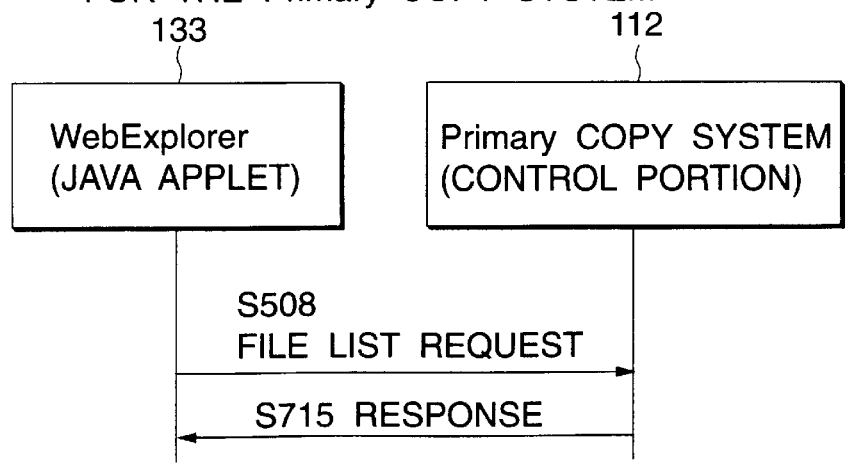
FIG. 47
WHEN THE PATH NAME IS DESIGNATED FOR THE Primary COPY SYSTEM

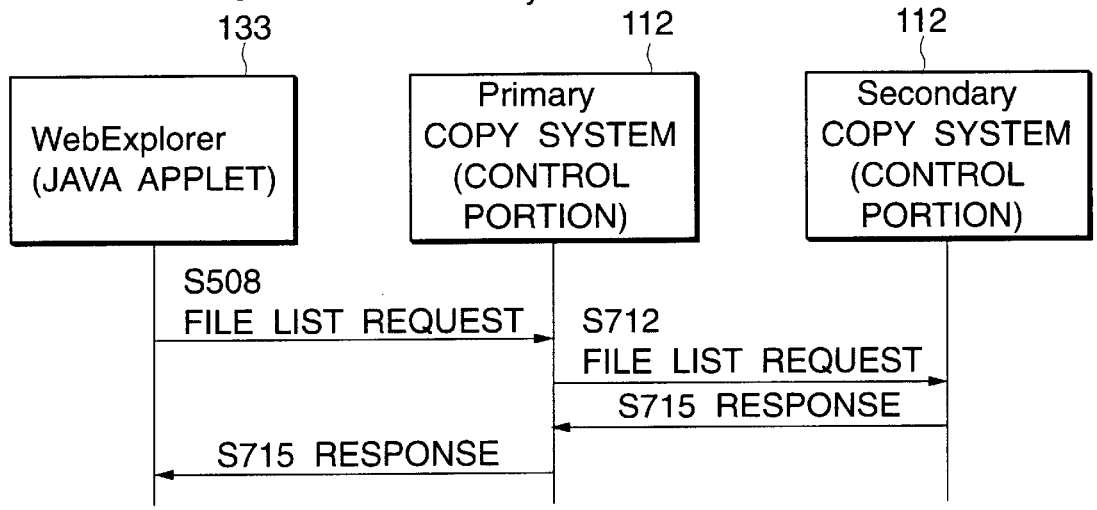
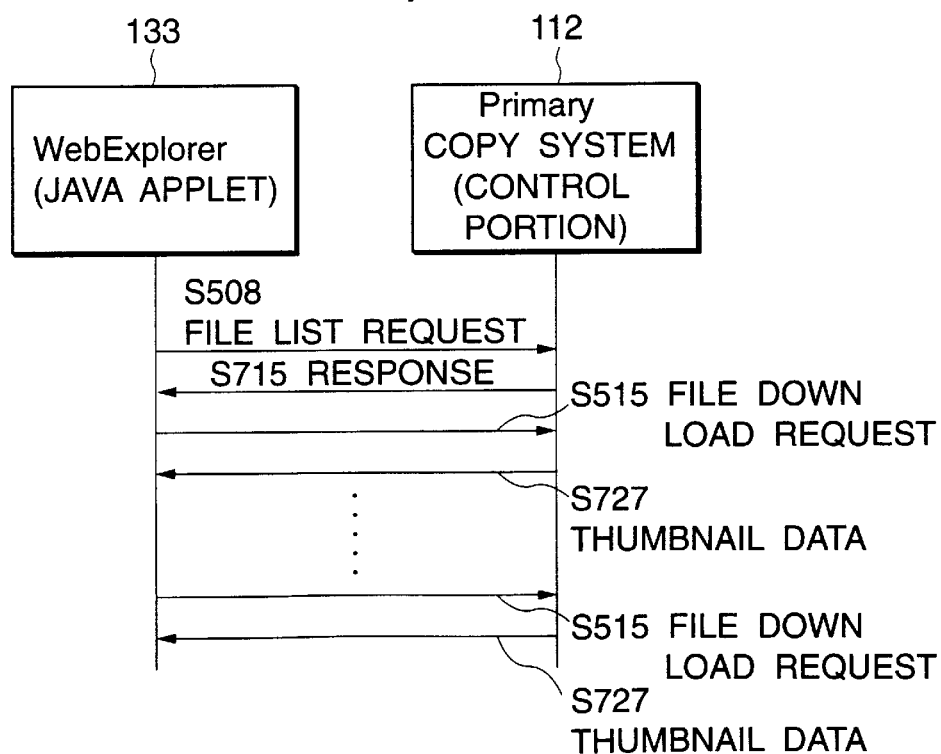

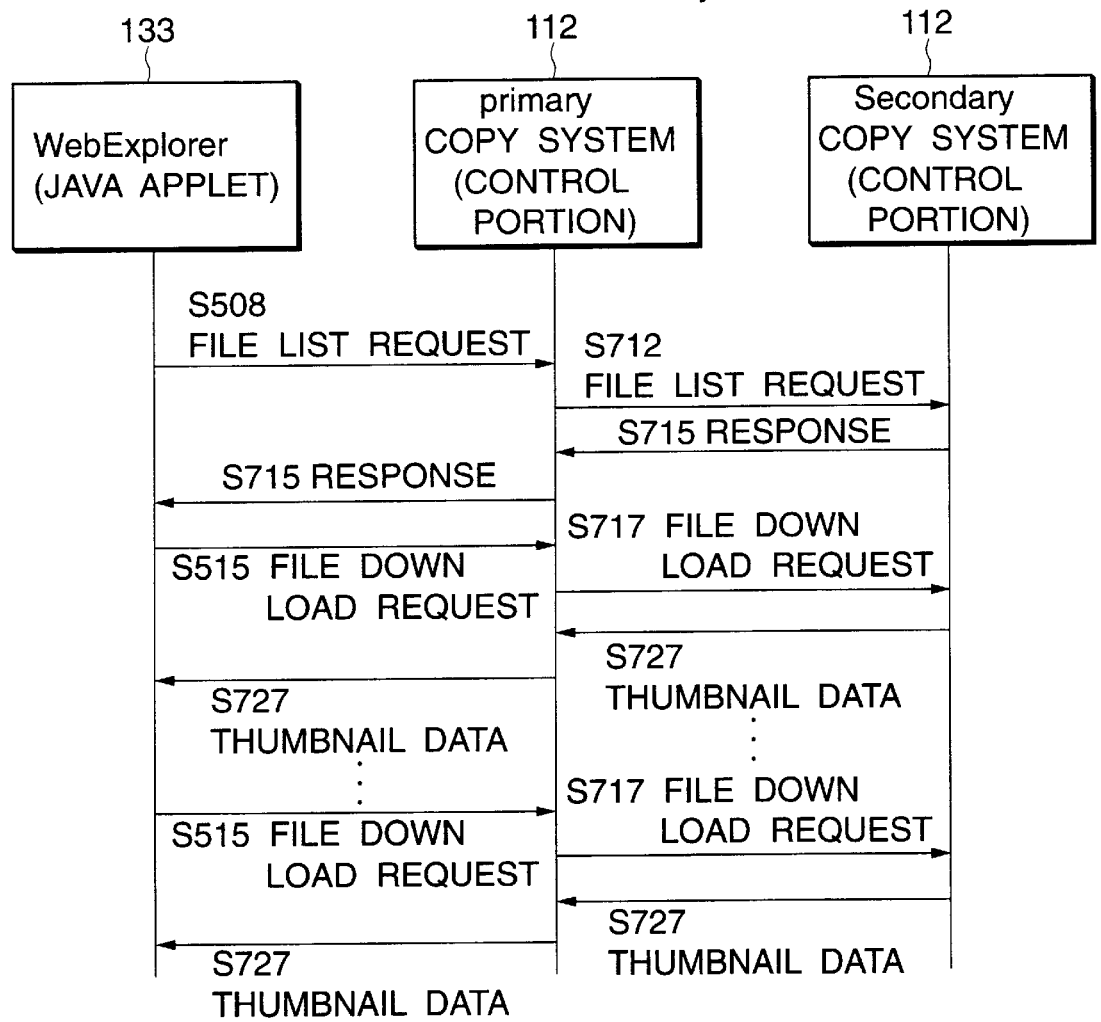
FIG.50 WHEN THE PATH NAME IS DESIGNATED FOR THE Secondary COPY SYSTEM
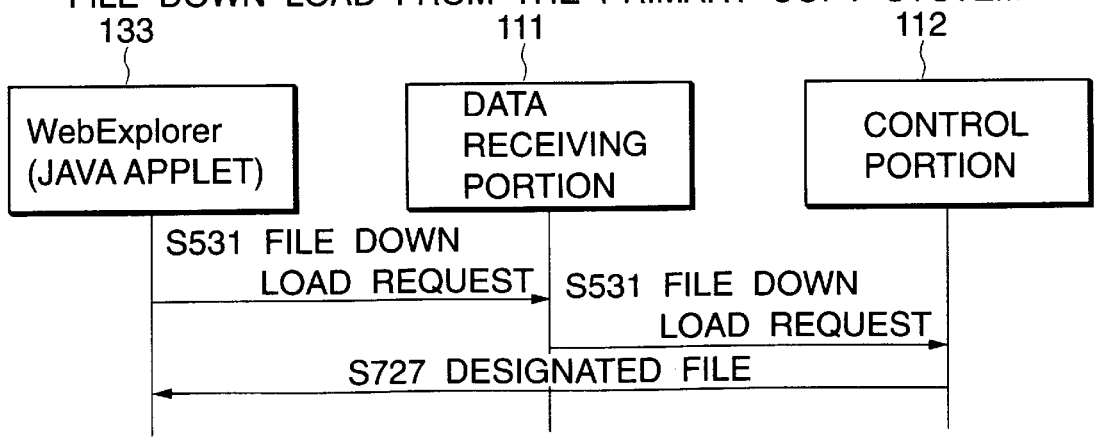
FIG.51 FILE DOWN LOAD FROM THE PRIMARY COPY SYSTEM

FILE COPY IN THE PRIMARY COPY SYSTEM

FILE COPY FROM THE PRIMARY COPY SYSTEM TO THE SECONDARY COPY SYSTEM

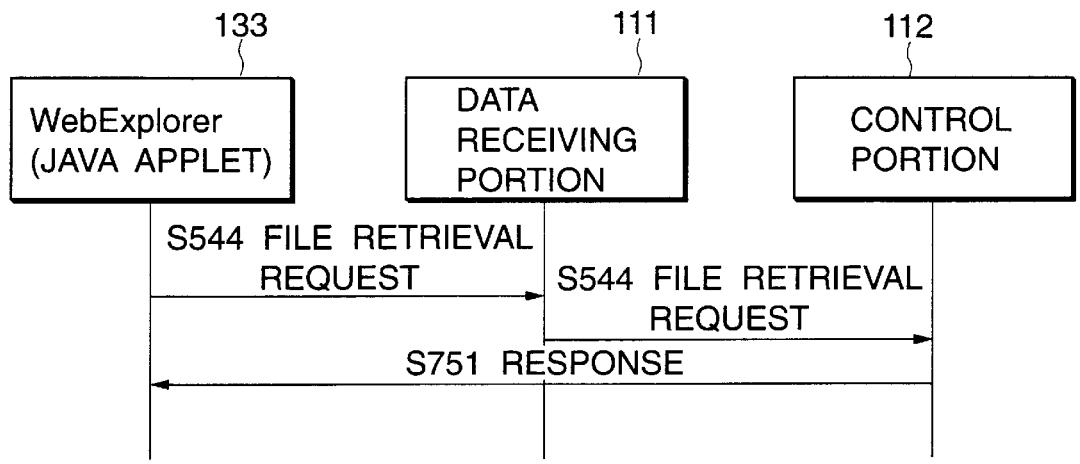
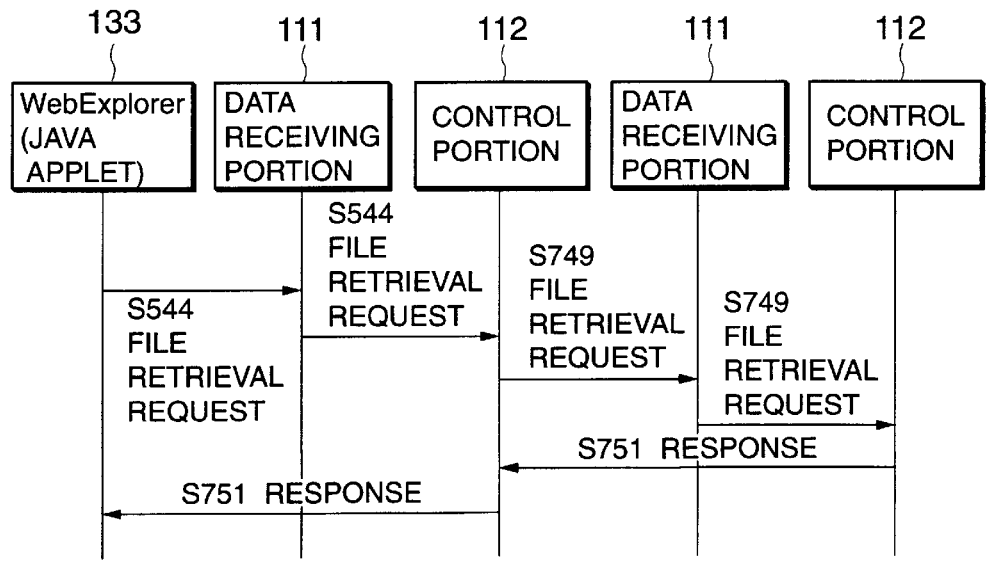

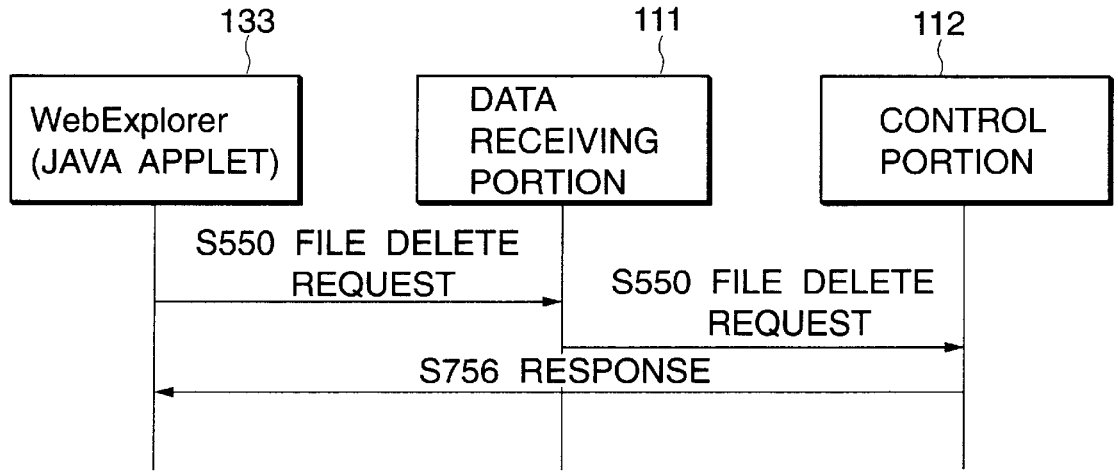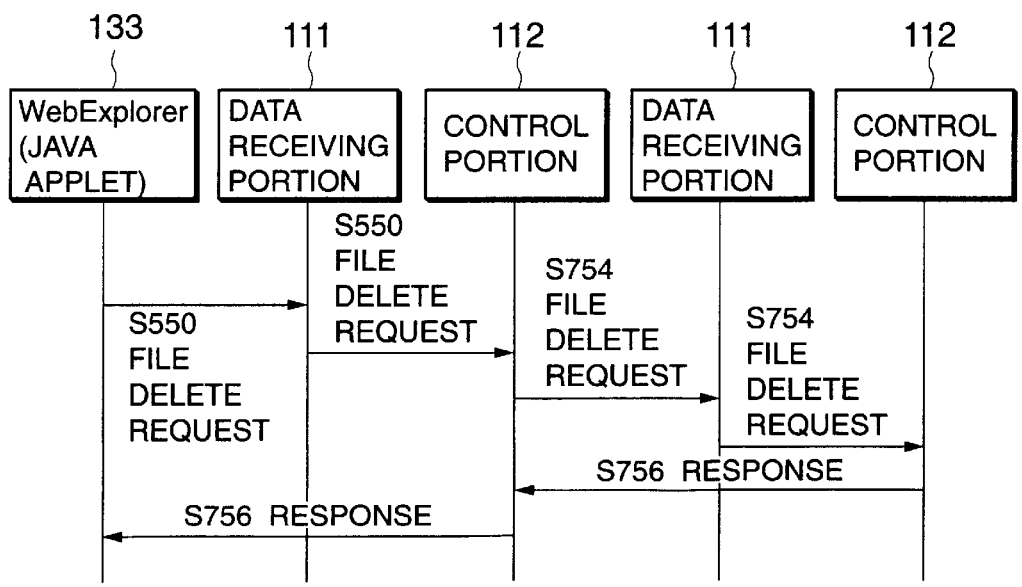

FILE RENAME IN THE PRIMARY COPY SYSTEM

FILE RENAME IN THE SECONDARY COPY SYSTEM

NETWORK MANAGEMENT SYSTEM, COMPUTER SYSTEM, COPY SERVER, FILE SERVER, NETWORK COPY FILE MANAGEMENT METHOD, AND COMPUTER READABLE MEDIUM

BACKGROUND OF THE INVENTION

1. Field of the Invention

The present invention relates to a network copy-file management system which is made up of a copy system and terminals, both being interconnected through a computer network, and sends image data read out information from an original document in the copy system to the terminals, a copy system forming such a network copy file management system, a copy server serving as one of major components of such a copy system, a file server, a network copy file managing method by the network file management system, and a computer readable medium which stores a program causing a computer to function as the copy server.

The present application is based on Japanese Patent Applications No. Hei. 11-126074, 11-126075 and 11-126076, which are incorporated herein by reference.

2. Description of the Related Art

A conventional copy system is of the analog type in which an image on an original document located on a document table is directly imaged on a photosensitive drum, and is developed onto a copy sheet by use of electrophotography process. With development of recent digital technology, to realize higher level image processing, a copy system of the digital type gradually takes the leading place in the market. In the digital copy system an image on the original document is read in the form of digital image data, the read image is appropriately processed, and printed.

The digital copy system is made up of an image reader for reading image information from an original document, a printing device for printing, and a copy server which controls those devices and appropriately controls image data received from the image reader and sends the processed one to the printing device. Of those devices, the image reader and the printing device operate on the basis of the same principles as of the scanner and the printing device, which are used in the computer system. If the architecture as of the computer system, such as a PC-AC, is employed for the architecture of the copy system, the scanner and the printer may be used for the image reader and the printing device. A general personal computer into which a print control program is installed or a dedicated computer may be used for a copy server.

Where a personal computer, such as a PC-AT, is thus used for the copy control unit, the copy system and the terminals may be interconnected through a computer network by giving the copy server a communication protocol, such as TCP/IP (transmission control protocol/internet protocol) or HTTPD (hypertext transfer protocol demon) and a network hardware. When the copy system and the terminals are thus interconnected in a communicative manner, the computer may be utilized in various ways by use of a terminal with a computer being capable of executing various types of processes in accordance with programs to be executed. If image data read out from the original document of the copy system is stored in the copy server, and if the readout rough image data may be displayed on a display screen of the terminal on an as-needed base, and it may be down-loaded into the terminal, it is possible to actually confirm states (e.g., optical density, resolution, disposition, coloring, etc.) of an image to be copied and printed on a printing sheet on the screen of the terminal, on the basis of image data. This leads to prevention of useless copies, paper saving, and eventually contribution of earth environment protection.

If image data read by the copy system is stored in the copy server, and if a list of image data pieces are displayed, when necessary, on the display screen of the terminal and specific image data designated by the terminal is transmitted (moved, copied) to a network device, the image data may be transmitted to a necessary network device. Therefore, an image can be transmitted to a single or a plurality of remote network devices at much higher speed and image quality than by a conventional FAX mail service or in much simpler manner than when image data is transmitted by a PC communication.

SUMMARY OF THE INVENTION

Accordingly, an object of the present invention is to provide a network copy file system in which image data that a copy system obtains through the reading of an original document is stored in the form of image files into a disc in a copy system, management information of a plurality of image files within a range requested is displayed on the screen of the terminal in response to a request from a terminal connected through a computer network to this copy system, and the terminal is caused to down load the image files corresponding to specific management information, which are requested by an operator on a terminal, which belong to those management information displayed, a copy system forming such a network copy file management system, a copy file server as a major portion of such a copy system, a network copy file management method by use of such a network copy file management system, and a computer readable medium storing a program causing a computer to function as a copy system as mentioned above.

To solve the above problems, the present invention uses the following constructions.

A network copy file management system according to a first aspect of the present invention, comprises a copy system and terminals which are interconnected through a network, wherein (A) the copy system comprises:
- a scanner for reading information from an original copy;
- a printer for printing;
- an operation panel which accepts execution commands for a copy process to cause the printer to print image data read out by the scanner;
- a control unit for executing the copy process, wherein the copy system may communicate with the terminal through the net work;
- image data converting means for converting image data read out from information on the original by the scanner into a image file format;
- a storage portion for storing the image file, wherein the operation panel further accepts execution commands for an image-file storing process, after image data read out of the original by the scanner is converted into the image file format, the image file being stored into the storage portion by the image-file storing process, and wherein, when the operation panel accepts execution commands for the image-file storing process, the control unit causing the data converting means to convert image data into the format of image files, and then storing the image files into the storage portion;

a management information responding portion, when one of the terminal requests management information of image files within a predetermined range stored in the storage portion, the management information responding portion sending the requested management information of image files within the predetermined range to the terminal; and an image file transmitting portion, when the terminal requests an image file corresponding to any of the management information transmitted to the terminal, the image file transmitting portion reads out the requested image file from the storage portion and sending the readout image file to the terminal; and (B) each of the terminals comprises:

a management information request portion for requesting the copy system to send management information of image files within a predetermined range;

a display portion for displaying management information that the copy system sends in response to a request;

an input portion which accepts data input by an operator, the data to specify any of image files indicated by the management information displayed on the display portion; and an image file request portion for requesting any of image files specified by the input data accepted by the input portion for the copy system.

With such an arrangement, the scanner reads image information from the original document, and image data gathered by the document reading operation is converted to a format of the image file and stored into the storage portion. Accordingly, when a number of original documents are read, a number of image files are stored into the storage portion. When in a state that the image files are stored in the storage portion, the management information request portion of a client terminal requests to the copy system to send management information of the image files within a range, the management information responding portion of the copy system reads out the management information of all the image files within a request range, and sends it to the client terminal. In the client terminal, the display portion displays the received management information. When at the terminal, the operator inputs to the input portion the data indicating that any of the management information displayed by the display portion is specified, the image file request portion requests the copy system to send an image file corresponding to the specified management information. In the copy system, the image file transmitting portion reads out the image file requested by the client terminal from the storage portion, and sends it to the client terminal. When the image file is thus sent to the client terminal, the client terminal is placed in a state that it is capable of displaying an image on the basis of the image data stored in the image file. Therefore, a state of the image can be checked before the image is printed on a printing sheet.

The image data may be monochromatic binary image data, multi-tone gray scale image, RGB multi-tone data, YMCK multi-tone data, or color pad data. The image file may be a JPEG file, a TIFF or a GIF file. The management information of the image file may be the file name, file size, file attributes, and time stamp of the image file, and one or all pages of the image data stored in the image file. The network may be LAN, such a public telephone network as a telephone network and a packet switching network, internet or intranet. The storage portion may be a disc such as a hard disc, a RAM disc, a floppy disc, or a magneto-optical disc. The input portion may be a keyboard or a pointing device, such as a computer mouse or a touch panel.

A copy system according to a second aspect of the present invention, comprises:

a scanner for reading information from an original copy;

a printer for printing;

an operation panel which accepts execution commands for a copy process to cause the printer to print image data read out by the scanner;

a control unit for executing the copy process, wherein the copy system may communicate with a terminal through a network;

image data converting means for converting image data read out from information on the original by the scanner into a image file format; and a storage portion for storing the image file, wherein the operation panel further accepts execution commands for an image-file storing process, after image data read out of the original by the scanner is converted into the image file format, the image file being stored into the storage portion by the image-file storing process, and wherein, when the operation panel accepts execution commands for the image-file storing process, the control unit causing the data converting means to convert image data into the format of image files, and then storing the image files into the storage portion;

a management information responding portion, when the terminal requests management information of image files within a predetermined range stored in the storage portion, the management information responding portion sending the requested management information of image files within the predetermined range to the terminal; and an image file transmitting portion, when the terminal requests an image file corresponding to any of the management information transmitted to the terminal, the image file transmitting portion reads out the requested image file from the storage portion and sending the readout image file to the terminal.

Preferably, in the above copy system, wherein the program is Java (a trademark of Sun Microsystems, Inc.) Applet, the computer readable medium storing hypertext data which is requested by a web browser of the terminal and executed by a processor of the terminal executing the web browser, thereby to cause the program transmitting portion to request the down load of the reference program.

Preferably, in the above copy system, wherein the program is Java Applet, the computer readable medium storing hypertext data which is requested by a web browser of the terminal and executed by a processor of the terminal executing the web browser, thereby to cause the program transmitting portion to request the down load of the reference program.

Preferably, in the copy system according to the second aspect of the present invention, the image data converting means converts image data into an image file of its own or unique format, the image file transmitting portion which, in response to an image file transmission request, converts the image file into an image file of general format, and then sends the resultant.

Preferably, in the above copy system, the unique format is a JPEG file formed in a manner that image data is JPEG compressed to generate fine image JPEG data, and rough image JPEG data is generated by reducing a resolution of the image data and then JPEG compressing the image data, and the fine and rough image data are combined into one image data. Or in the above copy system, preferably, when original documents of a plurality of pages exist, the unique format is a JPEG file formed in a manner that fine and rough image JPEG data generated for each page are combined into one data.

A copy server according to a third aspect of the present invention, comprises:
- an image data input portion for inputting image data read by a scanner;
- a print data output portion for outputting print data to a printer;
- an operation panel connecting portion for accepting various execution commands;
- a network control portion communicable with a terminal through a network;
- image data converting means for converting image data input from the image data input portion into a image file format;
- a storage portion for storing the image file;
- a management information responding portion, when the terminal requests management information of image files within a predetermined range stored in the storage portion, the management information responding portion sending the requested management information of image files within the predetermined range to the terminal;
- an image file transmitting portion, when the terminal requests an image file corresponding to any of the management information transmitted to the terminal, the image file transmitting portion reads out the requested image file from the storage portion and sending the readout image file to the terminal;
- a computer readable medium storing a program for causing the computer of each the terminal to request the management information responding portion to send management information of image files within a predetermined range, to display the management information received from the management information responding portion in response to the request, and to request the image file transmitting portion to send the image files corresponding to the specified management information; and
- a program transmitting portion for the program stored in the computer readable medium to the terminal in response to a request from the terminal.

Preferably, in the above copy server,
- the program is Java Applet,
- the computer readable medium storing hypertext data which is requested by a web browser of the terminal and executed by a processor of the terminal executing the web browser, thereby to cause the program transmitting portion to request the down load of the reference program.

Preferably, in the above copy server, the Java Applet received by the terminal displays incoming management information and the management information of the image files in the terminal. Or in the above copy server, preferably, the network control portion is communicable with a third network device, the management information responding portion transmits the third network device information, the Java Applet received by the terminal requests the third network device to send management information according to the third network device information, causes reception of the management information, and displays incoming management information, the management information of the image files in the terminal and the management information of the third network device.

Preferably, in the copy server according to the third aspect of the present invention,
- the image data converting means converts image data into an image file of its own or unique format,
- the image file transmitting portion which, in response to an image file transmission request, converts the image file into an image file of general format, and then sends the resultant.

Preferably, in the above copy server,
- the unique format is a JPEG file formed in a manner that image data is JPEG compressed to generate fine image JPEG data, and rough image JPEG data is generated by reducing a resolution of the image data and then JPEG compressing the image data, and the fine and rough image data are combined into one image data. Or in the above copy server, preferably, when original documents of a plurality of pages exist, the unique format is a JPEG file formed in a manner that fine and rough image JPEG data generated for each page are combined into one data.

A file server according to a fourth aspect of the present invention, comprises:
- an image data input portion for inputting image data and a network control portion communicable with a terminal through a network;
- image data converting means for converting image data input from the image data input portion into a image file format;
- a storage portion for storing the image file;
- a management information responding portion, when the terminal requests management information of image files within a predetermined range stored in the storage portion, the management information responding portion sending the requested management information of image files within the predetermined range to the terminal;
- an image data transmitting portion, when the terminal requests the image data transmitting portion to send an image file corresponding to any of the management information transmitted to the terminal, the image data transmitting portion reading out the requested image file from the storage portion and sending the terminal;
- a computer readable medium storing (i) Java Applet for causing the computer of each the terminal to request the management information responding portion to send management information of image files within a predetermined range, to display the management information received from the management information responding portion in response to the request and the management information of the image files in the terminal, and to request the image file transmitting portion to send the image files corresponding to the specified management information when one of the management information pieces of the file server being displayed is specified by the operator, and (ii) hypertext data which is requested by a web browser of the terminal and read into a processor of the terminal executing the web browser to thereby cause transmission request of the Java Applet; and
- a program transmitting portion for sending the Java Applet stored in the computer readable medium to the terminal in response to the request of the terminal.

A computer readable medium according to a fifth aspect of the present invention, stores:

(A) a program causing a computer having an image data input portion for inputting image data, a network control portion communicable with a terminal through a network, and a storage portion for storing the image file to convert data input from the image data input portion into a image file format, to store the image data into the storage portion, when the terminal requests management information of image files within a predetermined range stored in the storage portion, to send the requested management information of image files within the predetermined range to the terminal, and when the terminal requests the sending of an image file corresponding to any of the management information sent to the terminal, to read out the requested image file from the storage portion and to send the terminal;

(B) Java Applet to cause the computer of each the terminal to request the sending of management information of image files within a predetermined range, to display the management information received from the management information responding portion in response to the request and the management information of the image files in the terminal, and to request the computer to send the image files corresponding to the specified management information when one of the management information pieces of the computer being displayed is specified by the operator; and (C) hypertext data which is requested by a web browser of the terminal and read into a processor of the terminal executing the web browser, thereby to cause transmission request of the Java Applet.

A network copy file management method according to a sixth aspect of the present invention, for managing image files obtained by reading image information on an original document by a network copy file management system including a copy system and terminals which are interconnected through a network, wherein the terminal requests the computer system to send the management information of image files within a predetermined range, the copy system requests the terminal to send the requested management information of image files within a predetermined range, the terminal displays the transmitted management information, the terminal requests the copy system to send image files corresponding to the management information of the displayed management information specified by an operator, and the copy system sends the requested information to the terminal.

Features and advantages of the invention will be evident from the following detailed description of the preferred embodiments described in conjunction with the attached drawings.

BRIEF DESCRIPTION OF THE DRAWINGS

In the accompanying drawings:

FIG. 14 is a flow chart showing a process executed by the HDD control portion;

FIG. 15 is a flow chart showing a process executed by the HDD control portion;

FIG. 16 is a flow chart showing a process executed by a web browser;

FIG. 17 is a flow chart showing a process executed by the Java Applet;

FIG. 18 is a flow chart showing a process executed by the Java Applet;

FIG. 19 is a flow chart showing a process executed by the Java Applet;

FIG. 20 is a flow chart showing a process executed by the Java Applet;

FIG. 21 is a flow chart showing a process executed by the Java Applet;

FIG. 46 is a time chart showing a message transmission when scan data is stored;

FIG. 47 is a time chart showing a message transmission for a file list display for a directory in a primary copy system;

FIG. 48 is a time chart showing a message transmission for a file list display for a directory in a secondary copy system;

FIG. 49 is a time chart showing a message transmission for a file list display for a directory in a primary copy system;

FIG. 50 is a time chart showing a message transmission for a file list display for a directory in a secondary copy system;

FIG. 51 is time chart showing a message transmission when an image file is down loaded from the primary copy system;

FIG. 54 is a time chart showing a message transmission at the time of retrieving in the primary copy system;

FIG. 55 is a time chart showing a message transmission at the time of retrieving in the secondary copy system;

FIG. 56 is a time chart showing a message transmission at the time of deleting in the primary copy system;

FIG. 57 is a time chart showing a message transmission at the time of deleting in the secondary copy system;

DETAILED DESCRIPTION OF THE PREFERRED EMBODIMENTS

An embodiment of a network copy control system according to the present invention will be described with reference to the accompanying drawings.

I. Overall Construction

Figure 1:
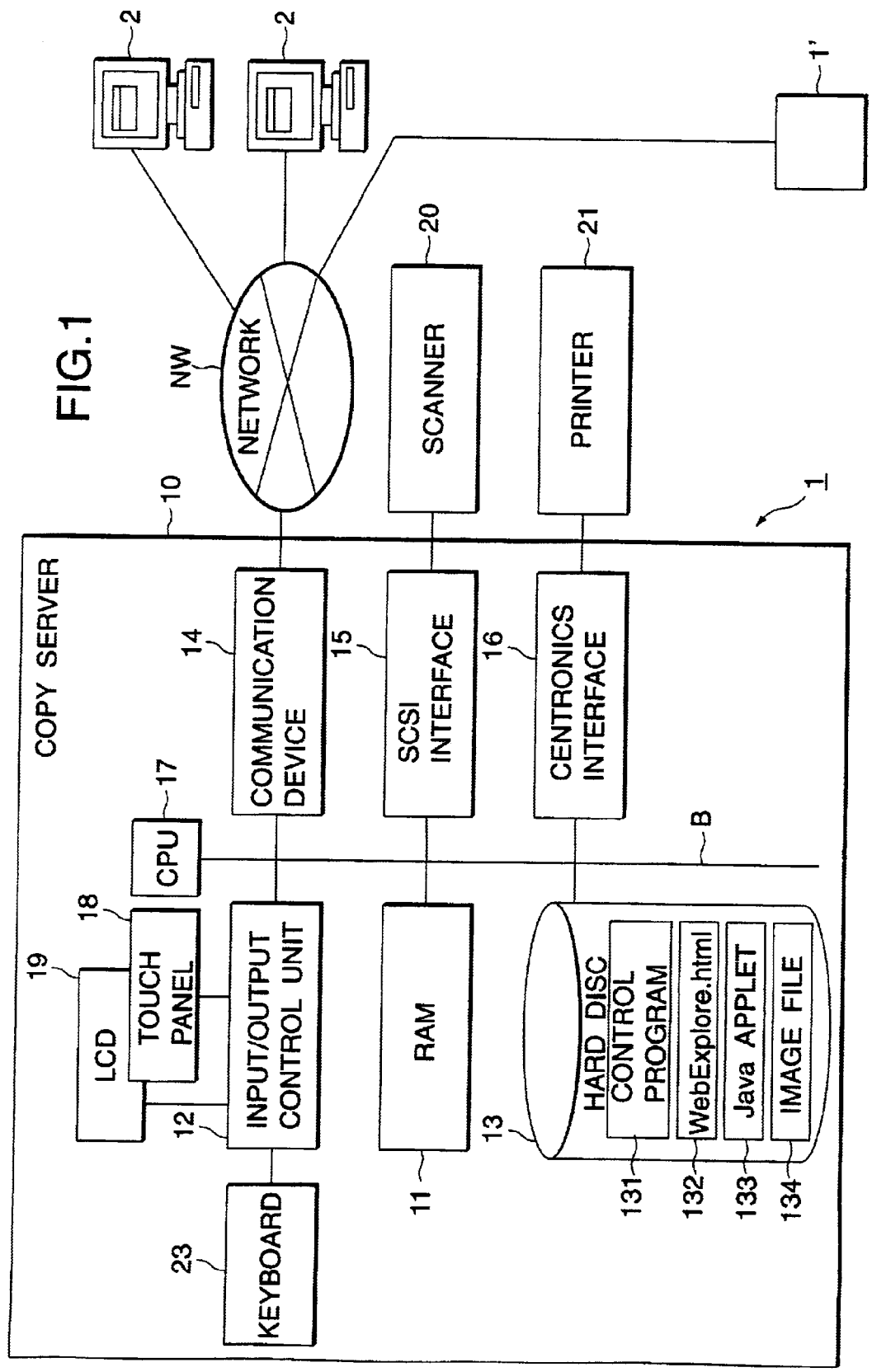
FIG. 1 is a block diagram showing an arrangement of a network copy control system which is an embodiment of the present invention.

FIG. 1 is a block diagram showing an overall arrangement of a network copy control system constructed according to the present invention. The network copy control system of the embodiment is made up of a plurality of copy systems 1 and 1' interconnected by a network, such as LAN or internet, and a number of (or one) client terminals 2. Since the copy systems 1 and 1' are exactly the same in construction, the copy system 1 will typically be described in detail.

The copy system 1 is made up of a copy server (file server) 10 consisting of a dedicated computer or a general personal computer, and a scanner 20 and a printer 21, both being connected to the copy server 10.

The copy server 10 is composed of a CPU 17, a RAM 11, an input/output control unit 12, a hard disc 13, a communication device 14, an SCSI (small computer system interface) interface 15, and a centronics interface 16, those being interconnected by buses, a touch panel 18 connected to the input/output control unit 12, an LCD (liquid crystal display) 19, and a keyboard 23.

Of those components, the CPU 17 is a processor (computer) for controlling the overall copy server 10. The CPU 17 functions as an image reading portion, an file storage portion, a program transmitting portion, a management information responding portion, an image file transmitting portion, and an rough-image JPEG file responding portion. The RAM 11 is a random access memory into which a work area used by the CPU 17 is developed.

The communication device 14 performs a packet-basis data exchange to and from the client terminals 2 and another copy system 1'. When a network NW is a LAN (local area network), a LAN card is used for the communication device 14. When the network NW is an internet, a serial interface, a modem, a LAN card or a DSU is used for the communication device 14.

The SCSI interface 15 is connected to an SCSI cable connecting to the scanner 20, and controls the data exchange (transmission of various information pieces and commands to the scanner 20, and reception of various information pieces and scan data from the scanner 20) performed between it and the scanner 20. The centronics interface 16 is connected to a centronics cable connecting to the printer 21, and controls the data exchange (transmission of various information pieces, commands and print data to the printer 21 and reception of various information pieces from the printer 21) between it and the printer 21.

The hard disc 13 as a computer readable medium stores control programs (including an operation system program) 131 to be read and executed by the CPU 17, a number of hypertexts (one of them is #WebExplore.html" 132) and Java Applet delivered from the client terminals 2 in response to the client terminal 2 and the class file 133 of the Java Applet. Those control programs are down loaded into the hard disc 13 through a CD-ROM drive (not shown), for example. An image file area 134 for storing various types of image files (JPEG files and TIFF files) is secured in the hard disc 13 as a disc.

The image file area 134 is given a drive name proper to it, and its internal structure logically takes a tree structure. The whole of it is defined as a route directory. The whole or a part of the route directory is defined as 0 or a plurality of subdirectories of the lower layer. The whole or a part of the route directory is defined as 0 or a plurality of subdirectories of the lower layer. Each directory is given a name. Accordingly, all the subdirectories may be specified by tracing the names of the directories, which are branched from the route directory in a tree fashion. A chain of directory names assigned to a series of subdirectories thus ranging from the route to an intended subdirectory is called "path name". The route and the subdirectory will be generally called "directory". The image files may be stored in any of the directories defined in the image file area 134. The image file stored in any of the directory is specified by its file name and a path name of the stored directories.

The image files stored in the image file area 134 are classified into JPEG files and TIFF files. In the present invention, the formats of the original JPEG (joint photographic experts group) files and the original TIFF (tagged image file format) files are uniquely modified. According to the original JPEG specifications, one JPEG file consists of a header and JPEG data of one page. In the embodiment, the format of the JPEG file is modified such that JPEG data pieces of plural pages (detail image JPEG data) and JPEG thumbnail data pieces corresponding respectively to those pages (rough image JPEG data generated by reducing the resolution of the original JPEG data) are both stored in one JPEG file. According to the TIFF specifications, one TIFF file consists of one header and bit map data of plural pages. In the present embodiment, the format of the TIFF file is modified such that bit map data of plural pages and thumbnail data (rough image JPEG data) corresponding respectively to the pages of the bit map data are stored in one FIFF file.

Figure 37:
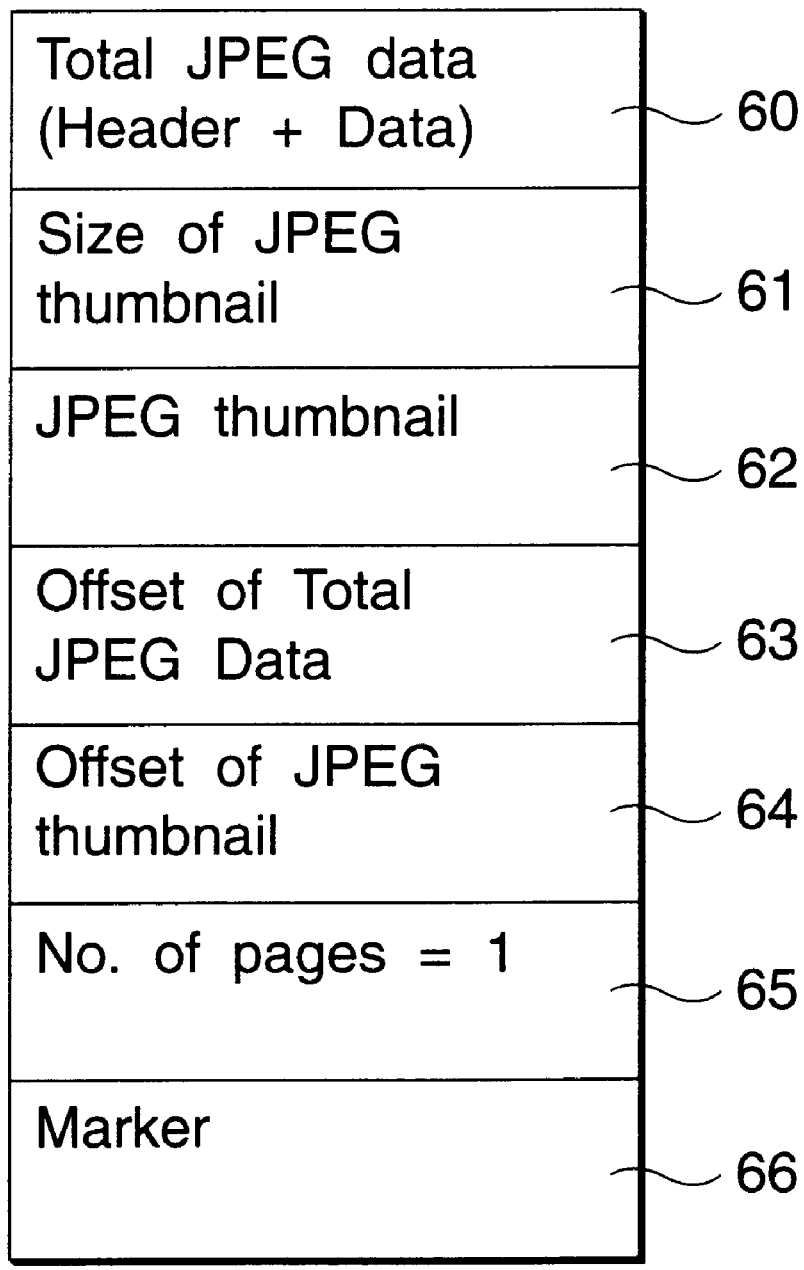
FIG. 37 is a format of a JPEG single page file.

FIG. 37 diagrammatically shows a format of a JPEG file (JPEG single page file for storing JPEG data of a single page) which is used in the embodiment. The JPEG single page file contains a "total JPEG data area" 60, a "size of JPEG thumbnail area" 61, a "JPEG thumbnail area" 62, an "offset of total JPEG data area" 63, an "offset of JPEG thumbnail area" 64, a "No. of pages area" 65, and a "marker area" 66. In this file format, those areas are allocated in this order from its head. Of those areas, the "total JPEG data area" 60 corresponds to that for the original JPEG file prescribed according to the JPEG. Therefore, it stores JPEG data consisting of the header and one page. The size of the "total JPEG data area" 60 depends on a size of image data before the image data is compressed or a compression rate of the image data. In the embodiment, its size is 100 Kbytes by way of example. The next "size of JPEG thumbnail area" 61 indicates the size of the "JPEG thumbnail area" 62 subsequent to it by use of 4 bytes. The size of the "JPEG thumbnail area" 62 is fixed at 1024 bytes, and hence its value is "1024". The "JPEG thumbnail area" 62 stores JPEG thumbnail data indicating a rough image of the JPEG data, which is stored in the "total JPEG data area" 60. The offset of total JPEG data area" 63 indicates a quantity of an offset of the JPEG file of the "total JPEG data area" 60 from the head of it. In the JPEG single page file, the "total JPEG data area" 60 is only one in number. Therefore, the offset value is "0". The "offset of JPEG thumbnail area" 64 indicates a quantity of offset from the head of the JPEG file of the "JPEG thumbnail area" 62. In the JPEG single page file, the "JPEG thumbnail area" 62 is only one in number, and the offset value is "100K+4". The "No. of pages area" 65 indicates the number of the "total JPEG data areas" 60 contained in the JPEG file. In the JPEG single page file, the "total JPEG data area" 60 is only one in number. Hence, its number is 21". The "marker area" 66 indicates that the JPEG file has a unique format. In this area, "Color Copy Station" as the name of the copy server 10 is described.

Figure 38:
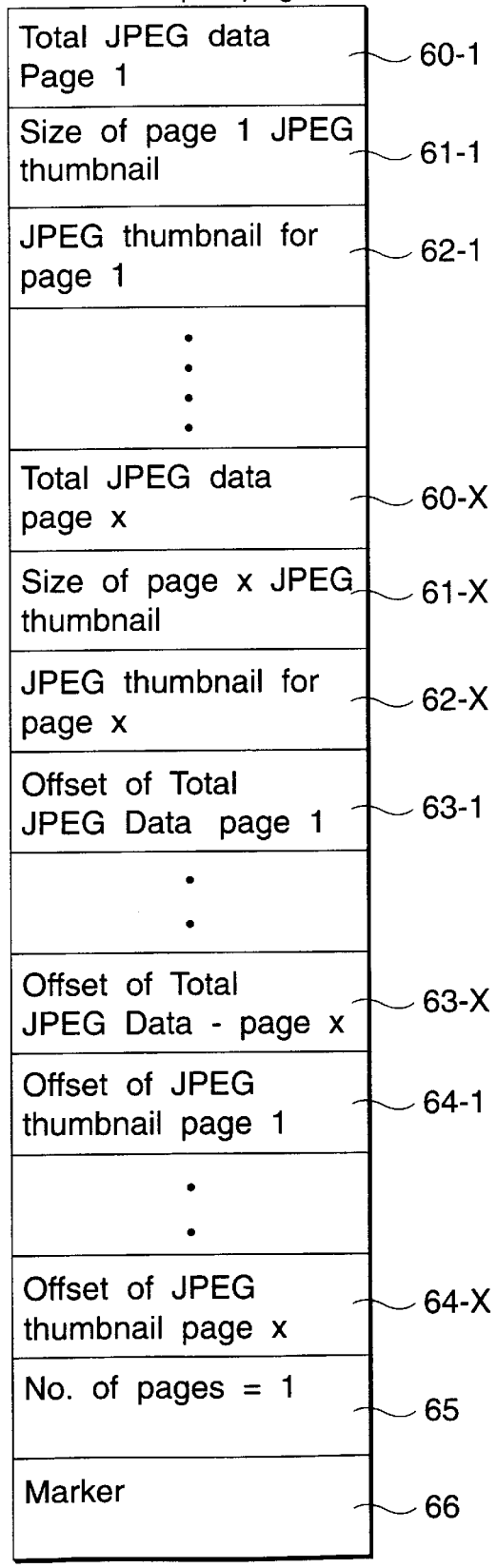
FIG. 38 is a format of a JPEG multi-page file.

FIG. 38 diagrammatically shows a format of another JPEG file (JPEG multi-page file for storing JPEG data of X pages) used in the embodiment. When comparing with the FIG. 37 JPEG single page file, this JPEG multi-page file contains an X number of sets each consisting of the "total JPEG data area" 60, the "size of JPEG thumbnail area" 61 and the "JPEG thumbnail area" 62 are repeatedly allocated. Further, it further an X number of offset of total JPEG data areas" 63 and the same number "offset of JPEG thumbnail areas" 64 are contained. A value of the "Offset of total JPEG data area" 63-n on a page (n page) is a quantity of offset from the head of the JPEG file of the "total JPEG data area" 60-n corresponding to the n page, i.e., (n−1)×(100K+4+1024). A value of the "offset of JPEG thumbnail area" 64-n on a page (n page) is a quantity of offset from the head of the JPEG of the "JPEG thumbnail area" 62-2 corresponding to the n page, i.e., (n−1)×(100K+4+1024)+100K+4. A value of the "No. of pages area" 65 is a number of the "total JPEG data areas" 60 contained in the JPEG file, i.e., "X".

Figure 39:
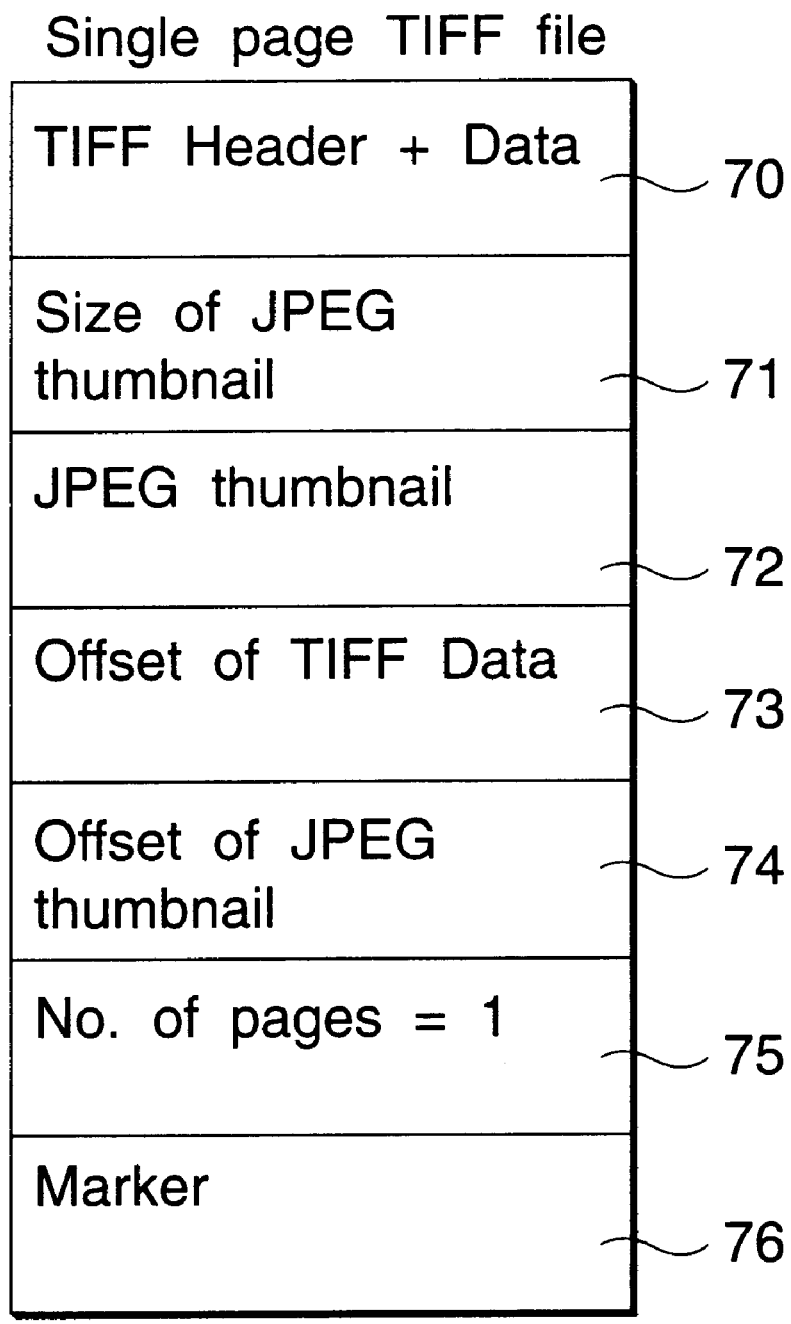
FIG. 39 is a format of a single page TIFF file.

FIG. 39 diagrammatically shows a format of a TIFF file (a single page TIFF file for storing bit map data of one page) used in the embodiment. The single page TIFF file contains a "TIFF header+data area" 70, a "size of JPEG thumbnail area" 71, a "JPEG thumbnail area" 72, an "offset of TIFF data area" 73, an "offset of JPEG thumbnail area" 74, a "No. of pages area" 75, and a "marker area" 76. In this file format, those areas are allocated in this order from its head. Of those areas, the "TIFF header+data area" 70 corresponds to an area for storing the data of one page in the original TIFF file, and stores the header and bit map data of one page. The next "size of JPEG thumbnail area" 71 is an area for indicating the size of the "JPEG thumbnail area" 72 subsequent to it. The "JPEG thumbnail area" 72 is an area for storing JPEG thumbnail data indicating a rough image of the bit map data stored in the "TIFF header+data area" 70. The "offset of TIFF data area" 73 is an area for indicating a quantity of offset of the bit map data stored in the "TIFF header+data area" 70 from its head. The "offset of JPEG thumbnail area" 74 is an area for indicating a quantity of offset of the TIFF file in the "JPEG thumbnail area" 72 from its head. The "No. of pages area" 75 is an area indicating a number of bit map data pieces contained in the TIFF file, and its number is "1". The "marker area" 76 is an area indicating that the TIFF file has a unique format, and "Color Copy Station" as the name of the copy server 10 is described in the area.

Figure 40:
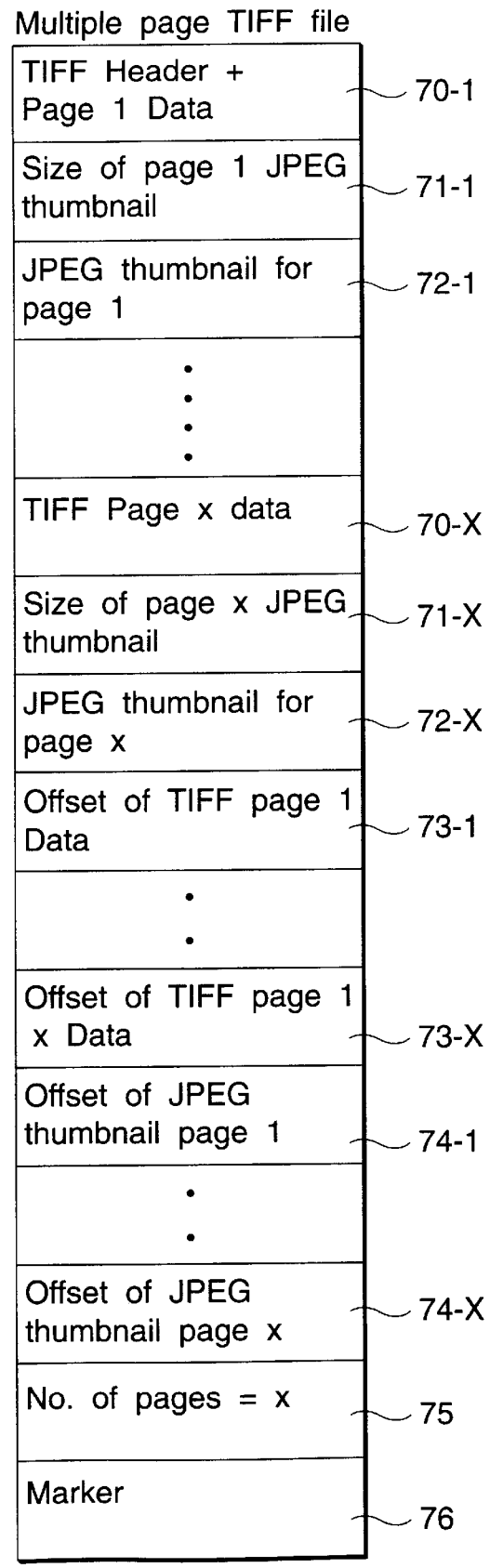
FIG. 40 is a format of a multi-page TIFF file.

FIG. 40 diagrammatically shows a format of a TIFF file (a multi-page TIFF file for storing bit map data of X pages) used in the embodiment. The multi-page TIFF file contains a "TIFF Header+page 1 data area" 70-1 for the bit map data of page 1, a "size of page 1 JPEG thumbnail area" 71-1, a "JPEG thumbnail for page 1 area" 72-1, and "TIFF page n data areas" 70-n allocated repeatedly "X−1" times for the bit map data of pages 2 to X, a "size of page n JPEG thumbnail area" 71-n, and a set of "JPEG thumbnail for page n areas" 72-n, an X number of "offset of TIFF page n data areas" 73-n, an X number of "offset of JPEG thumbnail page n areas" 74-n, a "No. of pages area" 75, and a "marker area" 76. In the multi-page TIFF file, those areas are allocated in this order from its head of those areas, the "TIFF header+page 1 data area" 70-1 corresponds to an area for storing the data of page 1 in the original TIFF file, and hence stores the header and the data of page 1. The next "size of page 1 JPEG thumbnail area" 71-1 is an area for indicating the size of the "JPEG thumbnail for page 1 area" 72-1 subsequent to it. The next "JPEG thumbnail for page 1 area" 72-1 is an area for storing JPEG thumbnail data indicating a rough image of the bit map data stored in the "TIFF header+page 1 data area" 70-1. The "TIFF page n data areas" 70-n are areas for storing the data of page n in the original TIFF file. The next "size of page n JPEG thumbnail area" 71-n is an area for indicating the size of the "JPEG thumbnail for page n areas" 72-n subsequent to it. The "JPEG thumbnail for page n areas" 72-n is an area for storing the JPEG thumbnail data indicating a rough image of the bit map data stored in the "TIFF header+page n data areas" 70-n. The "offset of TIFF page 1 data area" 73-1 to the "offset of TIFF page X data area" 73-X are areas for indicating quantities of offset of the TIFF files of the bit map data of those pages from their head. The "offset of JPEG thumbnail page n areas" 74-n is an area for indicating a quantity of offset of the TIFF file of the "JPEG thumbnail for page n areas" 72-n of the corresponding page number from its head. The next "No. of pages area" 75 is an area for indicating a number of bit map data pieces contained in the TIFF file, and its number is "X". The "marker area" 76 is an area for indicating that the TIFF file has a unique format, and "Color Copy Station" as the name of the copy server 10 is described in this area.

Returning to FIG. 1, the LCD (liquid crystal display) 19 is fit to the upper surface of the copy server 10. The touch panel 18, which form parts of a destination setting section and a copy condition setting section, is superposed on the surface. This LCD 19 is a dot-matrix liquid crystal, monochromatic display panel of bi-level. It is driven by the input/output control unit 12 and displays an operation image generated by the CPU 17.

Figure 35:
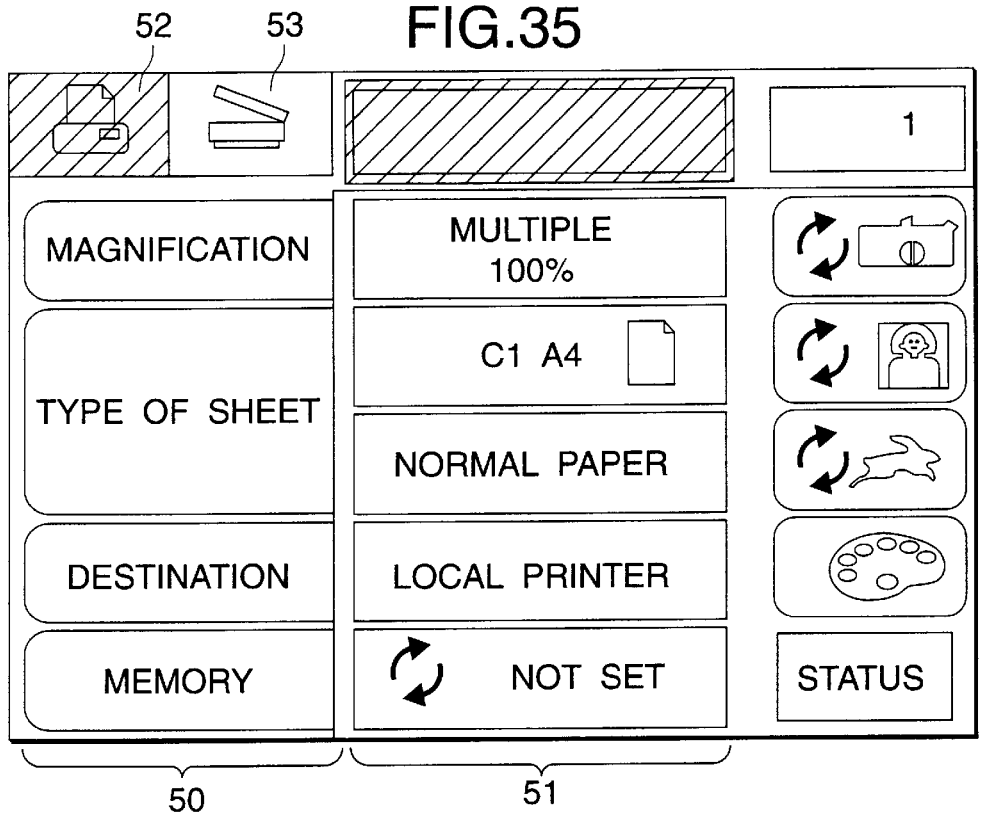
FIG. 35 is a diagram showing a copy mode basic operation user interface displayed on the LCD screen.

FIG. 35 diagrammatically shows an operation display (copy mode basic operation display; referred to as a "copy mode basic operation user interface") presented on the screen of the LCD 19 in an initial state. As shown in FIG. 35, the copy mode basic operation user interface is segmented into three columns; left, center and right columns. Of those columns, the left column 50 contains tabs (magnification, sheet type, destination, and memory) representative of kinds of main parameters. The center column 51 contains the currently set contents of the parameters (in the instance of FIG. 35, those parameters are set such that image data is output, at 100% magnification, onto a normal paper of A4 size set to a local printer, i.e., the printer 21 of the copy system 1). A copy mode button 52 and a scan mode button 53 are presented at the upper left corner on the copy mode basic operation user interface. The copy mode basic operation user interface is presented when the copy server 10 is set in a copy mode. Because of this, the copy mode button 52 is shaded to indicate that the copy mode is set at present.

Figure 36:
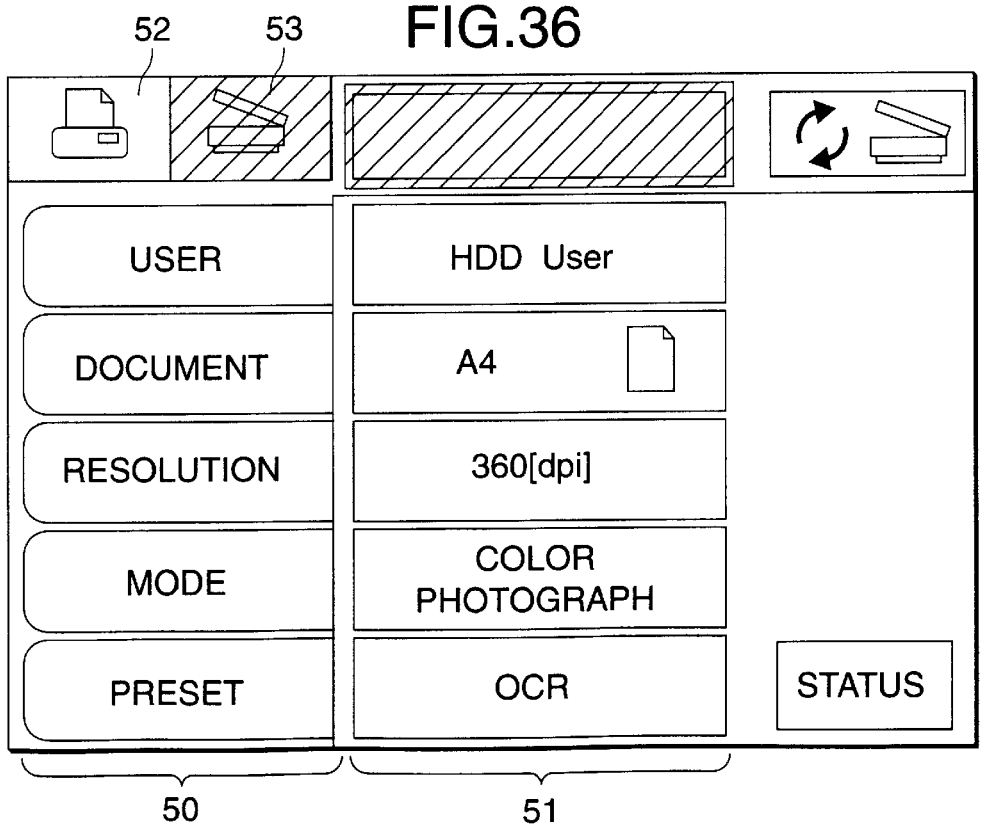
FIG. 36 is a diagram showing a scan mode basic operation user interface displayed on the LCD screen.

FIG. 36 shows an operation display (scan mode basic operation display; referred to as a "scan mode basic operation user interface") which is first presented on the screen of the LCD 19 when the copy server 10 is set in a scan mode. As shown in FIG. 36, the scan mode basic operation user interface is segmented into three columns; left, center and right columns. Of those columns, the left column 50 contains tabs (user, document, resolution, mode and preset) indicating kinds of main parameters. The center column 51 contains the current set contents of the parameters (in the FIG. 36 instance, the parameters are set such that the copy system 1 reads image information on a document of A4 size at 360 dpi of resolution, and stores the readout image information into the hard disc 13 of the copy system). The copy mode button 52 and the scan mode button 53 are displayed at the left upper corner on the scan mode basic operation user interface. Since the copy system is currently in the scan mode, the scan mode button 53 is shaded to show that the current operation mode of the copy system is the scan mode.

Returning to FIG. 1, the touch panel 18 is a pressure sensitive area sensor superposed on the LCD 19. A signal corresponding to a position on the touch panel which is pressed with an operator's finger is input to the input/output control unit 12. To press down a position on the touch panel which corresponds to each item on the LCD 19 will be referred to "to depress the item". When each tab on the basic operation user interface is depressed, a list of choices of the parameter designated by the corresponding tab are displayed in the center column 51 of the copy mode basic operation user interface, under control of the CPU 17. When the scan mode button 53 is depressed in the copy mode basic operation user interface, the copy server 10 is set in the scan mode under control of the CPU 17, and the copy mode basic operation user interface is displayed on the screen of the LCD 19. When the copy mode button 52 is depressed in the scan mode basic operation user interface, the copy server 10 is set in the copy mode under control of the CPU 17, and a copy mode basic operation user interface is displayed on the screen of the LCD 19.

The keyboard 23 includes a start key, ten keys and the like, which are located adjacent to the touch panel 18 on the top surface of the frame of the copy server 10. A signal corresponding to a key depressed by an operator is generated and applied to the input/output control unit 12.

The input/output control unit 12 appropriately drives the LCD 19 in accordance with image data received from the CPU 17. Further, the control unit 12 analyzes a signal received from the touch panel 18 and inputs a corresponding position signal to the CPU 17. Additionally, it analyzes a signal received from the keyboard 23 and a corresponding code signal to the CPU 17.

Figure 2:
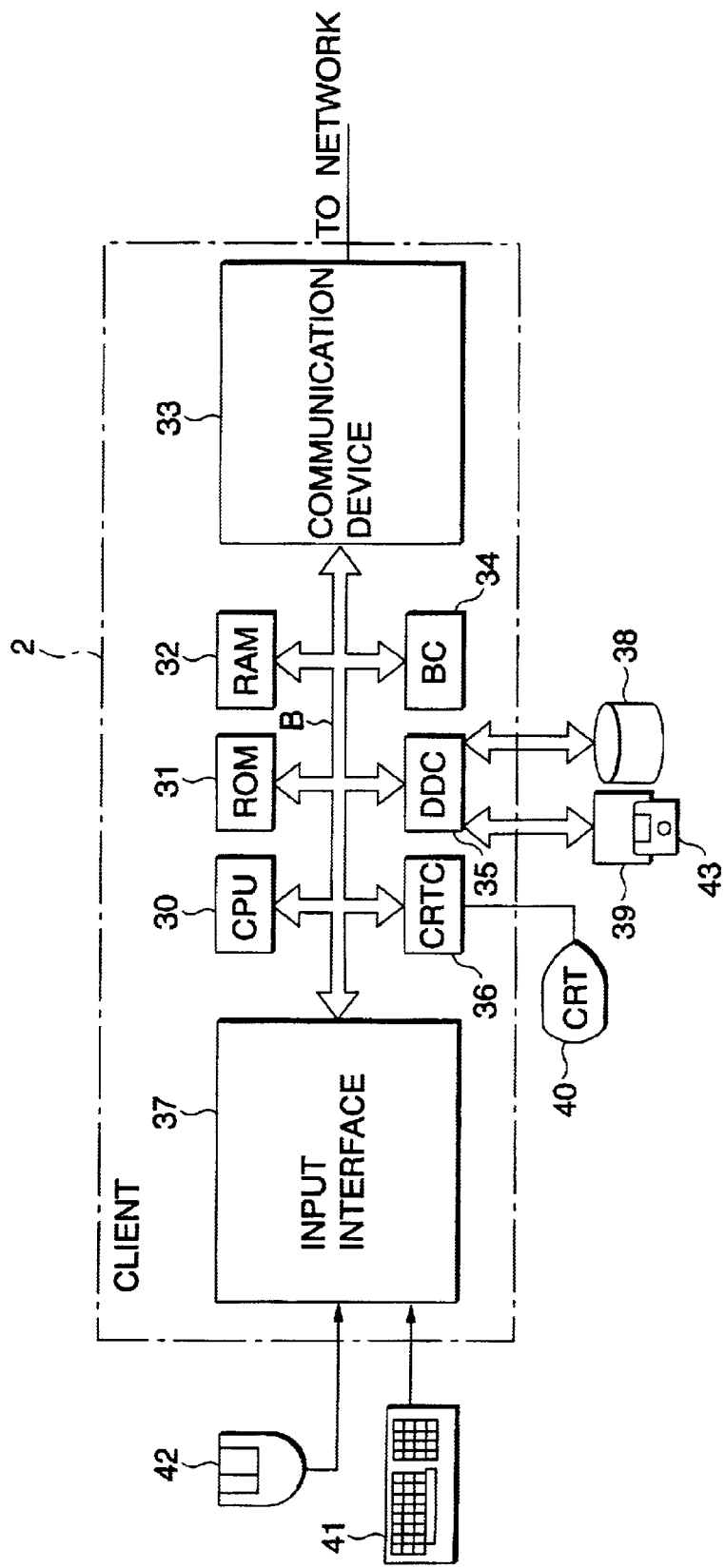
FIG. 2 is a block diagram showing a circuit arrangement of a client terminal shown in FIG. 1.

A hardware arrangement of each of the client terminals 2 will be described with reference to FIG. 2. As shown in FIG. 2, each client terminal 2 is made up of a CPU 30, a ROM 31, a RAM 32, a communication device 33, a bus controller 34, a disc drive controller DDC 35, a display controller 36, and an input interface 37, those being interconnected by a bus B, and a hard disc 38 and a floppy disc drive 39, which are connected to the DDC 35. Further, the client terminal 2 includes a display device 40 connected to the display controller 36, and a keyboard 41 and a computer mouse 42, both being connected to the input interface 37.

The bus controller 34 manages a status of the bus B, and allows data to be transferred among the respective circuits by way of the bus B. The DDC 35 drives each of the disc drives 38 and 39 under control of the CPU 30, to thereby write data into or read data out of the disc (hard disc 38, a floppy disc 43).

The hard disc 38 is given a drive name proper to it. The hard disc 38 stores an operation system program (Windows 95 (trade mark) manufactured by Microsoft corporation) to be executed by the CPU 30, communication programs and web browsers. The hard disc 38 is also segmented into a number of directories logically configured in a tree fashion, like the hard disc 13 of the copy server 10. An image file down loaded from the copy server 10 (10') of any of the copy systems 1 and 1' and an image file received from any of other client terminals 2 may be stored into each directory. A viewer used, if compatible with the multi-page TIFF, can recognize only those areas, the "TIFF header+page 1 data area" 70-1 and the "TIFF page n data areas" 70-n, from the multi-page TIFF file having the FIG. 40 format, which forms the embodiment of the invention. Therefore, the TIFF files shown in FIGS. 39 and 40 are stored as intact into the hard disc 38. However, a general JPEG compatible viewer cannot read the JPEG files having the FIGS. 37 and 38 formats. For this reason, only the "total JPEG data area" 60 is extracted and stored into the hard disc 38.

The display controller 36 which forms a display section causes, under control of the CPU 30, the display device 40 to display various images in accordance with display data that is generated by the CPU 30.

The input interface 37 which forms an input section encodes a signal received from the computer mouse 42 or the keyboard 41, and inputs information that is entered by the user (a signal representative of a depressed key, vector information input by the computer mouse 42, and a click signal input by the computer mouse 42) to the CPU 30.

The CPU 30 is a processor (computer) for entirely controlling the client terminal 2, and functions as a management information request portion, a rough image JPEG file request portion, and an image file request portion. The RAM 32 is a memory used as a work area by the CPU 30. An operation program and a web browser 301 that the CPU 30 reads out of the hard disc 38 are developed into this work area. This CPU 30 reads a BIOS program from the ROM 31 at the time of power on, and executes it to read the operation system program and the web browser from the hard disc 38 and develops them into the RAM 32. Further, it executes the operation system program to control the overall copy server 10 and performs a packet-basis communication between it and the copy server 10 of the copy system 1.

By executing this operation system, the CPU 30 displays a cursor and moves it on the screen of the display device 40 in accordance with vector information input through the input interface 37. When a click signal is input, an item on which the cursor is overlaid at that time on the display screen is specified, and it is recognized that the overlaid item is selected (when the item is a command, its command is input) (corresponding to a part of an input section). In the description to follow, an action to overlay the cursor on an item and to input a click signal in this state will be described simply as "to click the item". When vector information is input during the continuous inputting of a click signal, it is recognized that an object having overlaid on the cursor at the start of the inputting of the click signal is dragged, and that it is dropped onto the item having overlaid on the cursor at the time of the termination of the click signal.

By executing the web browser, the CPU 30 down loads hypertext data ("WebExplore.html" 132) and the class files of the Java Applet 133 from the copy server 10 into the RAM 32, and generates display data to display the contents of the hypertext data ("WebExplore.html" 132), and executes the Java Applet.

When a network NW is a LAN (local area network), a LAN card is used for the communication device 33. When the network NW is an internet, a serial interface, a modem, a LAN card or a DSU is used for the communication device 33.

Figure 3:
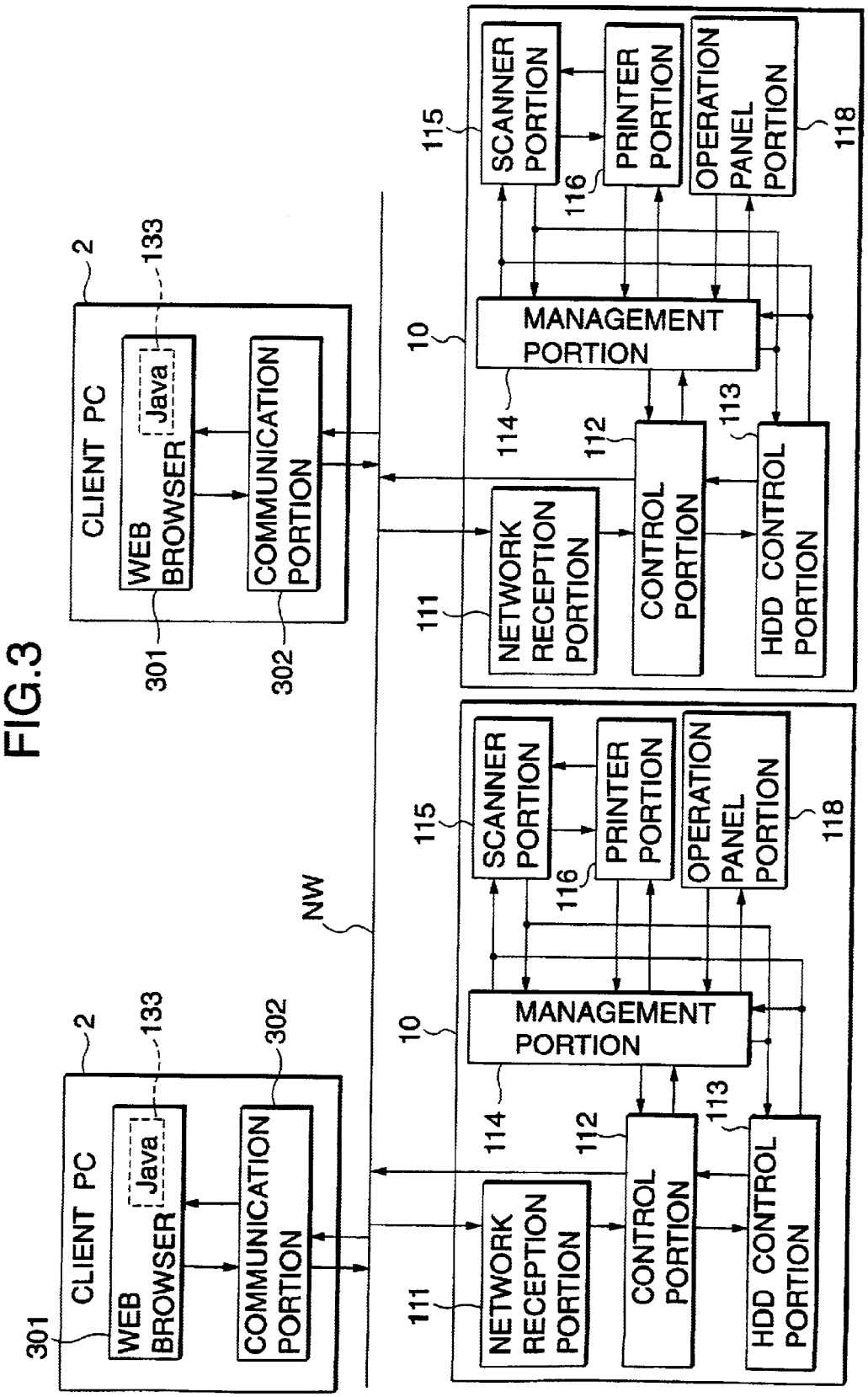
FIG. 3 is a program configuration showing tasks executed by the copy servers and client terminals in the copy systems shown in FIG. 1.

FIG. 3 shows a software configuration showing relationships between tasks and programs when the CPUs 17 of the copy servers 10 of the copy systems 1 and 1' read control programs 131 from the hard discs 13, and develops them into the RAMs 11, and each client terminal 2 reads the operation system and the web browser from the hard disc 38 and develops them into the RAM 32. As shown in FIG. 3, tasks that the CPU 17 of the copy server 10 executes are a network reception portion 111, 25 number of control portions 112 existing in parallel, an HDD control 113, a management portion 114, a scanner portion 115, a printer portion 116, and an operation panel portion 118. Tasks that the CPU 30 of each client terminal 2 executes are the web browser 301 and a communication portion 302. Communication is performed between each copy server 10 and each client terminal 2 in accordance with the TCP/IP protocol. Accordingly, those copy servers 10 and the client terminals 2 are given their own IP addresses, respectively.

Figure 41:
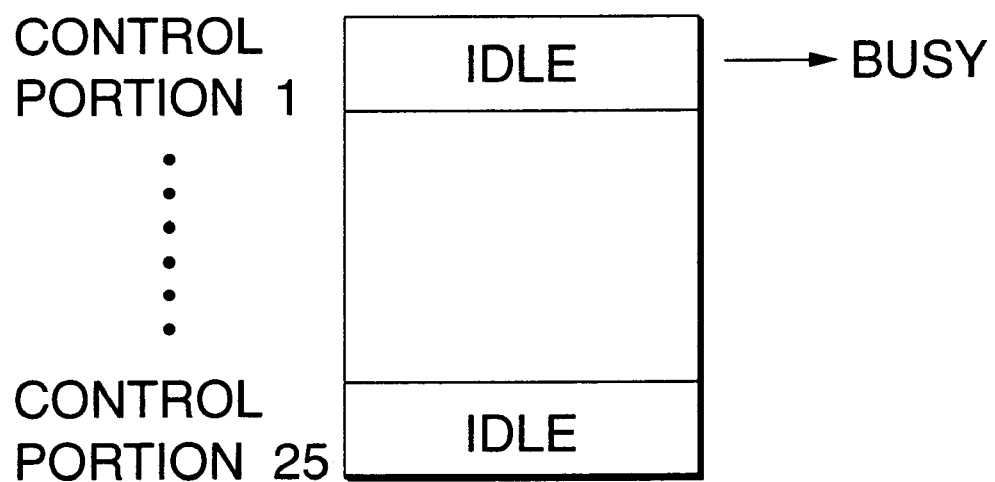
FIG. 41 is a concept diagram showing a control portion management table.

The network reception portion 111 of the copy server 10 is a task for an internet server which controls the network adapter 14 and terminates the TCP/IP protocol and the HTTP (hypertext transfer protocol). When receiving data (URL, various messages) being packed in packets from the network NW, it drives any of the control portions 112 being idle and transfers those data pieces to the driven control portion 112. FIG. 41 is a table constructed in the RAM 11 for managing statuses of the control portions 112, i.e., idle states and busy states (engaging in executing another process). The network reception portion 111 searches for an idle control portion 112 while referring to this table.

Each control portion 112 sends the class files of the Java Applet 133 to the client terminal 2 in accordance with a kind of data received from the network reception portion 111 (corresponding to a program transmitting portion). The control portion 112 responsively sends the management information of image files stored in the hard disc 13 to the client terminal 2 and another or secondary copy system 1' (corresponding to a management information responding portion). The control portion 112 requests the HDD control 113 to down load, copy, retrieve, delete, rename, and read out the image file in the hard disc 13. The control portion 112 stores the image file received from the secondary copy system 1' into the HDD 113, and sends the image file to the client terminal 2 and the copy system 1' (corresponding to a image file transmitting portion). The control portion 112 sends to the secondary copy system a thumbnail file storing JPEG thumbnail data of the image file (corresponding to a rough image JPEG file responding portion). The control portion 112 sends to the secondary copy system 1' requests of down loading, copying, retrieving, deleting, renaming and reading out the image data.

The operation panel portion 118 controls the input/output control unit 12, and generates operation user interface data to be displayed by the LCD 19 and commands the input/output control unit 12 to display the operation user interface on the basis of the generated data. When receiving position data indicative of a depressing position on the touch panel 18 from the input/output control unit 12, the operation panel portion specifies a displayed item overlaid on the depressing position in the operation user interface that is being displayed on the screen of the LCD 19 at that time, and executes a process corresponding to the operated key (viz., it executes a process corresponding to the depressed display item). When receiving a signal indicative of a depressed key of the keyboard 23 from the input/output control unit 12, it executes a process corresponding to the kind of the depressed key. For example, when the copy mode button 52 or the scan mode button 53 is depressed, the operation panel portion 118 informs the management portion 14 of the key depression. When any of the tabs is depressed, it displays a display for selecting a parameter corresponding to the tab depressed. When any of the parameters is depressed, it determines the parameter and stores it. When the start key is depressed, it informs the management portion 114 of the key depression and each parameter held. In accordance with a message from the management portion, the operation panel portion 118 displays on the screen of the LCD 19 a user interface (copy mode basic operation user interface, the scan mode basic operation user interface, etc.) corresponding to a display number specified in the message.

The management portion 114 places the copy system selectively to a copy mode or a scan mode in accordance with the information of the depression of the copy mode button 52 or the scan mode button 53, which is received from the operation panel portion 118. In the copy mode, the management portion causes the scanner portion 115 and the printer portion 116 to perform a copy operation through their control. In the scan mode, it controls the scanner portion 115 to acquire image data, converts the image data into a JPEG file or a TIFF file, and requests the HDD control 113 to store the converted file into the hard disc 13.

The scanner portion 115 as an image reader contains an SCSI driver for controlling the SCSI interface 15 and a scanner driver for controlling the scanner 20. The scanner portion operates the scanner 20 in accordance with an instruction derived from the management portion 114, and receives image data gathered by reading image information on an original document. In the copy mode, the image data received is transferred to the printer portion 116, and in the scan mode, the image data is transferred to the HDD control 113.

The HDD control 113 as an image file storage portion is a task to make an access to the hard disc 13 upon request by the management portion 114 and the control portion 112, and to store, read out, copy, move, retrieve, and delete the image file.

The communication portion 302 of the client terminal 2 controls the network adapter 33 and terminates the TCP/IP protocol and the HTTP (hypertext transfer protocol). It receives data (hyper text data ["WebExplore.html" 132, etc.,], the class files of the Java Applet, and image files, which are transmitted through the network NW while being packed in packets, and transfers them to the web browser 301 (or the Java Applet 133 driven on the web browser 301). Further, it packs into packets data (URL, and various messages) that are sent from the web browser 301 (or the Java Applet 133 driven on the web browser 301) to the copy server 10.

The web browser 301 requests the communication portion 302 to send various data pieces (URL, various messages), in accordance with an instruction that an operator issues by use of the computer mouse 42 or the keyboard 41. In accordance with a hyper text ("WebExplore.html" 132, etc.,) down loaded from any of the servers in accordance with URL, the web browser displays an image on the screen of the display device 40. Further, it develops each class file of the Java Applet into the RAM 32, whereby the Java Applet (program) 133 is reproduced, and displays an image generated by the Java Applet 133.

Of the hyper text, in particular the "WebExplore.html" 132 contains Applet class file names for identifying the class files of the Java Applet 133, information for securing an area for displaying the image generated by the Java Applet 133, and definitions of various parameters given to the Java Applet 133 (e.g., the names of the secondary copy system 1' and the client terminals 2, which are registered as image-file communication parties in the copy server 10 of the copy system 1 which has transmitted the "WebExplore.html" 132, for example). When the web browser 301 sends an URL corresponding to the "WebExplore.html" 132 in the copy server 10 of either of the copy systems 1 and 1', and down loads the "WebExplore.html" 132 and the class file of the Java Applet 133 from the copy server 10, the Java Applet 133 activated performs a communication with the copy server 10 from which those are down loaded, and directly sends a message to that copy server 10 alone.

Figure 42:
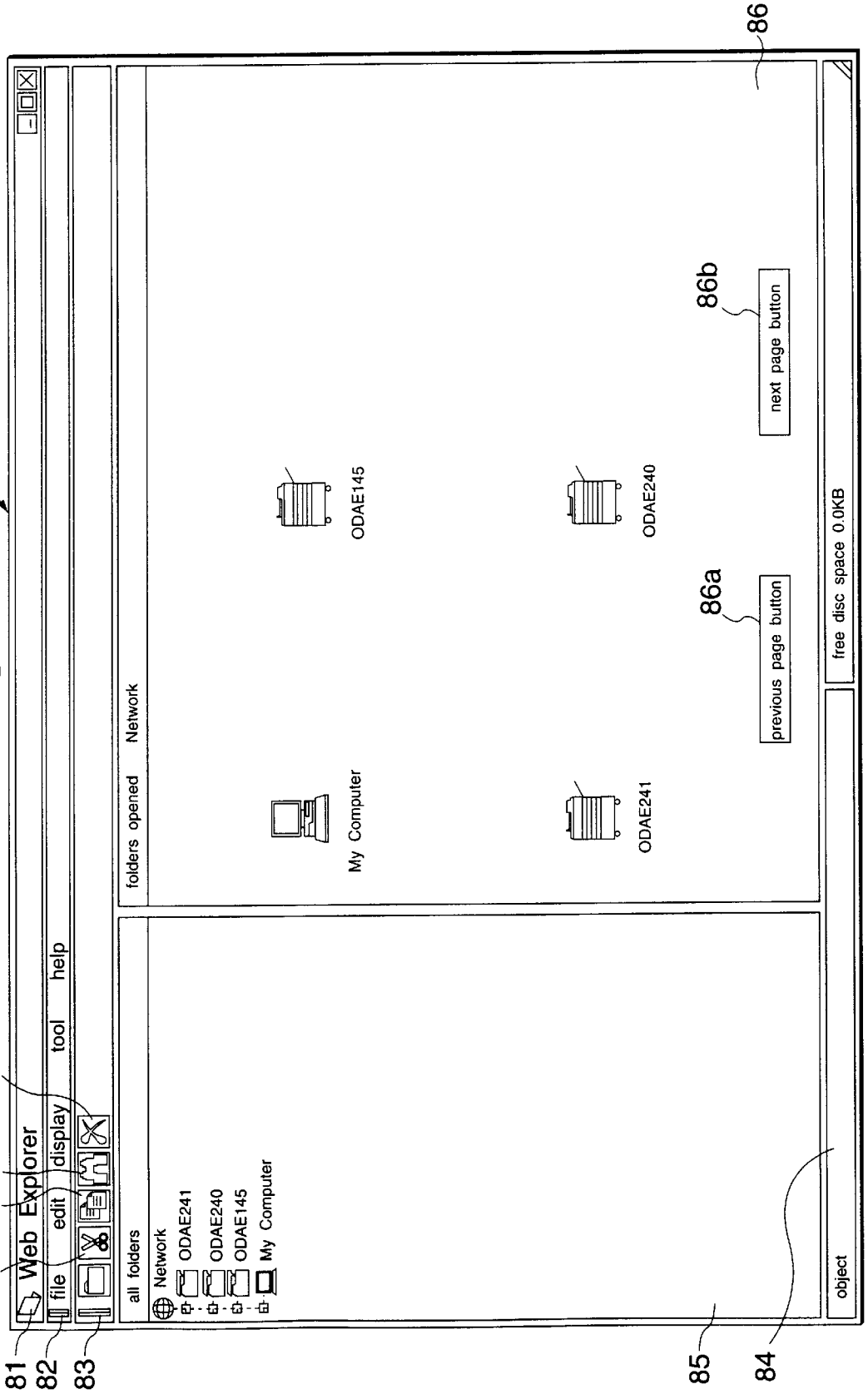
FIG. 42 is a diagram showing an initial display by the Java Applet.

FIG. 42 diagrammatically shows an image (initial dialog box 80 of the WebExplore) that the web browser 301 displays on the screen of the display device 40 in accordance with the "WebExplore.html" 132 and the Java Applet 133. The initial dialog box 80 takes the form of a standard application window by Windows 95 (trade mark by Microsoft corporation). As shown, a title bar 81 extends along the top line in the initial dialog box 80; a menu bar 82 extends along the next line; and a tool bar 83 extends along the line next to the above. A status bar 84 extends along the bottom line in the initial dialog box 80. An area between the tool bar 83 and the status bar 84 is segmented into two windows 85 and 86.

The title bar 81 contains the title "WebExplore" of the Java Applet 133, a normal control box, a minimizing button, a maximizing button, and a close button.

Figure 43:
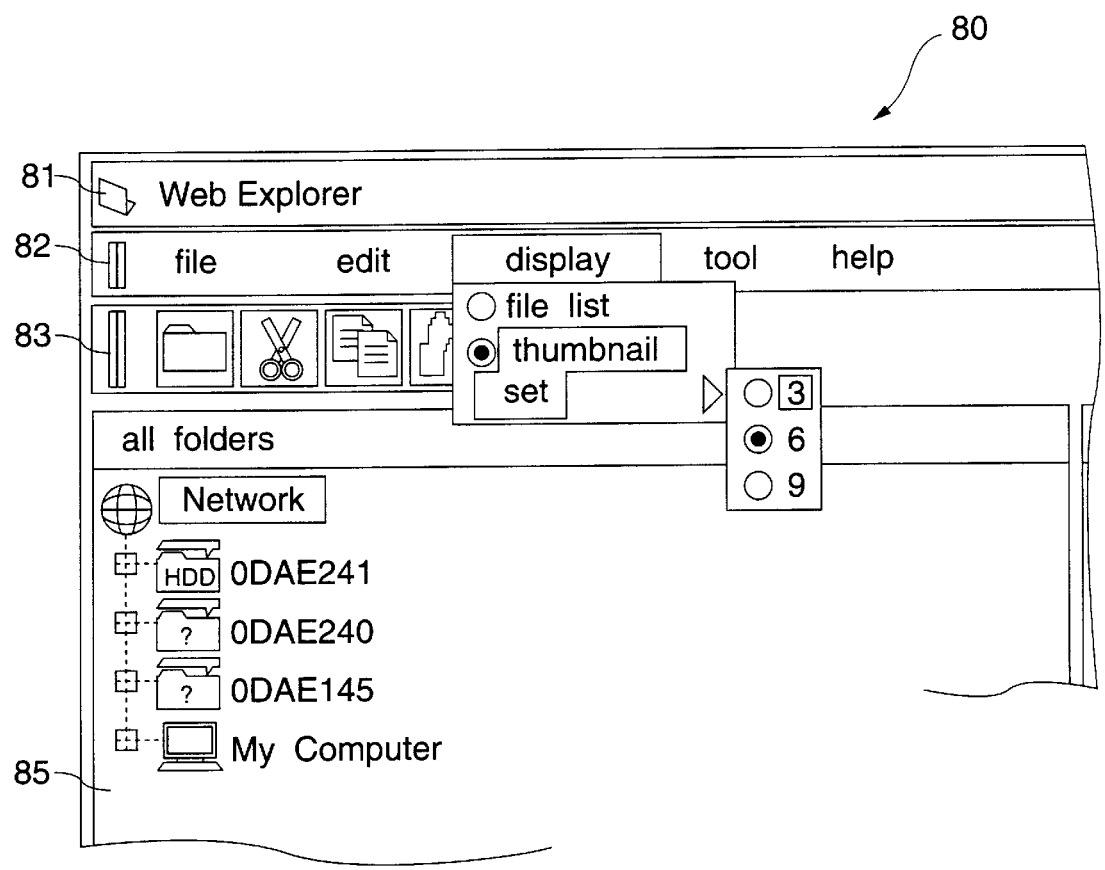
FIG. 43 is a menu bar when a display type is selected and the number of display thumbnails is set.

The menu bar 82 contains items of "file", "edit", "display", "tool", and "help". When the "file" is clicked, a pull down menu containing "delete", "rename" and the like appears. When the "edit" is clicked, a pull down menu containing "copy", "paste" and so on appears. When the "display" is clicked, a pull down menu containing "file list" and "thumbnail" appears as shown in FIG. 43 in an enlarged fashion. When "thumbnail" is clicked on the pull down menu, a menu for choosing one of "3", "6", and "9" is displayed. When the "tool" is clicked, a pull down menu containing "retrieval" and other items is displayed.

The tool bar 83 contains a cut button 83a, a copy button 83b, a retrieval button 83c, a delete button 83d, and the like.

The status bar 84 contains a disc capacity or space that may be used by a selected directory.

The left window 85 contains a tree structure of directory names that the Java Applet 133 may refer to in a state that "Network" is located at the top of the tree. In this window, the self-client terminal 2, the "WebExplore.html" 132, the Java Applet 133, the copy server 10 as the sender of the "WebExplore.html" 132 and the class file of the Java Applet 133, the copy server 10 and the client terminal 2 of the secondary copy system 1', which are registered in the copy server 10 of the sender belongs to one directory. Therefore, the operator can handle the files in the same manner, unconsciously of the type of the device. In an initial state, the left window 85 displays, as the subdirectory of the "Network", the name of the copy server 10 as the sender of the "WebExplore.html" 132, the names of the copy server 10 and the client terminal 2 in the secondary copy system 1', which are registered in the sender copy server 10, and "My Computer" meaning the self-client terminal 2. In the example of FIG. 42, "ODAE241" as the name of the copy server 10 as the sender of sending the "WebExplore.html" 132, and "ODAE240" and "ODAE145" of the names of the copy server 10 of the secondary copy system 1', which are registered in the "ODAE241", and "My Computer" are displayed.

Items displayed in the right window 86 are files of a directory selected by clicking in the left window 85, and an icon corresponding to the subdirectory and its name are enumerated. A previous page button 86a and a next page button 86b are located under the right window 86. Those buttons will be described in detail later.

II. Processes By the Tasks

Figure 4:
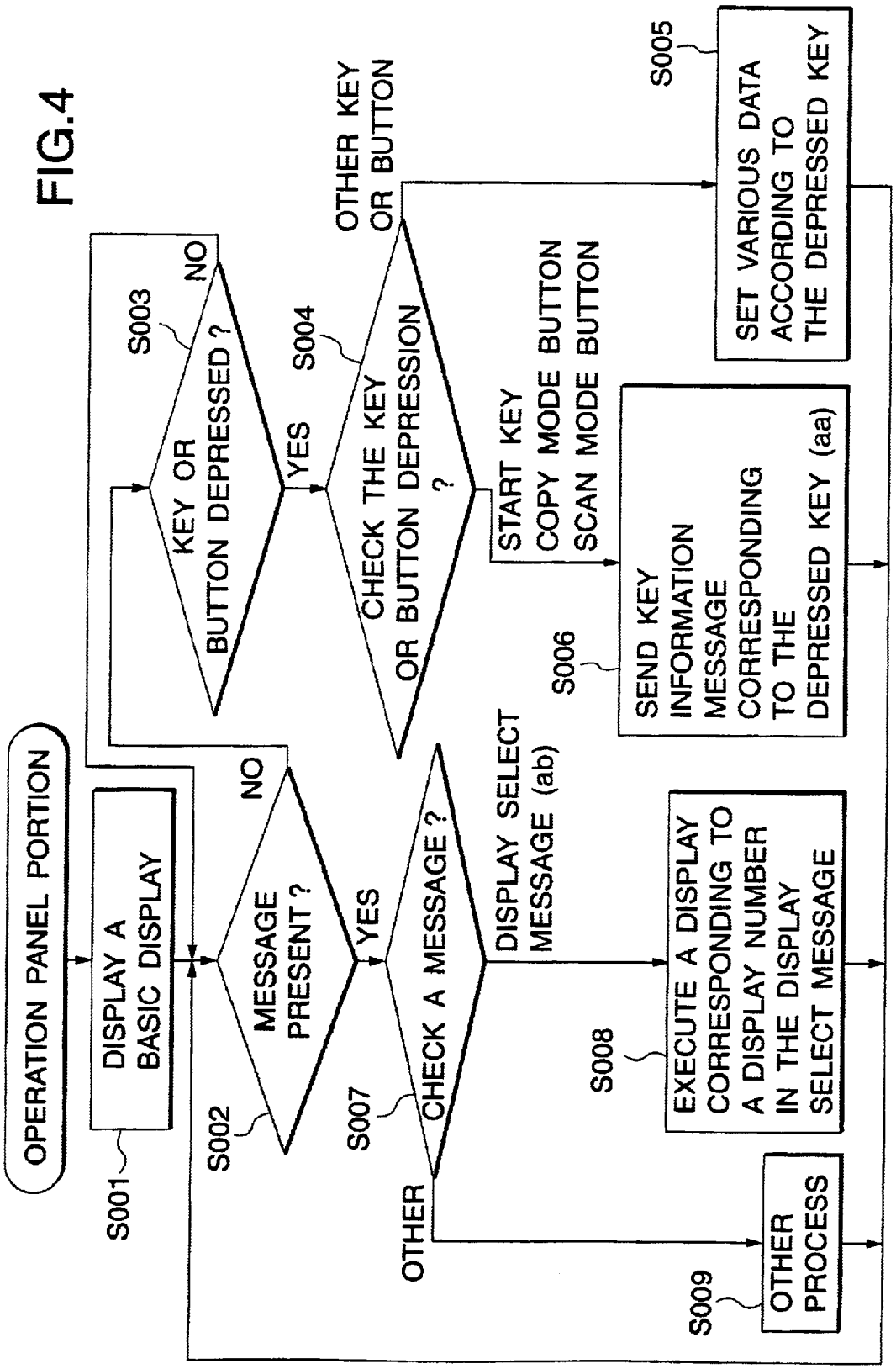
FIG. 4 is a flow chart showing a process executed by a operation panel portion.

The operations of the tasks and the programs will be described in order subsequently.
(1) Operation Panel Portion A process of the operation panel portion 118 will first be described with reference to a flow chart shown in FIG. 4. In a step S001 immediately after the operation panel portion 118 is activated, the task displays a copy mode basic operation user interface shown in FIG. 35 on the screen of the LCD 19.

In the next step S002, the operation panel portion 118 checks if it receives some message from the management portion 114. If not receiving any message, it checks if any of the buttons on the display screen or any of the keys of the keyboard 23 is depressed. If any button or any key is not depressed, it returns to the step S002.

When the copy mode button 52 or the scan mode button 53 on the screen display is depressed during the repeating of the execution of a loop process of the steps S002 and S003, the operation panel portion 118 checks which button or key is depressed. When the start key of the keyboard 23, and the copy mode button 52 or the scan mode button 53 on the screen is depressed, the operation panel portion advances to a step S006. When a key or button other than the above is depressed, it advances to a step S005. In the step S005, a process corresponding to the depressed key or button is executed. When any of the tabs on the copy mode basic operation user interface of FIG. 35 or the scan mode basic operation user interface of FIG. 36 is depressed, a list of choices of the parameters corresponding to the tab depressed is displayed on the center column 51. When a specific set value on the center column 51 is depressed, the choice is set as its parameter in the RAM 11. When the execution of the step S005 ends, the operation panel portion returns to the step S002.

In the step S006, the operation panel portion 118 sends a key information message corresponding to the depressed key or button to the management portion 114. Specifically, when the copy mode button 52 or the scan mode button 53 is depressed, the operation panel portion 118 sends a key information message indicting a kind of the depressed key to the management portion 114. When the start key is depressed, it sends to the management portion 114 a key information message storing the depression of the start key and the set values of the parameters that are currently set in the RAM 11. When the execution of the step S006 ends, the operation panel portion 118 returns to the step S002.

When it is judged that some message is received from the management portion 114 (step S002), the operation panel portion 118 checks the contents of the received message in a step S007. When the received message is a display select message (see S105, S109, S111, S122, S124), the operation panel portion 118 executes the displaying of a display number in the received display select message in S008. When a display number corresponding to the scan mode basic operation user interface is described in the received display select message, the scan mode basic operation user interface is displayed on the screen of the LCD 19. When a display number corresponding to the scan mode basic operation user interface is not described in the received display select message, the copy mode basic operation user interface is displayed on the screen of the LCD 19. Upon completion of executing the step S008, the operation panel portion 118 returns to the step S002.

In a step S009, the operation panel portion 118 executes another process corresponding to the received message. Upon completion of the execution of the step S009, the operation panel portion 118 returns to the step 002.

(2) Management Portion

Figure 5:
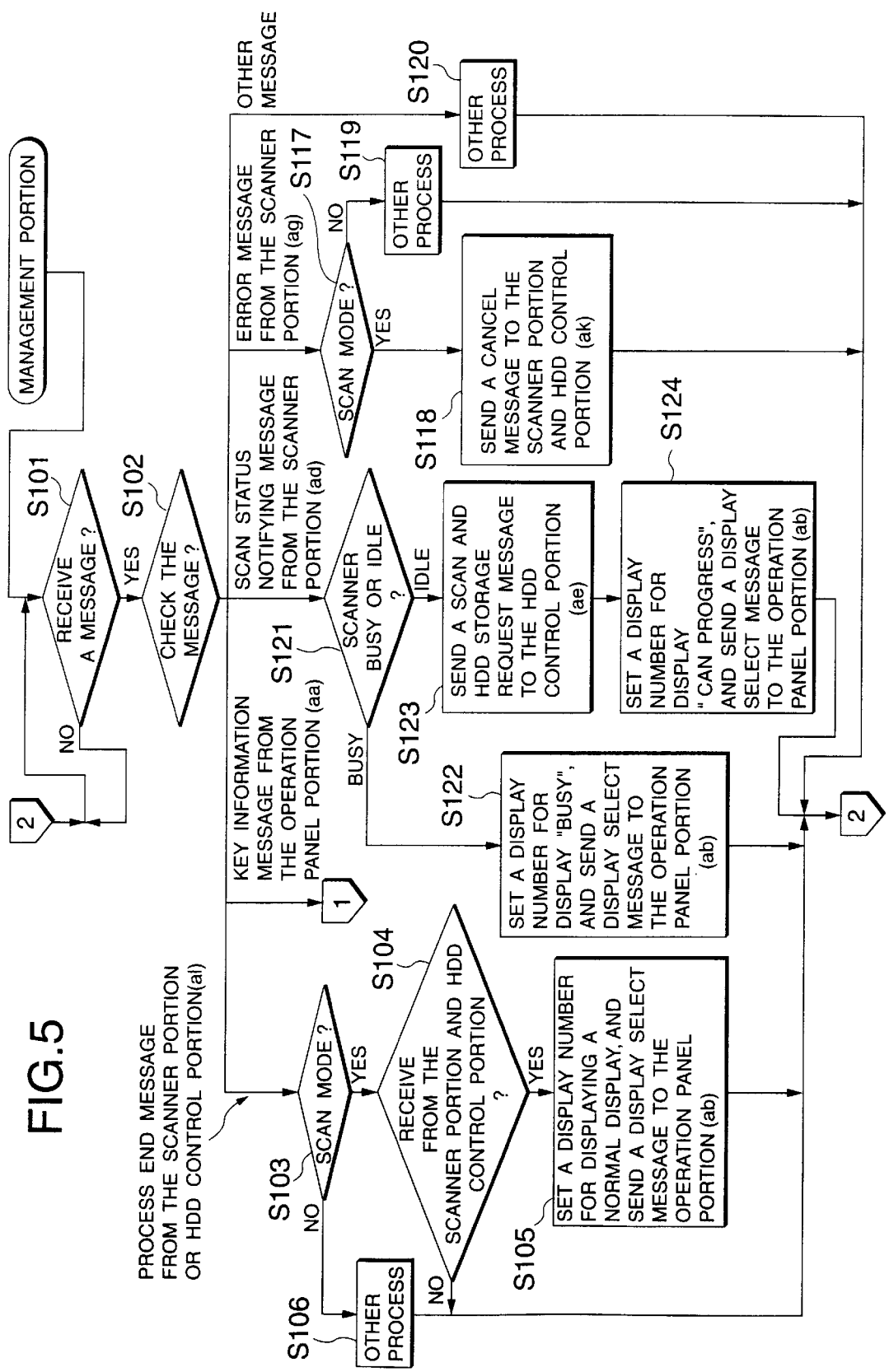
FIG. 5 is a flow chart showing a process executed by a management portion.
Figure 6:
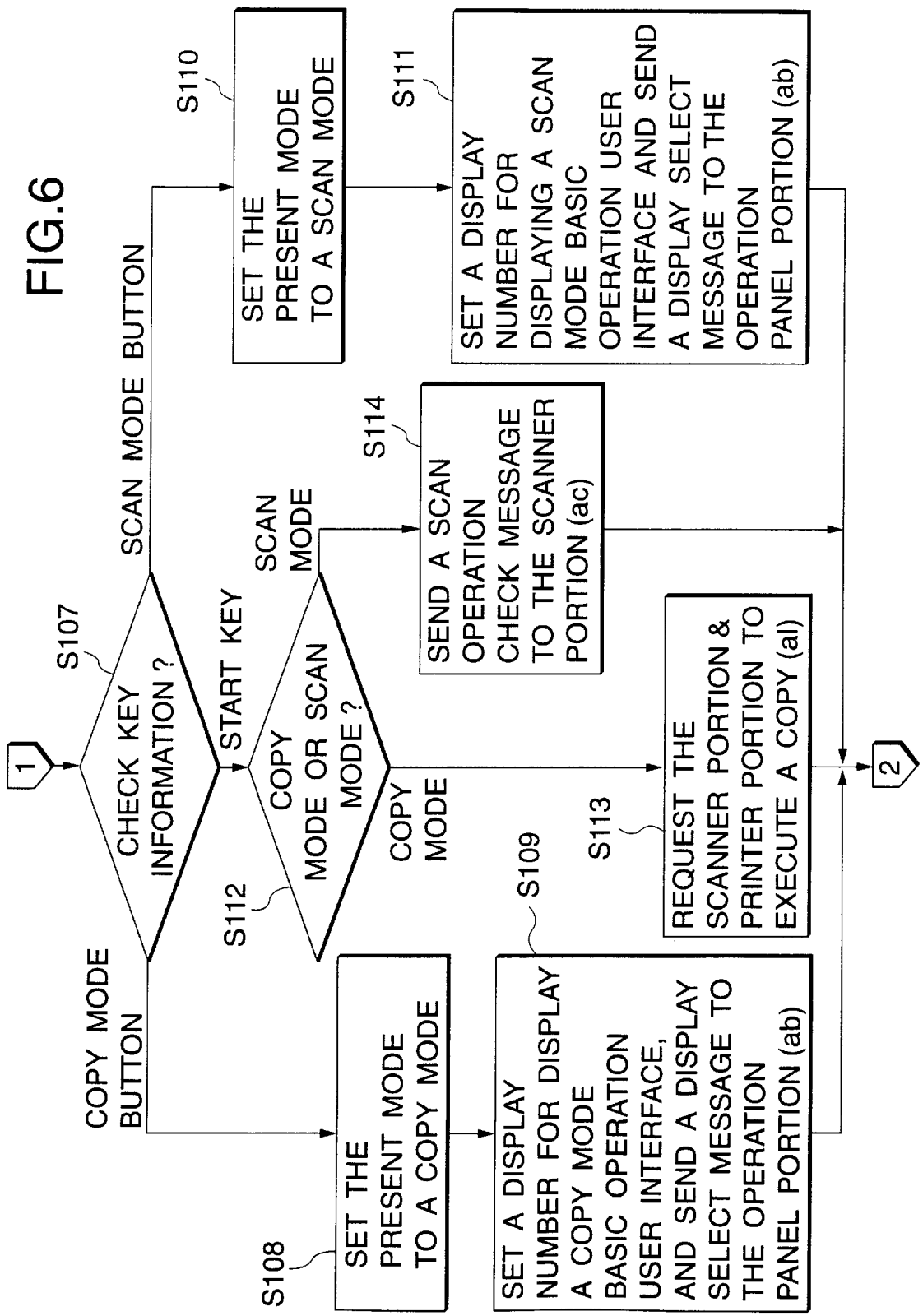
FIG. 6 is a flow chart showing a process executed by a management portion.

Next, a process by the management portion 114 will be described with reference to FIGS. 5 and 6. In a step S101, the management portion 114 waits for a message from the operation panel portion 118, the HDD control 113, the scanner portion 115 or the printer portion 116.

When receiving a message from any of those tasks, the management portion 114 checks a kind of the received message in a step S102. When a key information message is received from the operation panel portion 118 (see S0006), the management portion 114 advances to a step S107. When receiving a process end message from the scanner portion 115 or the HDD control 113 (see S219, S363, S374), it advances to a step S103. When receiving a scanner operation status notifying information from the scanner portion 115 (see S203), it advances to a step S121. When receiving an error message from the scanner portion 115 (see S207), it advances to a step S117, and when receiving another message, it advances to as step S120.

In the step S107, the management portion 114 checks a kind of the depressed key or button contained in the key information message. When information of the depression of the copy mode button 52 is contained, the management portion 114 sets the present mode to a copy mode in the step S108. In the step S109, it sends to the operation panel portion 118 a display select message in which a display number to display the copy mode basic operation user interface (FIG. 35) is set. Upon completion of the step S109 execution, the management portion 114 returns to the step S101.

When the step S107 judges that the depression of the scan mode button 53 is contained, the management portion 114 sets the present set mode to the scan mode in a step S110. In the next step S111, the management portion 114 sends to the operation panel portion 118 a message in which a display number to display the scan mode basic operation user interface (FIG. 36) is sent to the operation panel portion 118. Upon completion of the S111 execution, the management portion 114 returns to the step S101.

When the step S107 judges that the depression of the start key is contained, the management portion 114 checks as to whether the currently set mode is the copy mode or the scan mode in a step S112. When the scan mode is set, the management portion 114 sends a scan operation check message to the scanner portion 115 in a step S114. When the copy mode is set up, the management portion 114, in a step S113, sends a copy execution request to the scanner portion 115 and the printer portion 116, and transfers image data (scan data) obtained from the scanner 20 to the printer portion 116, and activates the printer portion 116 to cause the printer 21 to print according to the scan data. In either case, the management portion 114 returns to the step S101 after the process ends.

In a step S121 executed when the scanner operation status notifying message from the scanner portion 115 is received (S203), the management portion 114 checks whether the scanner contained in the scanner operation status notifying message is busy or idle. When it is busy, the management portion 114 sends to the operation panel portion 118 a display select message in which a display number for displaying a busy status is set, in a step S122. After the step S122 execution, the management portion 114 returns to the step S101.

When it is idle, the management portion 114 a "scan and HDD storage request message" to the HDD control 113 in a step S123. The scan and HDD storage request message contains the parameters stored in the key information message: a document size parameter, a resolution parameter, a storage format parameter (indicates whether it is binary image data, 256-tone level gray scale image data or 24-bit RGB image data, or whether it is stored into a TIFF file or a JPEG file), an optical density parameter, a RGB adjustment parameter, a chroma and hue adjustment parameter, a sheet feed position parameter (indicates whether an original document is located on a flat bed or an ADF of the scanner), and a parameter for designating a one-side scan or a both-side scan.

In the next step S124, the management portion 114 sends a display select message in which a display number for displaying the scanning progress to the operation panel portion 118. After the S124 execution ends, the management portion 114 returns to the step S101.

In a step S103 executed upon receipt of a process end message (see S219, S363, S374) from the scanner portion 115 or the HDD control 113, the management portion 114 checks whether or not the current operation mode of the copy system is the scan mode. When it is not the scan mode (viz., it is the copy mode), the management portion 114 executes a process corresponding to the copy mode and then returns to the step S101.

When the present operation mode of the copy system is the scan mode, the management portion 114 checks whether or not process end messages are received from both the scanner portion 115 and the HDD control 113. When not receiving the messages from both the tasks, the management portion 114 returns to the step S101. When receiving the same, it advances to a step S105. In the step S105, the management portion 114 sends to the operation panel portion 118 a message in which a display number for displaying the ordinary scan mode basic operation user interface (FIG. 36). After the S105 execution ends, the management portion 114 returns to the step S101.

In a step S117 which is executed when an error message is received from the scanner portion 115 (see S207), the management portion 114 checks whether or not the copy system is currently put in the scan mode. When it is not in the scan mode (viz., it is in the copy mode), the management portion 114 executes a process corresponding to the copy mode and then returns to the step S101.

When it is currently put in the scan mode, the management portion 114 sends a cancel message to the scanner portion 115 and the HDD control 113 in a step S118. When the s118 execution ends, the management portion 114 returns to the step S101.

In a step S120 executed when another message is received, the management portion 114 executes a process corresponding to the message. When the S120 execution ends, the management portion 114 returns to the step S101.

(3) Scanner Portion

Figure 7:
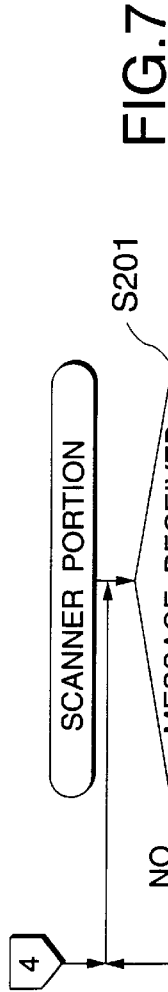
FIG. 7 is a flow chart showing a process executed by a scanner portion.
Figure 8:
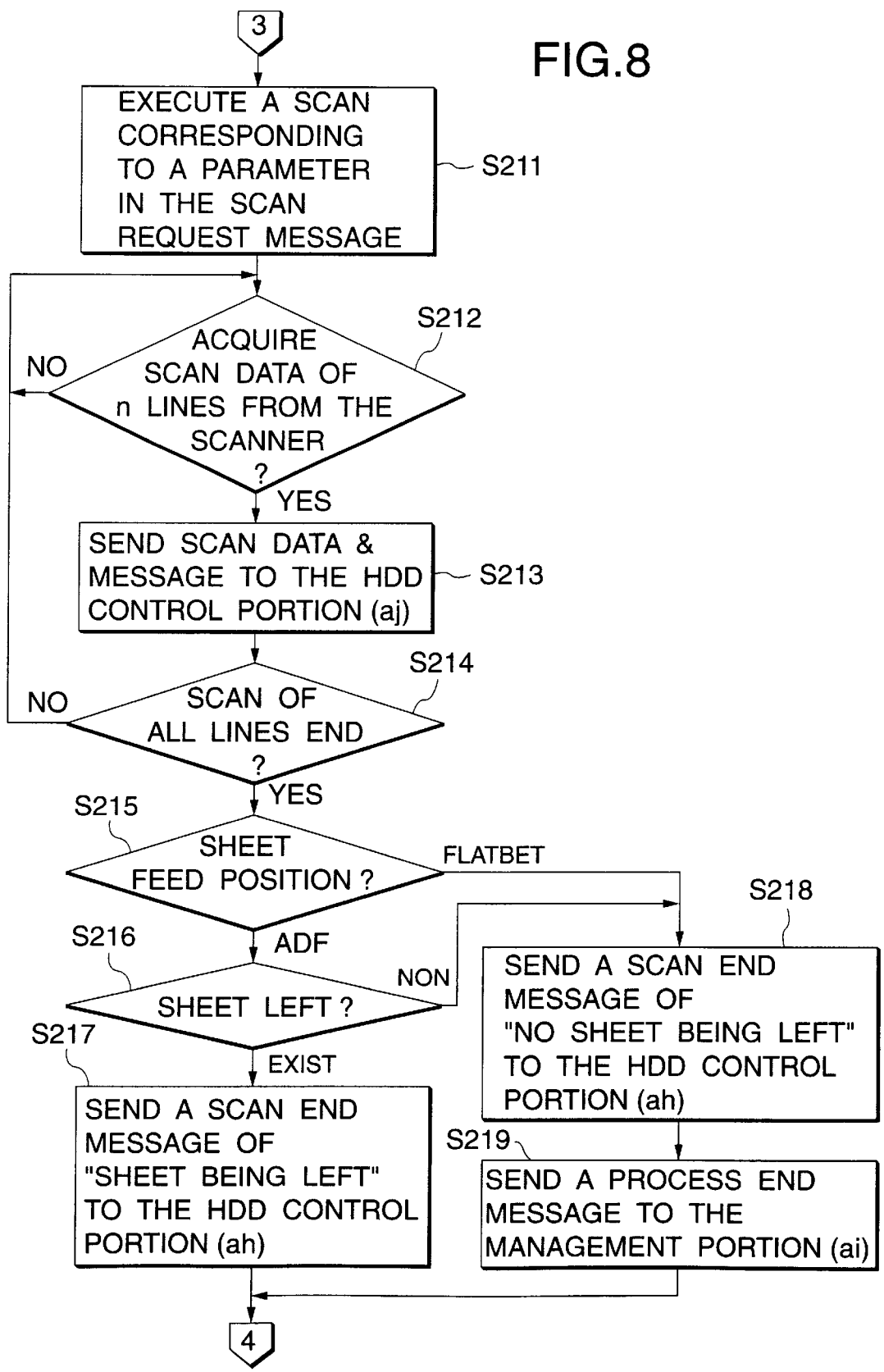
FIG. 8 is a flow chart showing a process executed by a scanner portion.
Figure 9:
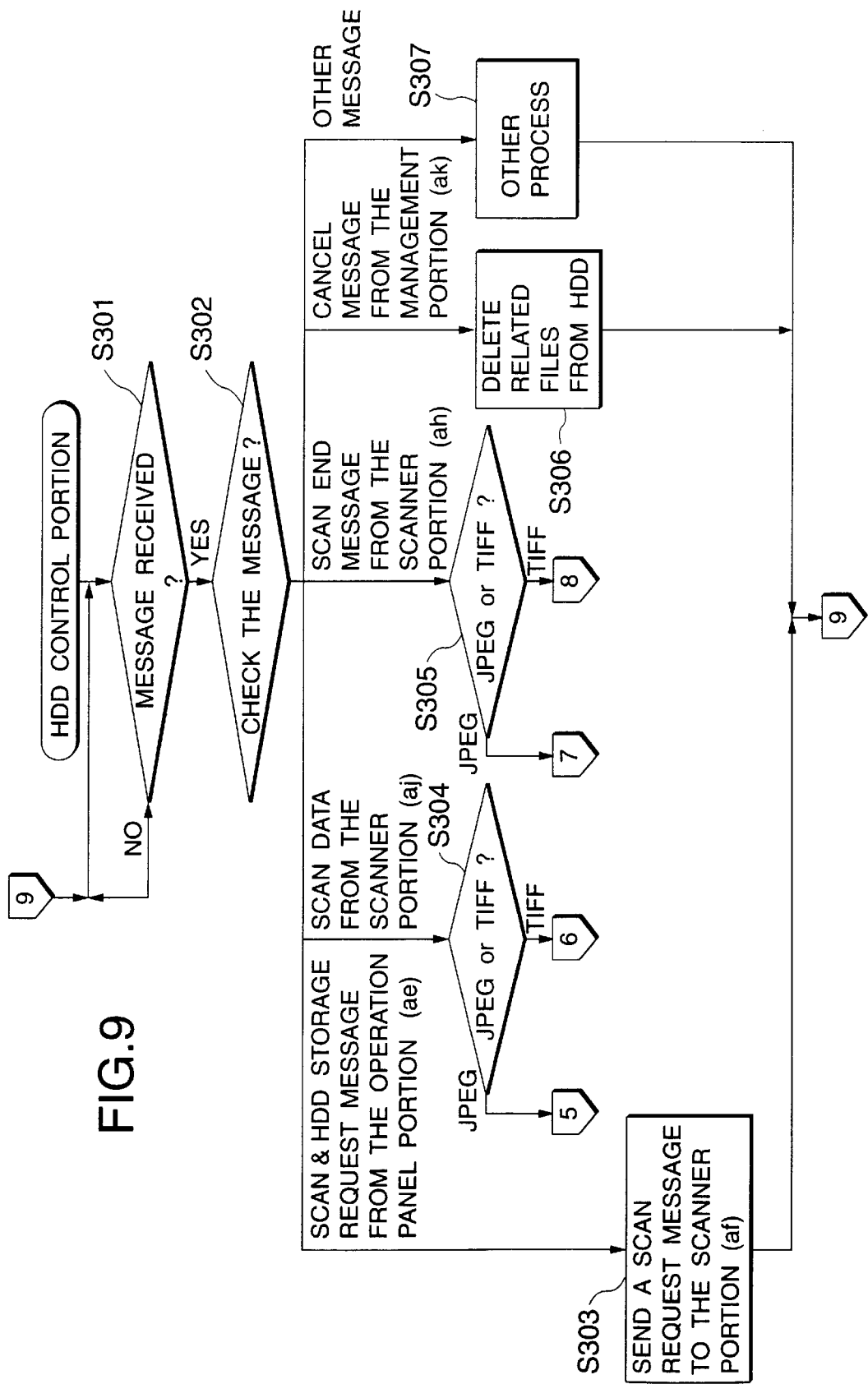
FIG. 9 is a flow chart showing a process executed by an HDD control portion.
Figure 10:
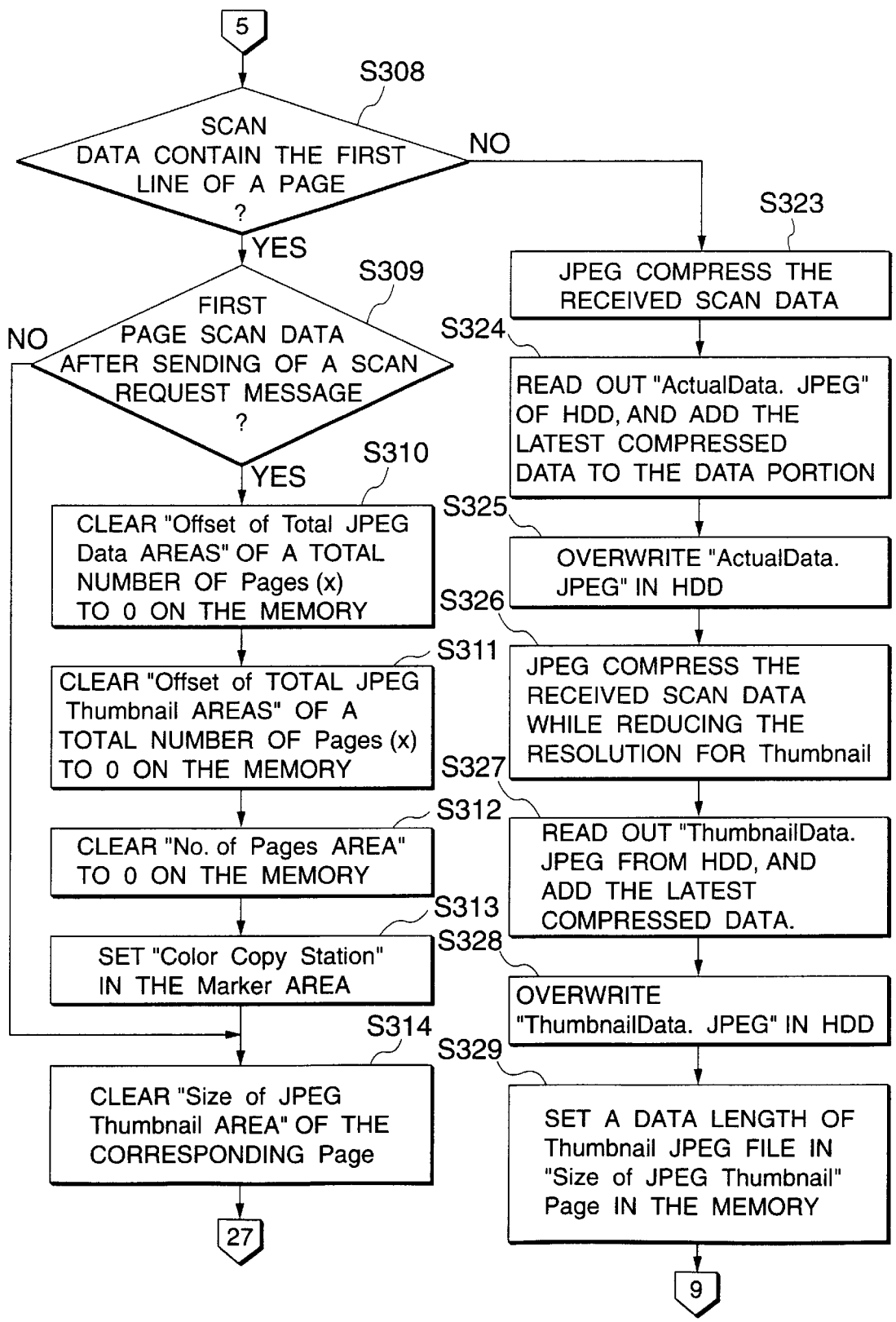
FIG. 10 is a flow chart showing a process executed by the HDD control portion.
Figure 11:
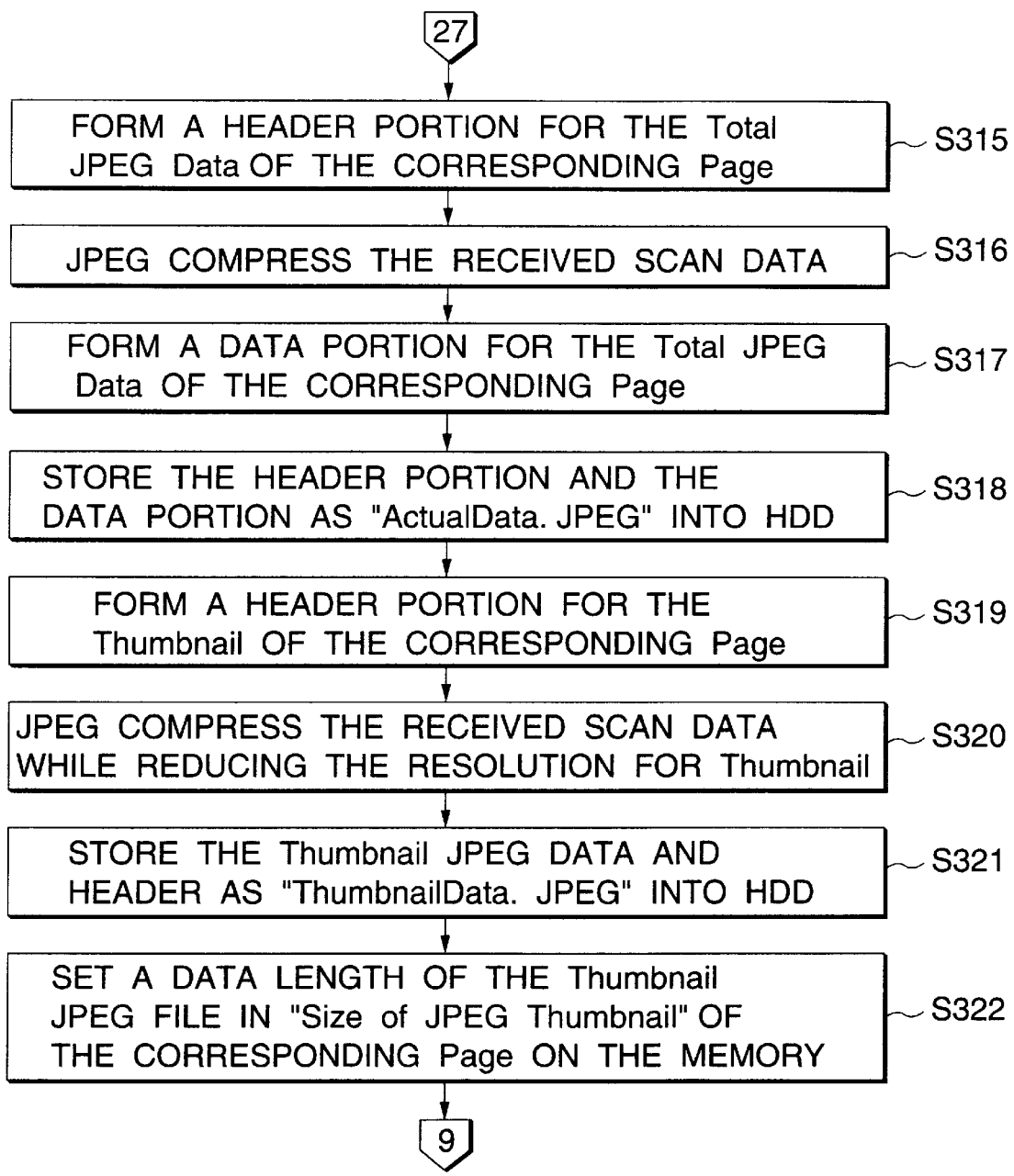
FIG. 11 is a flow chart showing a process executed by the HDD control portion.
Figure 12:
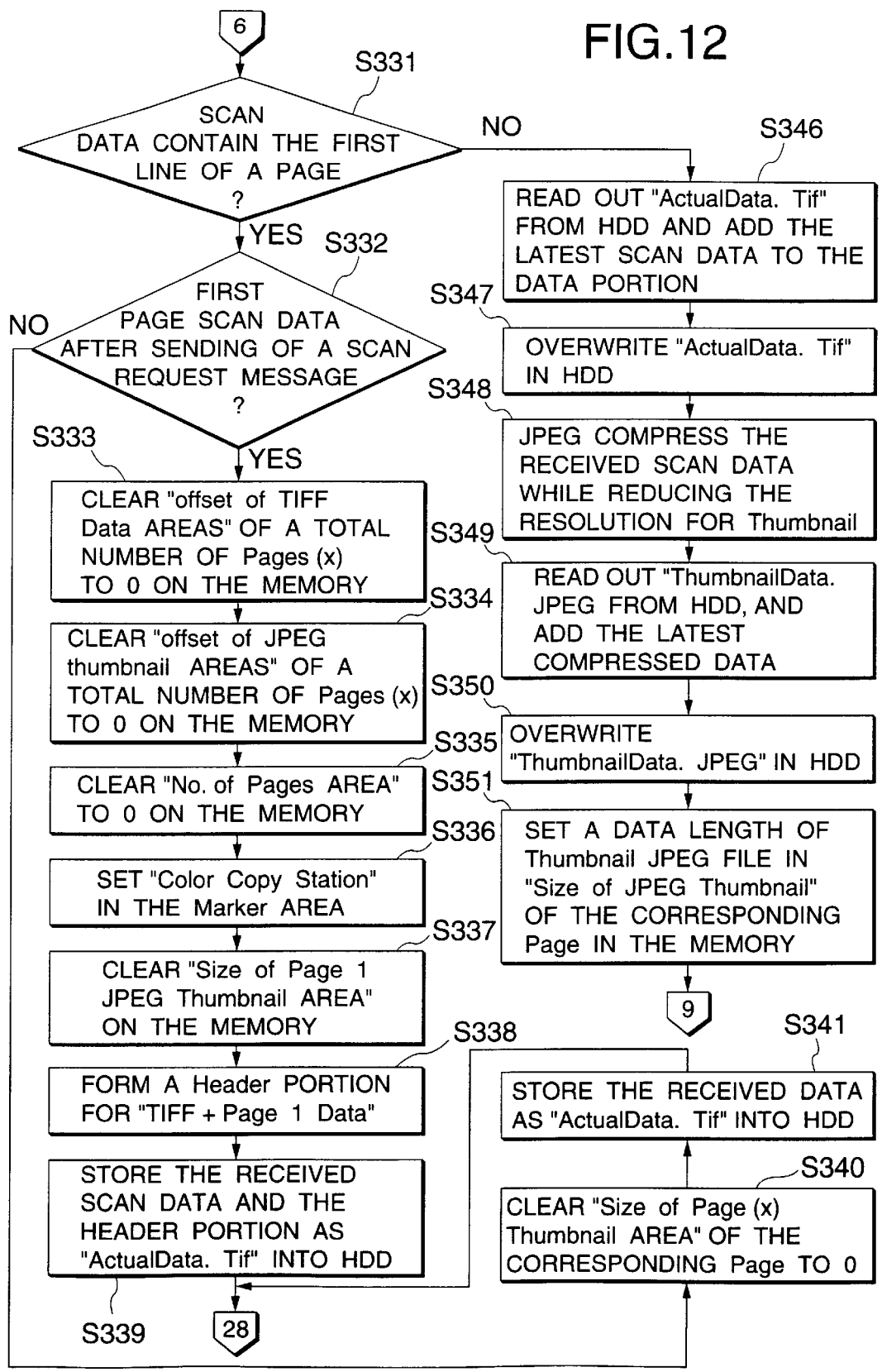
FIG. 12 is a flow chart showing a process executed by the HDD control portion.
Figure 13:
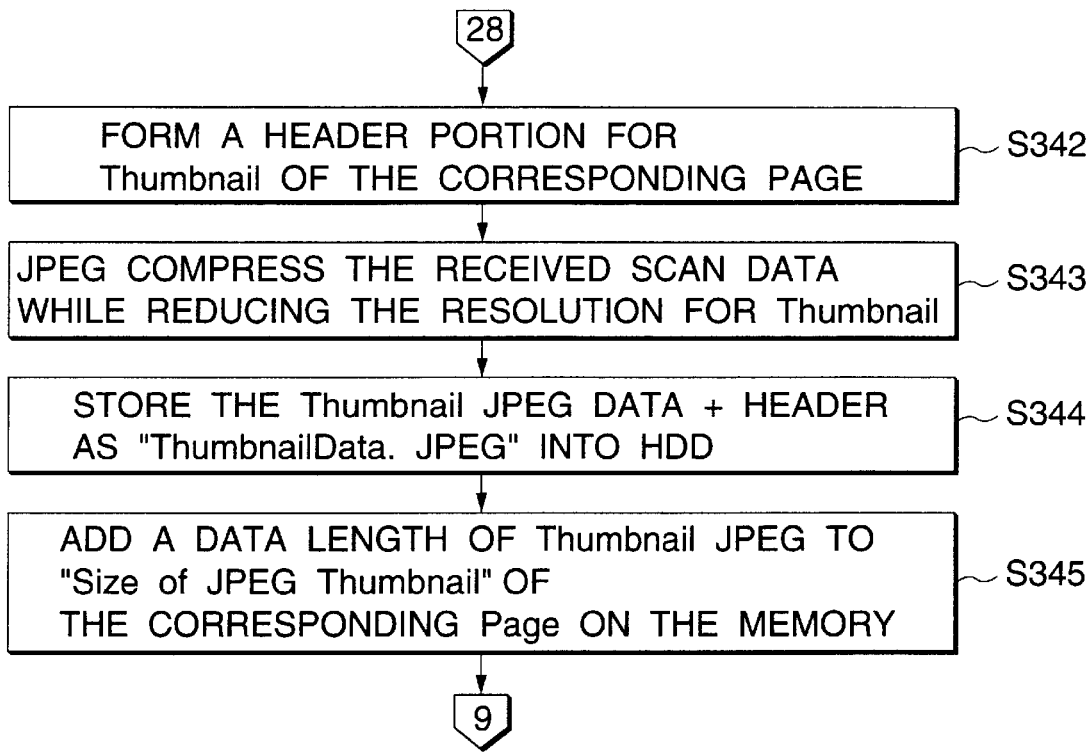
FIG. 13 is a flow chart showing a process executed by the HDD control portion.
Figure 22:
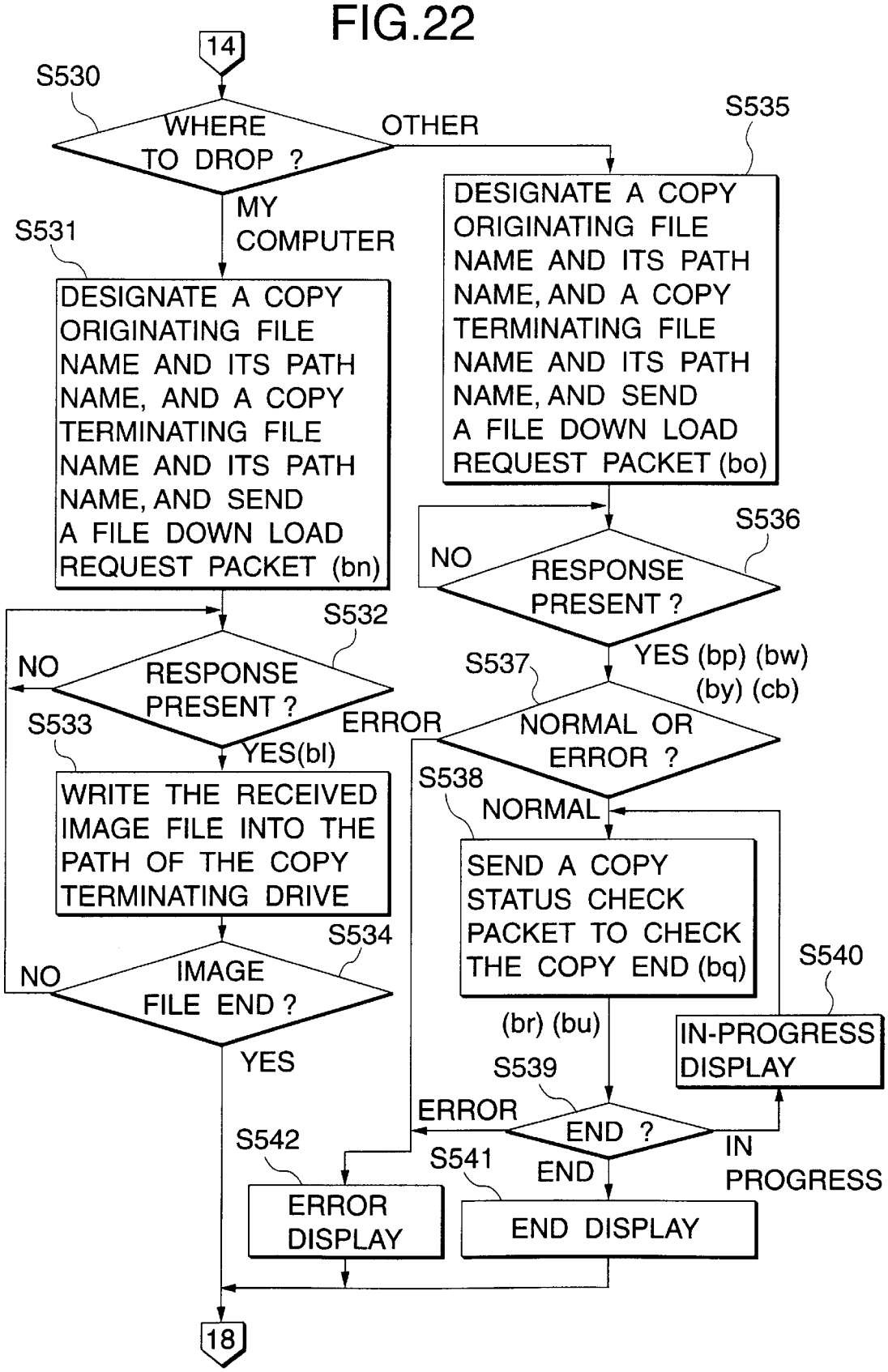
FIG. 22 is a flow chart showing a process executed by the Java Applet.
Figure 23:
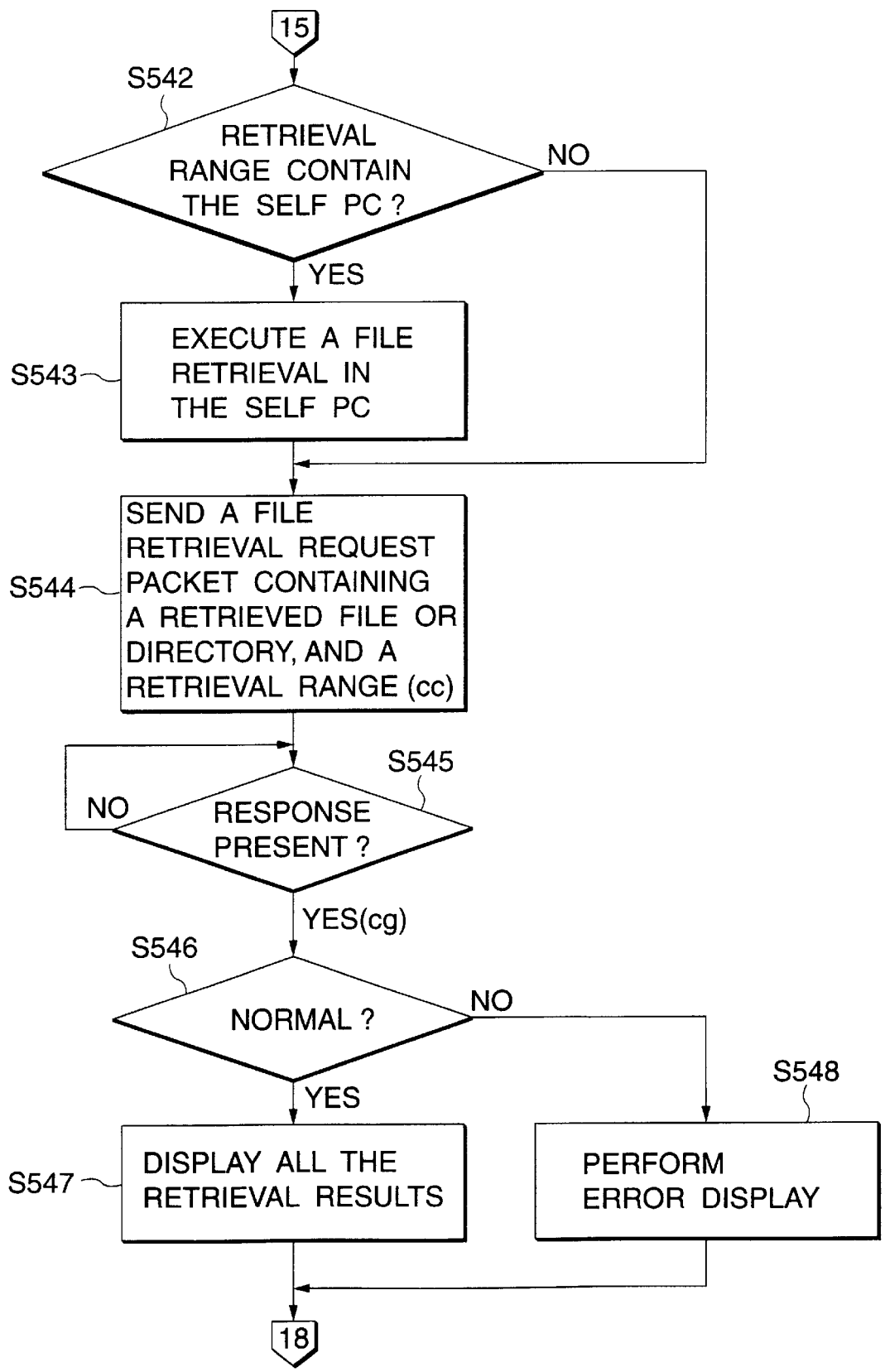
FIG. 23 is a flow chart showing a process executed by the Java Applet.
Figure 24:
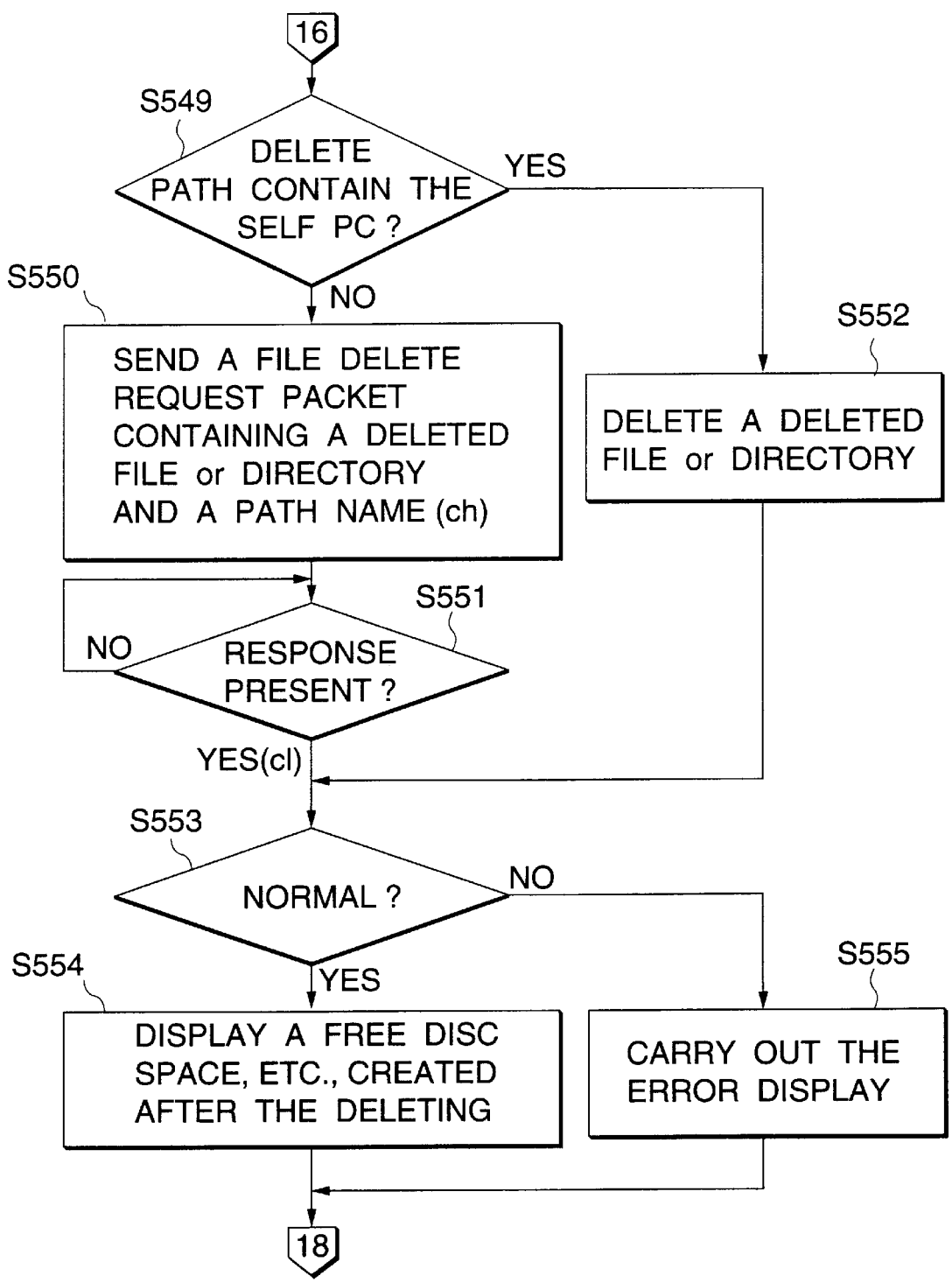
FIG. 24 is a flow chart showing a process executed by the Java Applet.
Figure 25:
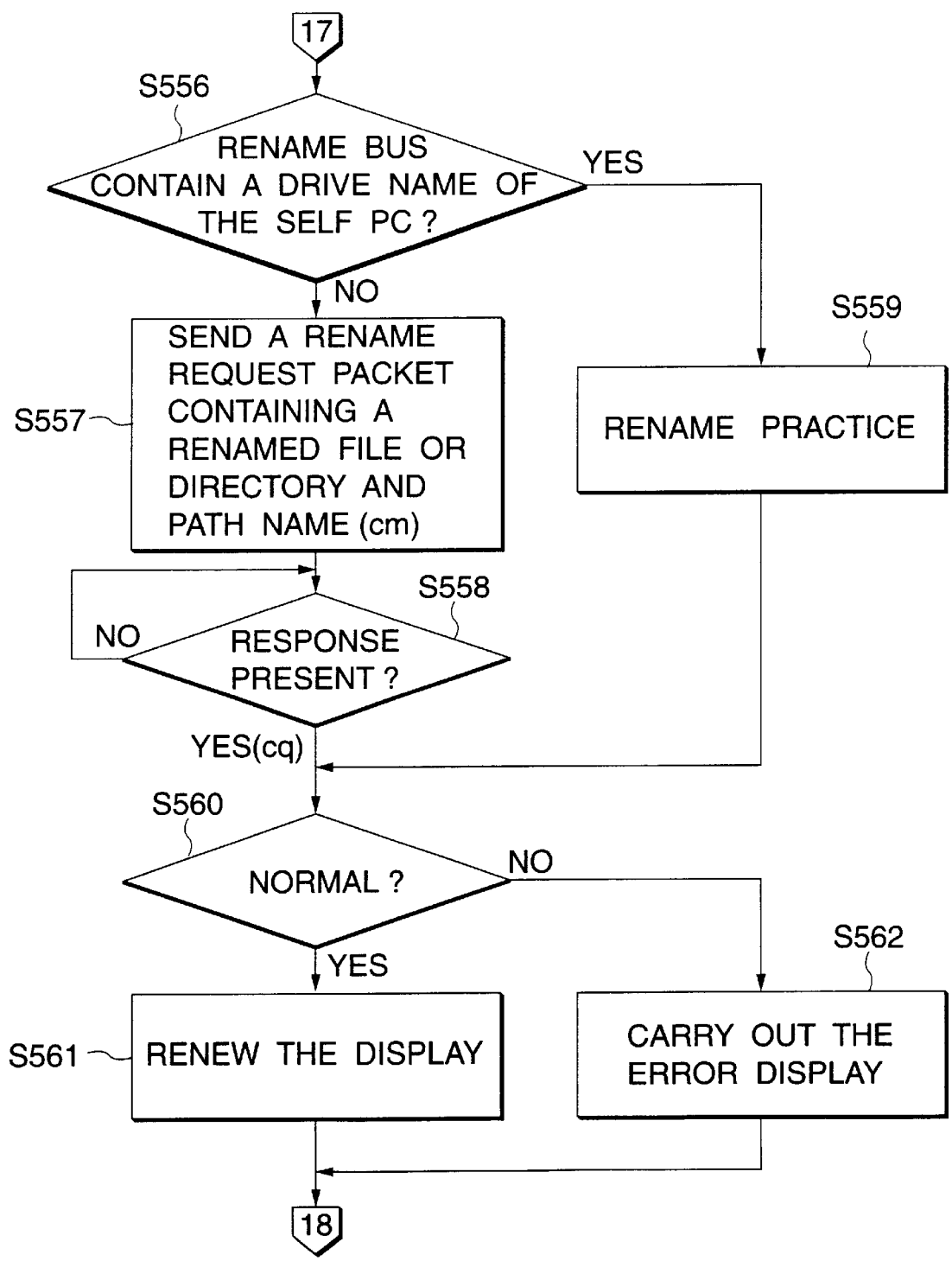
FIG. 25 is a flow chart showing a process executed by the Java Applet.

Next, a process by the scanner portion 115 will be described with reference to FIGS. 7 and 8. The scanner portion 115, in a step S201, waits for a message from the management portion 114 or the HDD control 113.

When receiving a message from either of them, the scanner portion 115 checks a kind of the received message in a step S202. When receiving a scanner operation check request message from the management portion 114 (S114), the scanner portion 115 advances to a step S203. When receiving a scanner request message from the HDD control 113 (see S303), the scanner portion advances to a step S204. When receiving a cancel message from the management portion 114 (see S118), it advances to a step S208. When receiving a copy execution request from the management portion 114 (S113), it proceeds to a step S209. When receiving another message, it advances to a step S210.

In the step S203, the management portion 114 checks whether or not the scanner 20 is operating (busy) or waiting (idle), and sends a scanner operation status notifying message in which the check result is set to the management portion 114. When the S203 execution ends, the scanner portion 115 returns to the step S201.

When receiving a scan request message from the HDD control 113, the scanner portion 115 checks whether a sheet feed position of the printer 21 is on a flat bed or an ADF (automatic document feeder). When the sheet feed position is on the flat bed, he scanner portion 115 directly advances to a step S211. When it is the ADF, the scanner portion 115, in a step S205, checks whether or not an original document is located. When the original is not located, the scanner portion 115, in a step S 207, sends an error message attached with reason (no original) to the management portion 114. Upon completion of the S207 execution, the management portion 114 returns to the step S201. When an original is put on the ADF, the management portion 114 controls the scanner 20 such that it feeds an original document set to the ADF to a sheet read position. After completion of the S206 execution, the management portion 114 goes to a step S211.

In a step S21, the management portion 114 controls the scanner 20, whereby it executes a scan defined by the parameters in the scan request received from the HDD control 113.

In the next step S212, the management portion 114 waits for the acquisition of scan data (binary image data, 256-tone-level gray scale image data or 24-bit RGB image data) of "n" number of lines from the scanner 20. When it acquires the scan data of "n" lines, the management portion 114 goes to a step S213.

In a step S21, the management portion 114 stores the n-line scan data acquired from the scanner 20 into a message, and sends it to the HDD control 113.

In the next step S214, the scanner portion 115 checks if a sheet of an original document has scanned for all the lines. If not yet, the scanner portion 115 returns to the step S212. When the original is scanned for all the lines, the scanner portion 115 advances to a step S215.

In the step S215, the scanner portion 115, like the step S204, checks if the sheet feed position is on the flat bed or the ADF (automatic document feeder). When the sheet feed position is on the flat bed, the scanner portion 115 advances to a step S218. When it is on the ADF, the scanner portion 115 checks if the original document has been set on the ADF is still left thereon in the step S216. When it is left there, the scanner portion 115 sends a scan end message of "sheet being left" to the HDD control 113, and returns to the step S201. When it is not left, the scanner portion 115 goes to a step S218.

In the step S218, the scanner portion 115 sends a scan end message of "no sheet being left" to the HDD control 113. In the next step S219, the scanner portion 115 sends a process-end message to the management portion 114. Upon completion of the S219 execution, the scanner portion 115 returns to the step S201.

In the step S208 executed upon reception (see step S118) of a cancel message from the management portion 114, the scanner portion 115 stops the operation of the scanner 20, and returns its status to an idle status. Upon completion of the S208 execution, the scanner portion 115 returns to the step S201.

In the step S209 executed upon receipt (S113) of a copy request from the management portion 114, the scanner portion 115 causes the scanner 20 to read out image information on an original document, and acquires scan data from the scanner, and transfers the acquired scan data terminates to the printer portion 116, and returns to the step S201.

In the step S210 executed when the message is received, the scanner portion 115 executes a process corresponding to the message. Upon completion of the step S210, the scanner portion 115 returns to step S201.

(4) HDD Control Portion

A process by the HDD control portion 113 will be described with reference to FIGS. 9 through 15. The HDD control portion 113 waits for a message from the management portion 114 or the scanner portion 115.

When receiving some message, the HDD control portion 113 checks a kind of the received message in the next step S302. When receiving a "scan and HDD storage request" message from the management portion 114 (S123), the HDD control portion advances to a step S303. When receiving scan data from the scanner portion 115 (S213), the HDD control portion advances to a step S304. When receiving a scan end message from the scanner portion 115 (see S217 and S218), the HDD control portion advances to a step S305. When receiving a cancel message from the management portion 114 (S118), the HDD control portion 113 advances to a step S306. When receiving another message, it advances to a step S307.

In the step S303, the HDD control portion 113 sends a scan request message to the scanner portion 115. The scan request message stores as intact the parameters stored in the "scan and HDD storage request": a document size parameter, a resolution parameter, a storage format parameter, an optical density parameter, a RGB adjustment parameter, a chroma and hue adjustment parameter, a sheet feed position parameter, and a parameter for designating a one-side scan or a both-side scan. Upon completion of the S303 execution, the HDD control portion 113 returns to the step S301.

In the step S304 executed upon receipt of scan data from the scanner portion 115 (S213), the HDD control portion 113 checks whether a file designated by the storage format parameter stored in the "scan and HDD storage request" message from the management portion 114 is the JPEG file or the TIFF. When the JPEG file is designated, the HDD control portion advances to step S308. When the TIFF file is designated, the HDD control portion advances to a step S331.

In the step S308, the HDD control portion 113 checks if the received scan data is that containing the first page on a certain page. If it contains the first page on a certain page, the HDD control portion 113 advances to a step S309.

In the step S309, the HDD control portion 113 checks if it receives the scan data of the first page after it sends the scan request message to the scanner portion 115 in the step S303. When receiving scan data of the second page or the subsequent one, the HDD control portion 113 advances to a step S314. When receiving the first page scan data, it advances to a step S310.

In the step S310, the HDD control portion 113 clears to 0 the areas corresponding to "Offset of total JPEG data areas 63-1 to X corresponding to the total pages of original documents in the work area provided on the RAM 11 (viz., sets 0 to the numerical values).

In the next step S311, the HDD control portion 113 clears to 0 the areas corresponding to "Offset of JPEG thumbnail areas 64-1 to X corresponding to the total pages of original documents in the work area provided on the RAM 11 (viz., sets 0 to the numerical values).

In the next step S312, the HDD control portion 113 clears to 0 the area corresponding to the "No. of pages area" 65 in the work area of the RAM 11 (viz., it sets 0 to the numerical value).

In the next step S313, the HDD control portion 113 sets "Color Copy Station" the area corresponding to the "marker area" 66 in the work area of the RAM 11, and advances to a step S314.

In the step S314, the HDD control portion 113 clears to 0 the area corresponding to the "size of JPEG thumbnail area" 61 in the work area of the RAM 11 (viz., it sets 0 to the numerical value).

In the next step S315, the HDD control portion 113 forms a header portion to be stored into the "total JPEG data area" 60 for a page corresponding to the received scan data.

In the next step S316, the HDD control portion 113 JPEG compresses the received scan data.

In the next step S317, the HDD control portion 113 forms a data portion to be stored in the "total JPEG data area" 60 for a page corresponding to the received scan data on the basis of the JPEG compressed data, in a step S316.

In the next step S318, the HDD control portion 113 merges the header portion formed in the step S315 and the data portion formed by the step S317 into a JPEG file, and give the JPEG a temporary file name "Actual Data. JPG" and stores it into the root of he image file area 134 in the hard disc 13.

In the next step S319, the HDD control portion 113 forms a header portion to be stored into the "JPEG thumbnail area" 62 for a page corresponding to the received scan data.

In the next step S320, the HDD control portion 113 JPEG compresses the received scan data while reducing its resolution for the thumbnail.

In the next step S321, the HDD control portion 113 merges the header portion formed in the step S319 an the JPEG data by the JPEG compressing process into a JPEG file, and attaches a temporary name "ThumData. JPG" to the JPEG file and stores it into the root to the image file area 134 in the hard disc 13.

In the next step S322, the HDD control portion 113 sets a data length of the JPEG file for thumbnail that is formed in the step S321, in an area corresponding to the "size of JPEG thumbnail area" 61 for a page corresponding to the received scan data, which exists in the work area provided on the RAM 11. Upon completion of the S322 execution, the HDD control portion 113 returns to the step S301.

When the step S308 judges that the received scan data is not the scan data containing the first line of any of pages, the HDD control portion 113 advances to a step S323. In the step S323, the HDD control portion 113 JPEG compresses the received scan data.

In the next step S324, the HDD control portion 113 reads out the JPEG file "ActualData.JPG" from the image file area 134 of the hard disc 13, and adds the compressed JPEG data to the data portion.

In the next step S325, the HDD control portion 113 overwrites the ActualData.JPG" added in the step S324 into the hard disc 13.

In the next step S326, the HDD control portion 113 JPEG compresses the received scan data while reducing its resolution for the thumbnail.

In the next step S327, the HDD control portion 113 reads out the JPEG file "TbumbData. JPG from the image file area 134 of the HDD control portion 113 and adds the JPEG data compressed in the step S326 to the data portion.

In the next step S328, the HDD control portion 113 overwrites the JPEG file "TbumbData. JPG added in the step S326 on the hard disc 13.

In the next step S329, the HDD control portion 113 sets the JPEG file overwritten in the step S328 in an area corresponding to the "size of JPEG thumbnail area" 61 for a page corresponding to the received data. Upon completion of the S329 execution, the HDD control portion 113 returns to the step S301.

In a step S331, the HDD control portion 113 checks if the received scan data is the scan data containing the first line of a certain page. If it the scan data containing the first line of a certain page, the HDD control portion 113 returns to the step S332.

In the step S332, the HDD control portion 113 checks if it receives the scan data of the first page after the scan request message is sent to the scanner portion 115 in the step S303. When it receives scan data of the second page and the subsequent ones, the HDD control portion 113 advances to a step S340. When it receives the scan data of the first page, the HDD control portion 113 advances to a step S333.

In the step S333, the HDD control portion 113 clears to 0 the areas corresponding to the "offset of TIFF data areas" 73-1 to X of the total pages of an original in the work area provided on the RAM 11 (viz., it sets 0 to the numerical values).

In the next step S334, the HDD control portion 113 clears to 0 the areas corresponding to the "offset of JPEG thumbnail areas" 74-1 to X of the total pages of an original in the work area provided on the RAM 11 (viz., it sets 0 to the numerical values).

In the next step S335, the HDD control portion 113 clears to 0 the area corresponding to the "No. of pages area" 75 in the work area provided on the RAM 11 (viz., it sets 0 to the numerical values).

In the next step S336, the HDD control portion 113 sets "Color Copy Station" in the area corresponding to the "marker area" 66 in the work area provided on the RAM 11.

In the step S337, the HDD control portion 113 clears to 0 the area corresponding to the "size of JPEG thumbnail area" 71-1 for the first page in the work area provided on the RAM 11 (viz., it sets 0 to the numerical values).

In the next step S338, the HDD control portion 113 forms a header portion to be stored in the "TIFF header+page 1 data area" 70-1 for the first page.

In the next step S338, the HDD control portion 113 merges the received scan data and the header portion formed in the step S338 into a TIFF file, and attaches a temporary file name "ActualData. Tif" to the TIFF file and stores the resultant into the root of the image file area 134. Upon completion of the S339 execution, the HDD control portion 113 advances to a step S342.

In a step S340, the HDD control portion 113 clears to 0 the area corresponding to the "size of page n JPEG thumbnail area" 71-n corresponding to the received scan data in the work area provided on the RAM 11 (viz., it sets 0 to the numerical values).

In the next step S341, the HDD control portion 113 converts the received scan data to the format of the TIFF file, and attaches a temporary file name "ActualData·Tif" and stores the resultant into the root of the image file area 134. Upon completion of the S341 execution, the HDD control portion 113 advances to a step S342.

In the step S342, the hard disc 13 forms a header portion to be stored into the "JPEG thumbnail areas 72-1 to X for age corresponding to the received scan data.

In the next step S343, the HDD control portion 113 JPEG compresses the received scan data while reducing its resolution for the thumbnail.

In the next step S344, the HDD control portion 113 merges the header portion formed in the step S342 and the JPEG data compressed in the step S342 into a JPEG file, and temporary name "ThumbDat.JPEG" to the JPEG file and stores it in the root of the image file area 134 in the hard disc 13.

In the next step S345, the HDD control portion 113 sets a data length of the JPEG file for the thumbnail formed in the step S344 in the areas corresponding to the "size of JPEG thumbnail areas" 71-1 to X for a page corresponding to the received scan data. Upon completion of the S345 execution, the HDD control portion 113 returns to the step S301.

When the step S331 judges that the received scan data is not the scan data containing the first line of a certain page, the HDD control portion 113 advances to a step S346. In this step, the HDD control portion 113 reads out the TIFF file "ActualData·Tif" from the image file area 134 of the hard disc 13, and adds the received scan data into its data portion.

In the next step S S347, the HDD control portion 113 overwrites the TIFF file "ActualData·Tif added in the step S346 into the hard disc 13.

In the next step S348, the HDD control portion 113 JPEG compresses the received scan data while reducing its resolution for the thumbnail.

In the next step S349, the HDD control portion 113 reads out the JPEGfile "TbumbData. JPG" from he image file area 134 of the hard disc 13, and adds the JPEG data compressed in the step S348 to its data portion.

In the next step S350, the HDD control portion 113 overwrites the JPE file ThumbData. JPG" added in the step S349 into the hard disc 13.

In the next step S351, the HDD control portion 113 sets a data length of the JPEG file overwritten in the step S350 in the areas corresponding to the "size of JPEG thumbnail areas" 71-1 to X for a page corresponding to the received scan data, in the work area provided on the RAM 11. Upon completion of the S351 execution, the HDD control portion 113 returns to the step S301.

In the step S305 executed upon reception of the scan end message from the scanner portion 115 (see S217 and S218), the HDD control portion 113 checks which of the JPEG file or the TIFF file is designated by the storage format parameter stored in the "scan and HDD storage request" from the management portion 114. When the JPEG file is designated, it advances to a step S352, and when the TIFF file is designated, it advances to a step S364.

In the step S352, the HDD control portion 113 sets a proper value of an offset quantity of the "total JPEG data area" 60 for the page (total data length of "total JPEG data area" 60 of the total pages previous to that page, "size of JPEG thumbnail area" 61 and the "JPEG thumbnail area" 62) to an area corresponding to the "Offset of total JPEG data area" 63 for the scan ended page the work area provided on the RAM 11.

In the next step S353, the HDD control portion 113 sets a proper value of an offset quantity of the "offset of JPEG thumbnail area" 64 for the page (total data length of "total JPEG data area" 60 of the total pages previous to that page, "size of JPEG thumbnail area" 61 and the "JPEG thumbnail area" 62+total data length of the "total JPEG data area" 60 and the "size of JPEG thumbnail area" 61) to an area corresponding to "offset of JPEG thumbnail area" 64 for the scan ended page the work area provided on the RAM 11.

In the next step S354, the HDD control portion 113 increments by one a value of the area corresponding to the "No. of pages area" 65 in the work area provided on the RAM 11.

In the next step S356, the HDD control portion 113 checks which of "sheet being left" or "no sheet being left" is left in the received scan end message. When the "sheet being left" is set, it advances to a step S357. When "no sheet being left" is set, it advances to a step S360.

In the step S357, the HDD control portion 113 checks if the scan ended page is the first page. If it is the first page, the HDD control portion 113, in a step S358, combines a JPEG file "ActualData. JPG" and another JPEG file "TbumbData. JPG" in the hard disc 13 into a JPEG file, and attaches a temporary name "PreviousData. JPG" to the file and stores it into the root of the image file area 134 in the hard disc 13. After completion of the S358 execution, the HDD control portion 113 returns to the step S301.

If it is not the first page, the HDD control portion 113, in a step S359, successively connects the JPEG file "Actual- Data. JPG" and the JPEG file "TbumbData. JPG" in the hard disc 13 to the JPEG file "PreviousData.JPG" in the hard disc 13, to thereby update the JP E G file "PreviousData. JPG" in the hard disc 13. Upon completion of the s359 execution, the HDD control portion 113 returns to the step S301.

In the step S360 executed when the "no sheet being left" is set (the scanning of the final page ends), the HDD control portion 113 checks if an original document consists of a single page. When the original consists of a single page (the scan ended page is the first page), the HDD control portion 113, in a step S361, combines in predetermined format (format of he JPEG single page file shown in FIG. 37) the JPEG file "ActualData. JPG" and the JPEG file "ThumbData. JPG in the hard disc 13, and each management data on the RAM 11 (data set in the areas corresponding to the "size of JPEG thumbnail area" 61, the "Offset of total JPEG data area" 63, the "offset of JPEG thumbnail area" 64, the "No. of pages area" 65, and the "marker area" 66). And it attaches to it a file format name corresponding to the file format (in this case, the JPEG file) designated by the storage format parameter in the "scan and HDD storage request" message received from the management portion 114, and stores the resultant into the root of the image file area 134 in the hard disc 13. Upon completion of the S361 execution, the HDD control portion 113 advances to the step S363.

When the step S360 judges that the original consists of a plurality of pages (the scan ended page is not the first page), the HDD control portion 113, in the step S362, combines the JPEG file "PreviousData. JPG" and the JPEG file "ActualData. JPG" in the hard disc 13, and each file management data on the RAM 11 (i.e., data stored in the areas corresponding to "size of JPEG thumbnail area" 61-1 for each page, "Offset of total JPEG data area" 63-1 for each page, "offset of JPEG thumbnail area" 64-1 for each page, "No. of pages area" 65, and "marker area" 66) into a predetermined format according to a predetermined format (in this case, the format of the JPEG multi-page file shown in FIG. 38). And the HDD control portion 113 attaches to it a file name corresponding to a file format (in this case, the JPEG file format) designated by the storage format parameter in the "scan and HDD storage request" message received from the management portion 114, and stores the resultant to the root of the image file area 134 of the hard disc 13. Upon completion of the S362 execution, the HDD control portion 113 advances to a step S363.

In the step S363, the HDD control portion 113 sends a process end message to the management portion 114. Upon completion of the S363 execution, the HDD control portion 113 returns to the step S303.

In the step S364, the HDD control portion 113 sets a proper value of the "TIFF header+Data area" 70 (70-1) for the page ("TIFF header+Data area" 70 (70-1) for the entire page previous to that page or the total data length of the "TIFF header+page n area" 70-n, the "size of JPEG thumbnail area" 71 and the "JPEG thumbnail area" 72) in the area corresponding to the "offset of TIFF data area" 73 for the scan ended page in the work area provided on the RAM 11.

In the next step S365, the HDD control portion 113 sets a proper value of an offset of the "JPEG thumbnail area" 72 for the page ("TIFF header+Data area" 70 (70-1) for the entire page previous to that page or the total data length of the "TIFF header+page n area" 70-n, the "size of JPEG thumbnail area" 71 and the "JPEG thumbnail area" 72+total data length of the "TIFF header+Data area" 70 (70-1) for the page or the "TIFF page n data area" 70-n and the "size of JPEG thumbnail area" 71) into the "offset of JPEG thumbnail area" 74 for the scan ended page in the work area provided on the RAM 11.

In the next step S366, the HDD control portion 113 increments by one a value of the area corresponding to the "No. of pages area" 75 in the work area provided on the RAM 11.

In the step S367, the HDD control portion 113 checks which of "sheet being left" or "no sheet being left" is set in the received scan end message. If the "sheet being left" is set, it advances to a step S358. If the "no sheet being left" is set, it advances to a step S371.

In the step S368, the HDD control portion 113 checks if the scan ended page is the first page. If it is the first page, the HDD control portion 113 combines a TIFF file "ActualData.tiff", a JPEG file "ThumbData JPG" into a file, and attaches a temporary name "PreviousData. Tif" to it, and stores it into the root of the image file area 134 of the hard disc 13.

When it is not the first page, the HDD control portion 113, in a step S370, successively connects the TIFF "ActualData. Tif" and the JPEG file "ThumbData. JPG" in the hard disc 13 to the TIFF file "PreviousData.Tif" in the hard disc 13, to thereby update the TIFF file "PreviousData.Tif" in the hard disc 13. Upon completion of the S370 execution, the HDD control portion 113 returns to the step S301.

In the step S371 executed when the "no sheet being left" (the final page scan ends), the HDD control portion 113 checks if the original document consists of a single page. If it is judged that it consists of a single page (viz., the scan ended page is the first page), the HDD control portion 113, in the step S372, combines the TIFF file "ActualData. Tif" and the JPEG file "ThumbData. JPG" in the hard disc 13, and each file management data on the RAM 11 (i.e., data set in the areas corresponding to the "size of JPEG thumbnail area" 71, "offset of TIFF data area" 73, "offset of JPEG thumbnail area" 74, "No. of pages area" 75 and "marker area" 76) according to a predetermined format (format of the single page TIFF file shown in FIG. 39). Ant it attaches to the combined one a file name corresponding to the file format (in this case, the TIFF file format) designated by the storage format parameter in the "scan and HDD storage request" message received from the management portion 114. Upon completion of the S372 execution, the HDD control portion 113 advances to a step S374.

When the step S371 judges that it consists of a plurality of pages (viz., the scan ended page is not the first page), the HDD control portion 113, in a step S373, combines the TIFF file "PreviousData. Tif", the TIFF file "ActualData. Tif", and the JPEG file "TbumbData. JPG" in the hard disc 13, and each file management data (data stored in the areas corresponding to "size of JPEG thumbnail areas" 71-1 to X for the pages, "offset of TIFF data areas" 73-n to X for the pages, "offset of JPEG thumbnail areas" 74-1 to X for the pages, a "No. of pages area" 75, and a "marker area" 7) on the RAM 11 in a predetermined format (format of the JPEG multi-page file shown in FIG. 40). And it attaches to the combined one a file name corresponding to the file format (in this case, that of the JPEG file) designated by the storage format parameter in the "scan and HDD storage request" received from the management portion 114, and stores the resultant into the root of the image file area 134 of the hard disc 13. Upon completion of the S373 execution, the HDD control portion 113 advances to a step S374.

In the step S374, the HDD control portion 113 sends a process end message to the management portion 114. Upon completion of the S374 execution, the HDD control portion 113 returns to the step S301.

In the step S306 executed upon receipt of the cancel message from the management portion 114, the HDD control portion 113 deletes the files concerning the document having been scanned (JPEG file "PreviousData. JPG" or bfiff file "PrviousData.Tif", JPEG file "ActualData.JPG" and JPEG file "ThumbData. JPG") from the hard disc 13. Upon completion of the S306 execution, the HDD control portion 113 returns to the step S301.

In the step S307 executed when another message is received, the HDD control portion 113 executes a process corresponding to the message. Upon completion of the S307 execution, the HDD control portion 113 returns to the step S301.

(5) Web Browser

A process executed by the web browser 301 in each client terminal 2 will be described with reference to a flow chart shown in FIG. 16. Description will be given placing emphasis on a case where the URL of "WebExplore" is input. When the URL of "WebExplore" is input by the operator, the web browser 301, in a step S401, sends the URL to the copy server 10 of the copy system 1 by way of the communication portion 302. The copy system 1 to which the URL is sent will be referred to as a "primary copy system".

When the copy server 10 of the primary copy system 1 sends a hypertext "WebExplore" in response to the URL transmission, the web browser 301, in the step S302, receives the hypertext "WebExplore".

Then, the web browser 301, in a step S403, secures a display area for an image by the Java Applet in accordance with the hypertext "WebExplore", and requests the copy server 10 of the primary copy system 1 to send the class files of the Java Applet designated by its Applet class file names in the hypertext "WebExplore".

Then, the web browser 301 waits till all the class files of the Java Applet requested in the step S404 have been received. Upon receipt of all the class files, it reconstructs the Java Applet 133 from all the received class files, and activates the Java Applet. Subsequently, the web browser 301 continues an ordinary process.

(6) Java Applet

Next, a process by a Java Applet 133 designated by the Applet class file name in the hypertext "WebExplore" in the present embodiment will be described with reference to FIGS. 17 through 25.

The Java Applet activated in the step S405, in the step S101, displays the initial dialog box 80 shown in FIG. 42. At this time point, the right and left windows 85 and 86 in the initial dialog box 80 are left blank.

In the next step S502, the Java Applet 133 displays the names of the primary copy system 1, the secondary copy system 1", and other client terminals 2, and icons in a tree structure on the left window 85 of the initial dialog box 80 in accordance with various parameters described in the hypertext "WebExplore" received in the step S402. Further, it accesses the hard disc 38 of the self client terminal 2 to add characters of "MY Computer" and icons to the display in the left window 85.

In the next step S503, the Java Applet 133 judges whether or not some operation event occurs in response to an input signal from the input interface 37. When some operation event occurs, the Java Applet 133, in a step S504, checks a kind of the operation event.

When the S504 judges that a select operation of the display type occurs, that is, when the "Display" in the menu bar 82 is clocked, "File list" "Thumbnail" in the pull down menu to subsequently displayed are clicked, the Java Applet 133 advances to a step S505. In the step S505, the Java Applet 133 stores the display type selected, viz., "File list display" or "Thumbnail display corresponding to the name clicked. Upon completion of the S505 execution, the Java Applet 133 returns to the step S503.

When the step S504 judges that a display thumbnail number change operation occurs, the "Displat" in the menu bar 82 of the initial dialog box 80 is clicked, the "thumbnail" in the pull down menu subsequently displayed is clicked, and "3", "6" or "9" in the menu subsequently displayed is clicked, the Java Applet 133 advances to a step S506. In the step S506, the Java Applet 133 stores the selected thumbnail number, i.e., the number of clicking operations. Upon completion of the S506 execution, the Java Applet 133 returns to the step S503.

When the step S504 judges that a click operation of a directory occurs, viz., a display is present in the left window 85 of the initial dialog box 80, the Java Applet 133 advances to a step S508. In the step S508, the Java Applet 133 links to the copy system 1 and sends a file list packet designating a path name corresponding to the clicked directory thereto (corresponding to a management information request portion).

In the next step S509, the Java Applet 133 waits a response of file information to the file request packet transmitted in the step S508 (see S715). The file information (file management information) contains directory names of the subdirectories in a directory indicated by the path name in the file list request packet, file names of the files stored in the directory indicated by the path name, file size, file attributions, time stamps, page numbers, and a disc space that may be used by the directory indicated by the path name.

Figure 44:
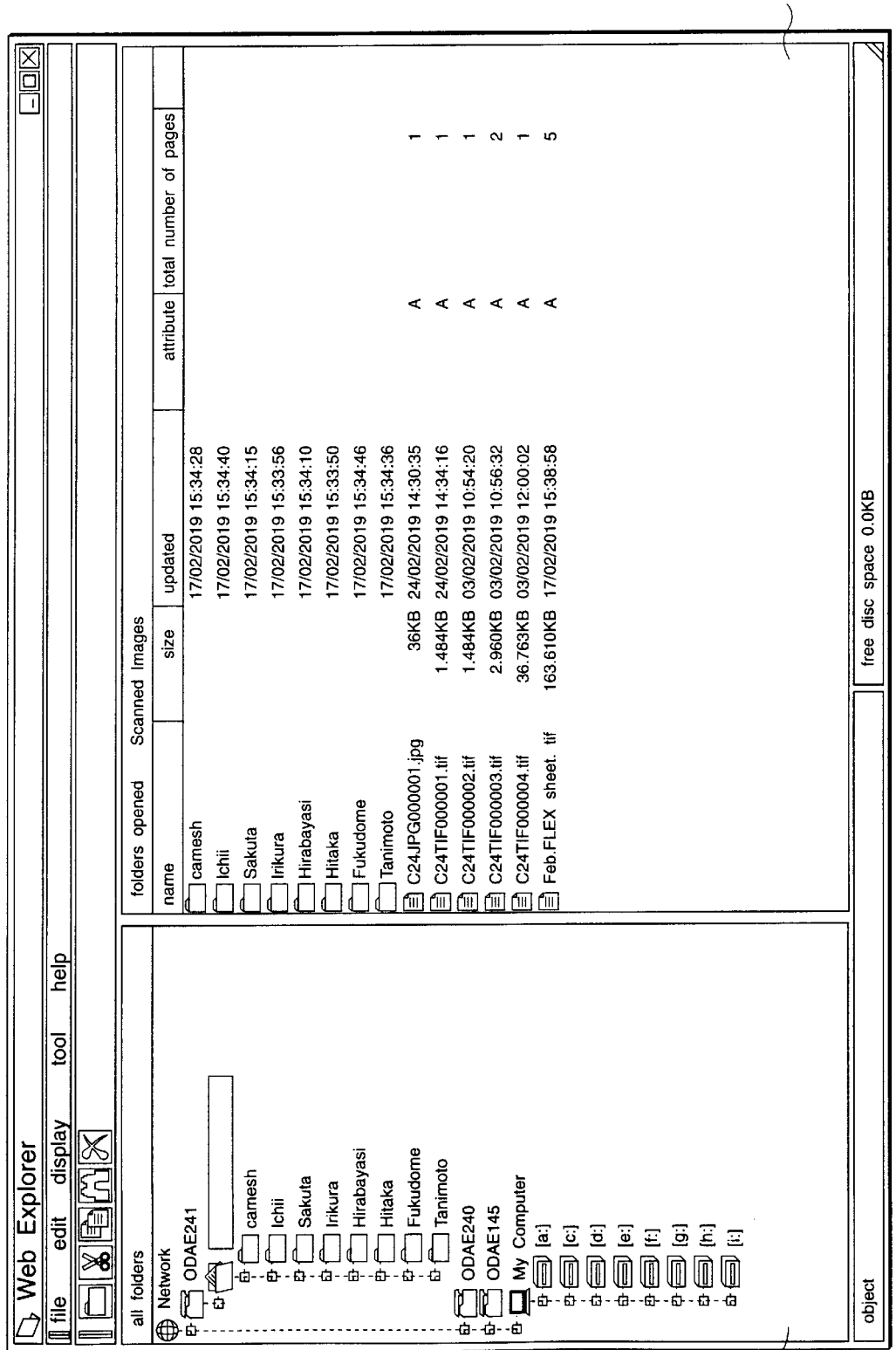
FIG. 44 is a diagram showing a file list display.
Figure 45:
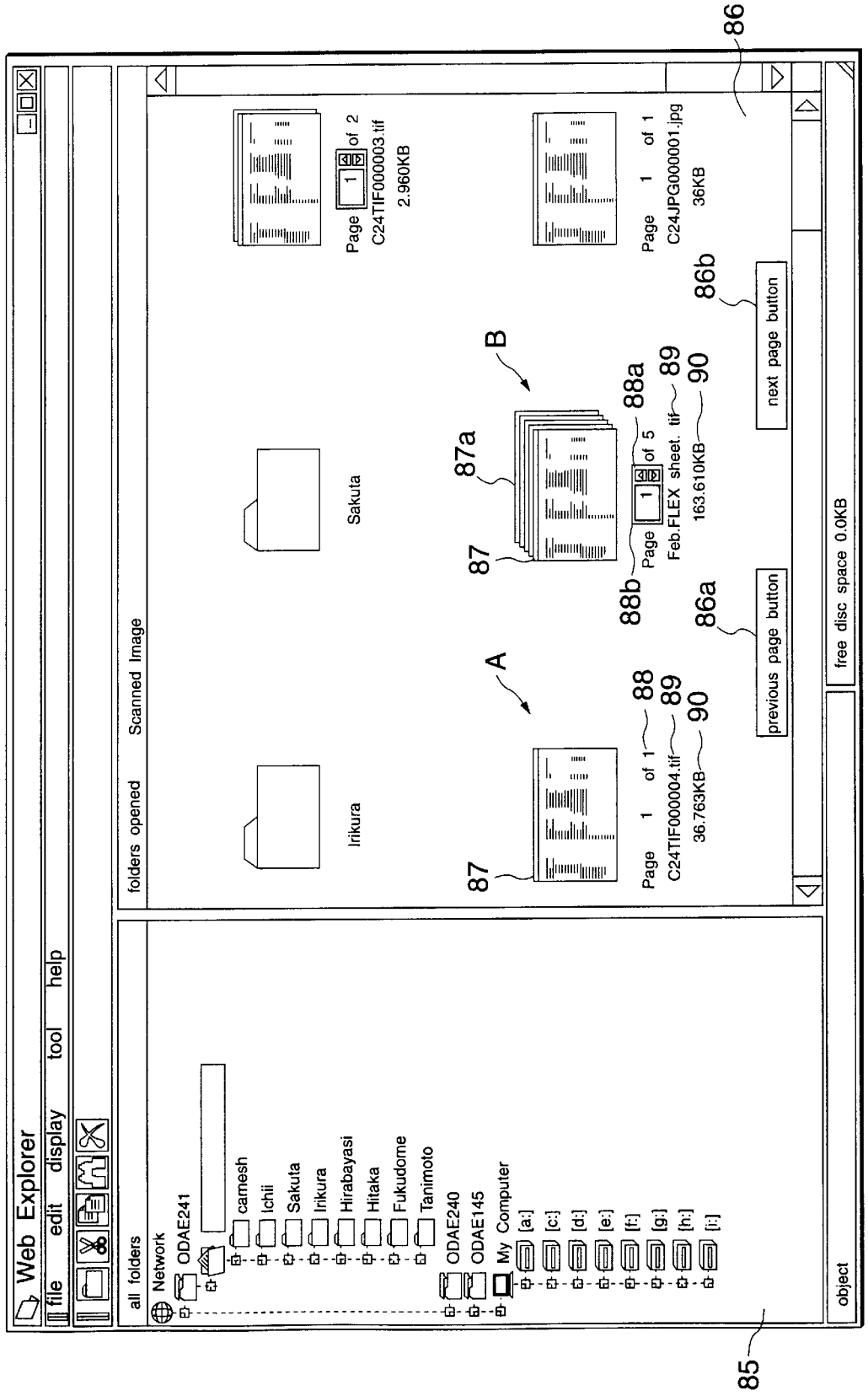
FIG. 45 is a diagram showing a thumbnail display.

When this file information responds, the Java Applet 133 advances from the step S509 to the step S510. In this step S510, the Java Applet 133 displays a free disc space on the status bar 84 of the initial dialog box 80 on the basis of the free disc space contained in the file information. Further, it updates the tree contents displayed in the left window 85 of the initial dialog box 80 on the basis of the subdirectory names contained in the file information. As shown in FIGS. 44 and 45, the subdirectory names and their icons are displayed in a tree fashion in the lower layer of the clicked directory.

In the next step S511, the Java Applet 133 checks if the display type stored in the step S505 is a file list display or a file name display. When the file list display is stored, a step S512 performs a file list display on the basis of the file information responded in the step S509. As shown in FIG. 44, file names of files contained in the file information, file size, file attributes, time stamps and page numbers are listed in this order from the top in the right window 86 of the initial dialog box 80 (corresponding to a display portion). Upon completion of the S512 execution, the Java Applet 133 returns to the step S503.

When the step S511 judges that a thumbnail display is stored, the Java Applet 133, in a step S513, specifies the first file name contained in the file information responded in the step S509. Upon completion of the S509 execution, the Java Applet 133 advances to a step S510.

In the step S510, the Java Applet 133 initializes a variable "n" to "0". Subsequently, the Java Applet 133 executes a loop process of steps S515 to S520 in order to receive a JPEG thumbnail data corresponding to the file names contained in the file information.

In the first step S515 in this loop process, the Java Applet 133 links to the primary copy system 1, and sends a full down load request packet which designates the file name specified in the steps S513, S521, S524 or S525, its path name, and a requested file type (here, JPEG thumbnail file)

to the copy system (corresponding to a rough image JPEG file request portion).

In the next step S516, the Java Applet 133 waits for a response of a JPEG thumbnail file (rough image JPEG file) to the full down load request packet transmitted in the step S515 (see S727).

When the JPEG thumbnail file responds, the Java Applet 133 advances from the step S516 to the step S517. In the step S517, the Java Applet 133 saves the received thumbnail JPEG file in the RAM 32.

In the next step S518, the Java Applet 133 increments by one a variable "n".

In the next step S519, it checks if the full down load request packet is transmitted (S515) for all the file names contained in the file information received in the step S509. When the full down load request packet is not transmitted yet, the Java Applet 133 advances a step S520.

In the step S520, the Java Applet 133 checks if the variable "n" is equal to the number of thumbnails. When the variable "n" does not reach the number of thumbnails, the Java Applet 133 specifies the next file name in the file information in a step S521. Then, it returns to the step S515 to send the full down load request packet concerning a file name specified anew.

When the loop process of the steps S515 to S521, and the transmission of the full down load request packet for all the file names in the file information is completed, the Java Applet 133 advances from the step S519 to a step S522. When the variable "n" does not reach the number of thumbnails, the Java Applet 133 advances from the step S520 to a step S522.

In the step S522, the Java Applet 133 displays thumbnails in the right window 86 of the initial dialog box 80 as shown in FIG. 45, on the basis of the JPEG thumbnail file saved in the RAM 32 (corresponding to the display portion). In this case, for the file name of a file in which the number of page in the file information is "1", as indicated by A in FIG. 45, a thumbnail image (rough image) 87, responded for its file name, which is based on the JPEG thumbnail data in the JPEG thumbnail file, first page of the page (page 1 OF 1), its file name 89, and full size 90 are displayed while being vertically arranged. For a file name for the multiple pages (X pages, for example) in the file information, as indicated by B in FIG. 45, the upper edges and the right edges of the thumbnail image 87 are fringed (denoted as 87a) so to present an image overlapping view. Page Y of the page X (Page Y of X) 91 is displayed between the thumbnail image (rough image) 87 and the file name 89. Y indicative of "page number" is displayed in a text box 88b attached with a scroll bar 88a. Accordingly, by operating the scroll bar 88a by a mouse, a value of Y displayed in the text box 88b may be incremented or decremented within values of X. Upon completion of the S522 execution, the Java Applet 133 returns to the step S503.

When the step S504 judges that a click operation event of the previous or next page occurs, that is, the previous page button 86a or the next page button 86b displayed in the right window 86 in the thumbnail display is clicked as shown in FIG. 45, the Java Applet 133 advances to a step S523.

In the step S523, the Java Applet 133 checks which of the previous page button 86a and the next page button 86b is clicked. And the Java Applet 133 advances to a step S524 when the previous page button 86a is clicked. When the next page button 86b is clicked, it advances to a step S525. In the step S524, the Java Applet 133 specifies a file name next to the final file name of which the thumbnail is currently displayed in the right window 86, from the file information responded for the present directory in the latest step S509. In the step S525, the Java Applet 133 specifies a file name preceding to the first file name of which the thumbnail is displayed in the right window 86 by the number of thumbnails stored in the step S506. In either case, the Java Applet 133 advances to a step S514. The process of the step S514 and the subsequent ones was already described, and hence its description is omitted here.

When the step S504 recognizes that a display page No. updating operation for a plurality of page files occurs, that is, when the scroll bar 88a of any of the thumbnails displayed in the right window 86 is operated by the computer mouse 42 and as a result, the page number Y displayed in the text box 88b is increased or decreased, the Java Applet 133 advances to a step S526.

In the step S526, the Java Applet 133 links to the primary copy system 1, and sends to the latter a file down load request packet which designates a file name to be updated (i.e., a file name described under the text box 88b in which the page number is increased or decreased), its path name, a file type (in this instance, JPEG thumbnail file), and a requested page number (page number Y after increased or decreased) (corresponding to the rough image JPEG file request portion).

In the next step S527, the Java Applet 133 waits for a responses of the JPEG thumbnail file (rough image JPEG file) to the file down load request packet that is sent in the step S526 (see S727).

When the JPEG thumbnail file responds, the Java Applet 133 advances from the step S527 to a step S528. The Java Applet 133, in this step S528, saves the received thumbnail JPEG file in a RAM 32.

In the next step S529, the Java Applet 133 updates the thumbnail image 87 displayed above the text box 88b in which the page number Y is increased and decreased on the basis of the JPEG thumbnail file saved in the RAM 32. As a result, the thumbnail image (rough image) 87 corresponding to the increased or decreased page number Y is displayed. Upon completion of the S529, execution, the Java Applet 133 returns to the step S503.

When the step S504 recognizes that a file drop operation occurs, that is, when one (and the icon or the thumbnail image 87 corresponding to it) of the file names displayed in the right window 86 is drugged and dropped onto one of the directory names (or its icon) displayed in the left window 85, the Java Applet 133 advances to a step S530.

In the step S530, the Java Applet 133 advances to a step S531 when the place to which the file name is dropped is My Computer (or a directory belonging to its lower layer), and advances to a step S535 when that place is another directory name.

In the step S531, the Java Applet 133 links to the primary copy system 1 sends to the same a file down load request packet which designates an original file name (i.e., the dragged file name) and its path name, a to-be-copied drive name (i.e. , a drive name of the hard disc 38 of the self client terminal 2 belongs to the directory to which the file name is dropped) and its path name, and a file type (in this instance, an image file containing all data pieces) (corresponding to the image file request portion).

In the next step S532, the Java Applet 133 waits for a response of an image file (JPEG file or TIFF file) to the file down load request packet sent in the step S531 (see S727).

When the image file responds, the Java Applet 133 advances from the step S532 to a step S533. In this step S533, the Java Applet 133 writes the received image file into a directory indicated by the to-be-copied path name in the to-to-copied drive.

In the next step S534, the Java Applet 133 checks if it receives all the image files to the file down load request sent in the step S531. When it does not yet receive all the image files, it returns to a step S532. When it receives all the image files, the Java Applet 133 returns to the step S503.

In the step S535, the Java Applet 133 links to the primary copy system 1, and sends to it a file copy request packet which designates an original file name (i.e., a file name dragged) and its path, and a to-be-copied drive name (i.e., a drive name of each hard disc 13 (38) of the copy server 10 to which the directory to which the file name is dropped or another client terminal 2) and its path name.

In the next step S536, the Java Applet 133 waits for a response to the file down load request packet sent in the step S535. When it receives a response, the Java Applet 133, in the next step S step S537, checks if the response is that the copy is normally accepted (see S730, S733, S736, S740) or it is an error. When it is an error response, the Java Applet 133, in step S542, displays an error on the display screen, and returns to a step S503. When the response is that the copy is normally accepted, the Java Applet 133 advances to a step S538. In this step S538, the Java Applet 133 links to the primary copy system 1, and sends to it a copy status check packet for checking a copy end. The copy status check packet contains the following parameters; a process number, an original file name and its path name, a to-be-copied drive name and its path name.

In the next step S539, the Java Applet 133 checks the contents of a response (see S742, S746) to the copy status check packet sent in the step S538. When the response is an error response, the Java Applet 133, in a step S542, displays an error on the display screen, and returns to the step S503. When the response is a copy progress ( i.e., process progress <100%), the Java Applet 133, in the step S540, displays a copy progress and a process progress on the display screen, and returns to the step S538. When the response is a copy end (i.e., process progress=100%), the Java Applet 133 displays a copy end on the screen, and returns to the step S503.

When the step S504 judges that a file retrieval operation occurs, "edit" is clicked in the menu bar 82 of the initial dialog box 80. When a retrieval path and a to-be-retrieved file name or a to-be-retrieved directory name is input to a retrieval dialog box (not shown), which is displayed by clicking "Retrieval" to then be displayed in the pull down menu or the retrieval button 83c of the tool bar 83, the Java Applet 133 advances to the step S542.

In the step S542, the Java Applet 133 checks if a retrieval path input to the retrieval dialog box contains a drive name in the self client terminal 2. When the retrieval path does not contain the drive name of the self client terminal 2, the Java Applet 133 directly advances to a step S544. When the retrieval path contains the drive name of the self client terminal 2, the Java Applet 133, in a step S543, executes a file retrieval in the hard disc 38 of the self client terminal 2, and advances to a step S544.

In the step S544, the Java Applet 133 links to the primary copy system 1, and sends to it a file retrieval request packet containing the following parameters; a retrieval range (range of a path for retrieval) input the retrieval dialog box (not shown), a to-be-retrieved file name, or a to-be-retrieved directory name.

In the next step S545, the Java Applet 133 waits for a response to the file retrieval request packet sent in the step S544 (see S751). When receiving a response, the Java Applet 133, in the next step S546, check if the retrieval normally ended on the basis of the response contents. When it abnormally ended, the Java Applet 133, in a step S548, displays an error on the display screen, and returns to a step S503.

When the retrieval normally ended, the Java Applet 133 displays all the retrieval results (retrieval results in the step S543 and those contained in the response) on the display screen. Upon completion of the S547 execution, the Java Applet 133 returns to the step S503.

When the step S504 judges that a file delete operation occurs, that is, when a file name displayed in the right window 86 or a directory name in left window 85 is clicked and then "file" in the menu bar 82 of the initial dialog box 80 is clicked, and "delete" in the pull down menu to subsequently be displayed, or when a file name or a directory name is clicked and then the delete button 83d in the tool bar 83 is clicked, the Java Applet 133 advances to a step S549.

In the step S542, the Java Applet 133 checks if the delete path (i.e., a path corresponding to a file name or a directory name clicked) contains a drive name in the self client terminal 2. When the delete path contains a drive name in the self client terminal 2, the Java Applet 133, in a step S552, deletes a file to be deleted (file indicated by the clicked file name) or a directory to be deleted (directory indicated by the clicked directory from the hard disc 38 of the self client terminal 2. Upon completion of the S552 execution, the Java Applet 133 advances to a step S553.

When the delete path does not contain the drive name of the self client terminal 2, the Java Applet 133, in a step S550, links to the primary copy system 1, and send to it a file delete request packet containing parameters of a file name or a directory name to be retrieved and its path name. In the next step S551, the Java Applet 133 waits for a response to the file delete request packet sent in the step S550 (see S756). When receiving a response, the Java Applet 133 advances to a step S553.

In the step S553, the HDD control portion 113 checks if the file is normally deleted on the basis of the result of executing the file delete process performed in the step S552 and the response from the primary copy system 1. When the file deleting is not normal, the Java Applet 133, in a step S55, displays an error on the display screen and returns to a step S503.

When the file deleting is normal, the Java Applet 133, in a step S554, changes a free disc space displayed on the status bar 84 to that after the file is deleted, on the basis of the result of executing the file deleting process performed in the step S552 or a parameter contained in the response received from the primary copy system 1. Upon completion of the S554 execution, the Java Applet 133 returns to the step S503.

When the step S504 judges that a file name operation occurs, that is, when a file name displayed in the right window 86 or a directory name in the left window 85 is clicked, then "file" on the menu bar 82 of the initial dialog box 80, "rename" in the pull down menu to subsequently be displayed, and a new file name or a directory name is entered from the keyboard 41, the HDD control portion 113 advances to a step S556.

In the step S556, the Java Applet 133 checks if a rename bus (i.e., bus corresponding to the clicked file name or directory name) contains a drive name of the self client terminal 2. When the rename bus contains the drive name of the self client terminal 2, the Java Applet 133, in a step S559, changes the actual name of the renamed file (file indicated by the clicked file name) or the renamed directory (directory indicated by the clicked directory name) in the hard disc 38 to the name entered from the keyboard 41. Upon completion of the S559 execution, the HDD control portion 113 advances to a step S560.

When the rename path does not contain the drive name of the self client terminal 2, the Java Applet 133, in a step S557, links to the primary copy system 1, and send to it a file name request packet containing a parameter of the renamed file name or the renamed directory and its but name, and the name entered from the keyboard 41. In the next step S558, the Java Applet 133 waits for a response to the file name request packet sent in the step S557 (see S761). When receiving a response, the HDD control portion 113 advances to a step S560.

In the step S560, the HDD control portion 113 checks if the file naming is normally performed on the basis of the result of executing the rename process of the step S559 or the response received from the primary copy system 1 in the step S558. When the renaming is not normal, the Java Applet 133, in a step S562, displays an error on the screen and then returns to the step S503.

When the renaming operation is normal, the Java Applet, in a step S 561, changes the clicked file name or directory name to the name entered by the keyboard 41. Upon completion of the S561 execution, the Java Applet 133 returns to the step S503.

When the step S504 judges that another even occurs, the Java Applet 133, in a step S507, executes a process corresponding to the event, and returns to a step S503.

(7) Network Reception Portion

Figure 26:
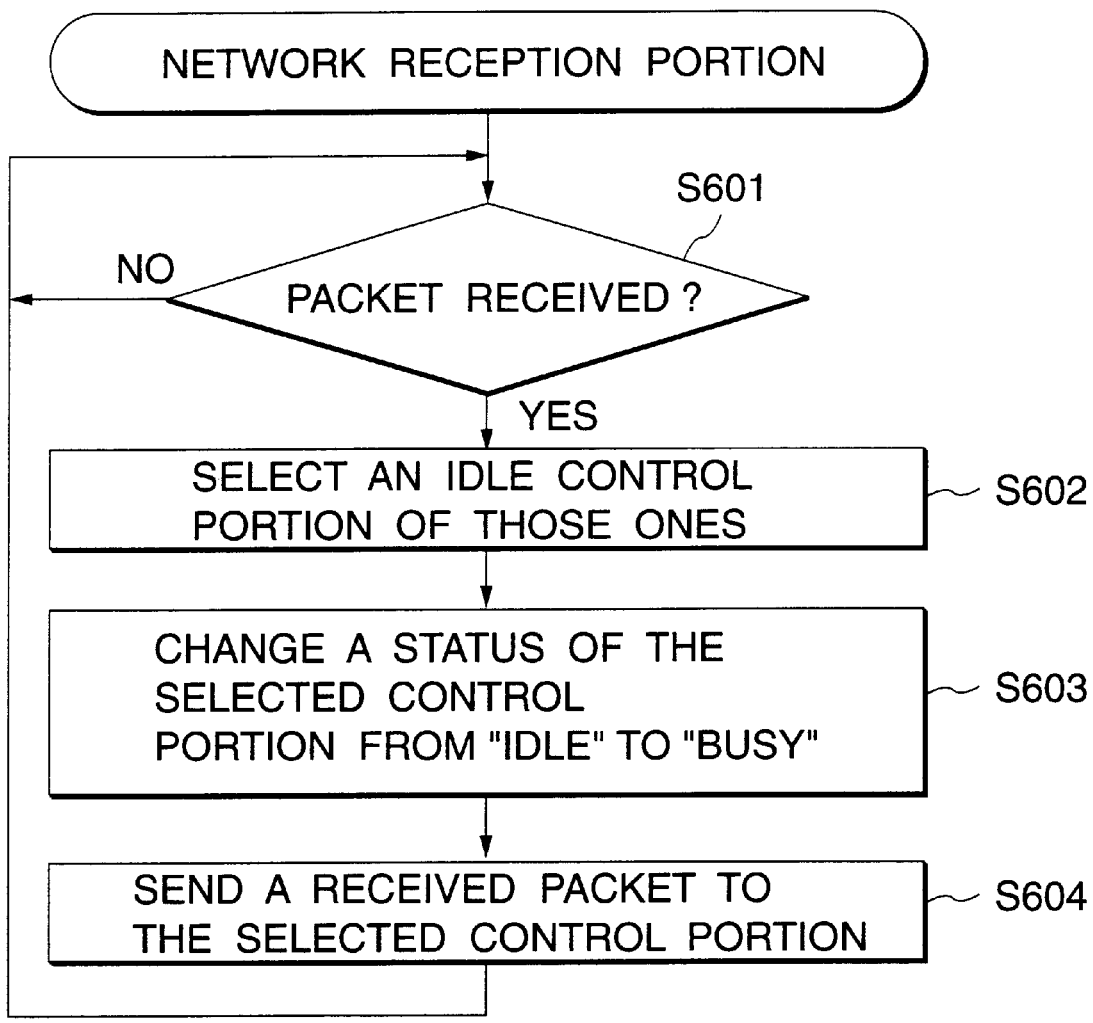
FIG. 26 is a flow chart showing a process executed by a network reception portion.
Figure 27:
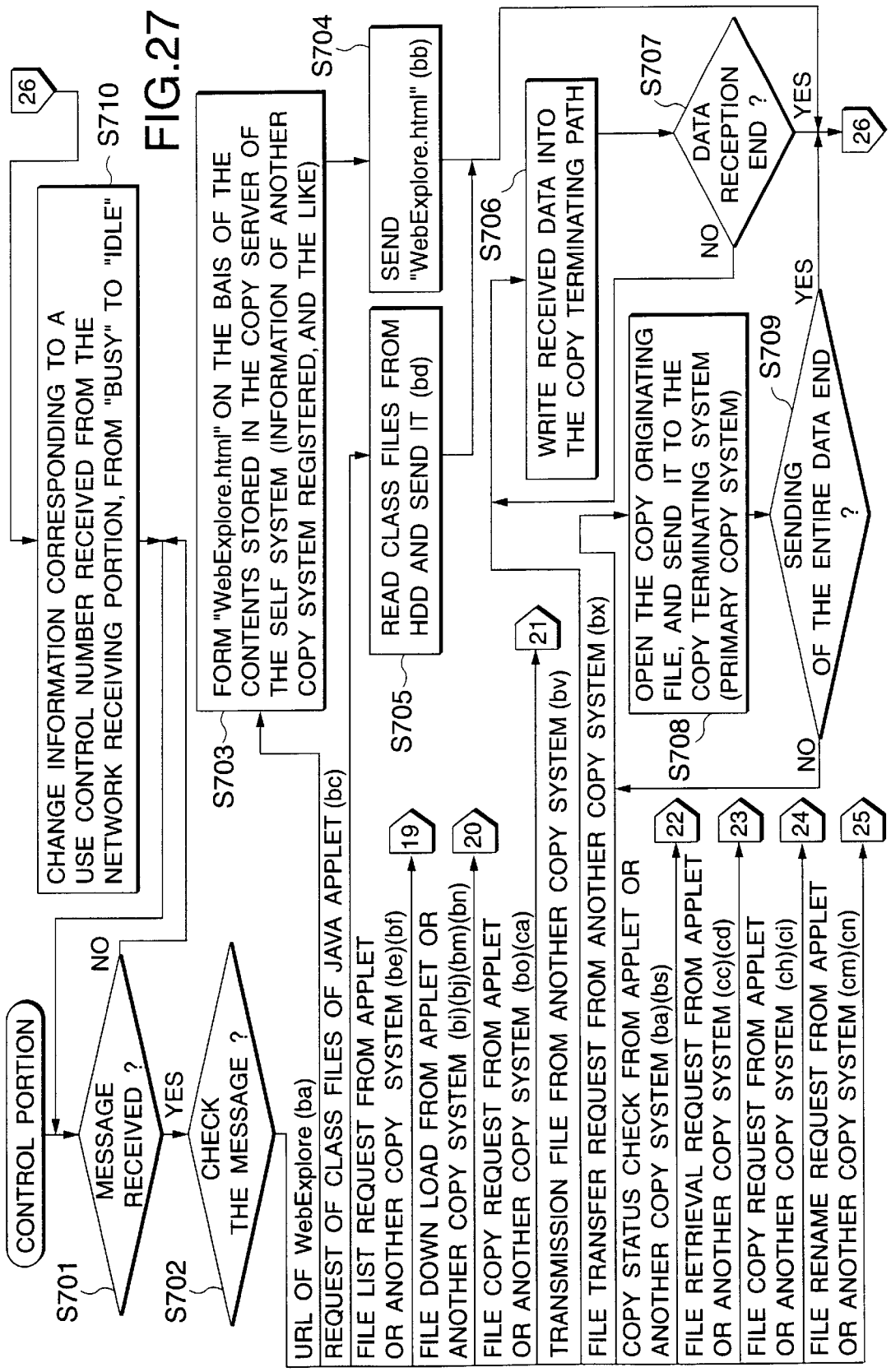
FIG. 27 is a flow chart showing a process executed by control portions.
Figure 28:
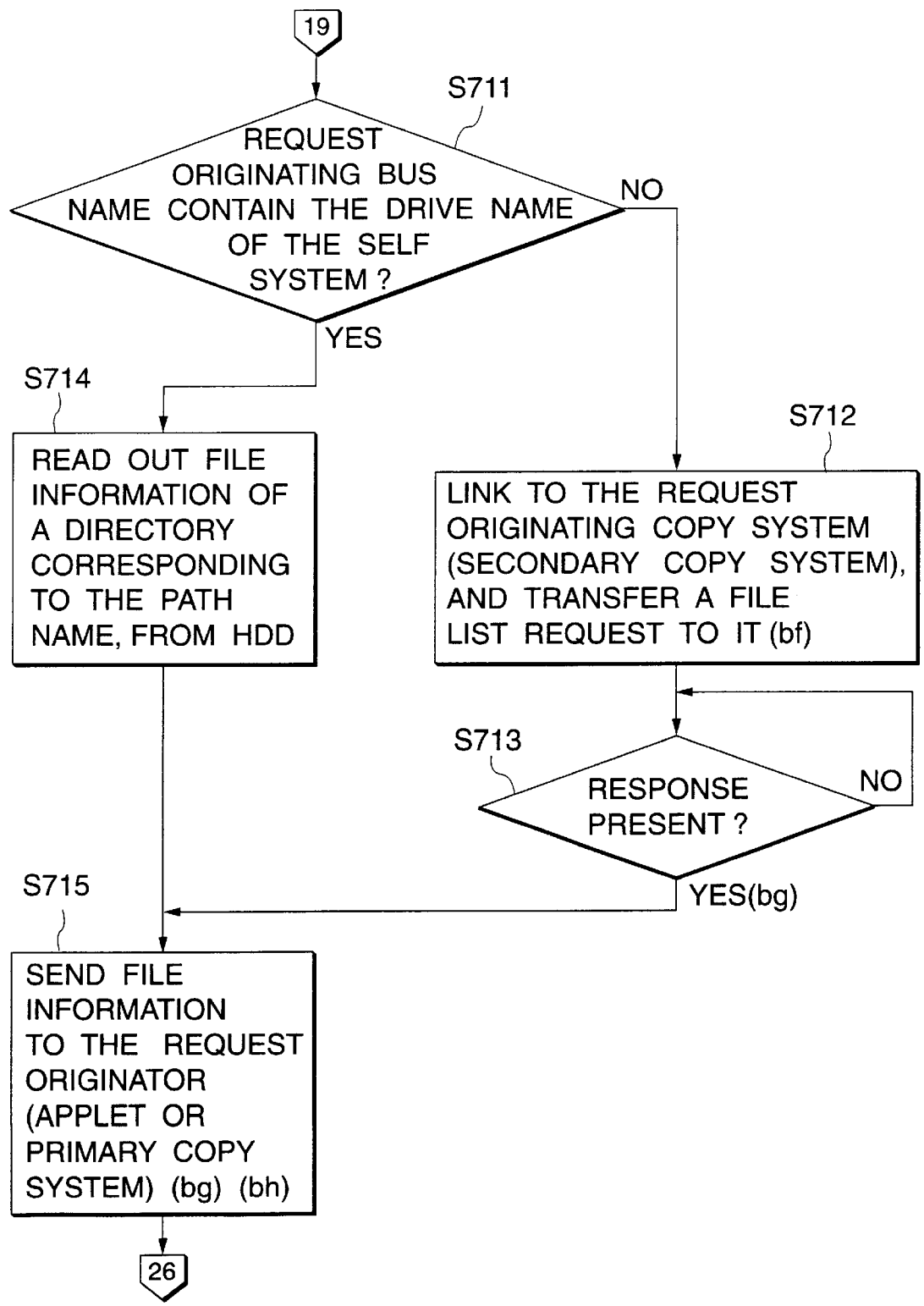
FIG. 28 is a flow chart showing a process executed by control portions.
Figure 29:
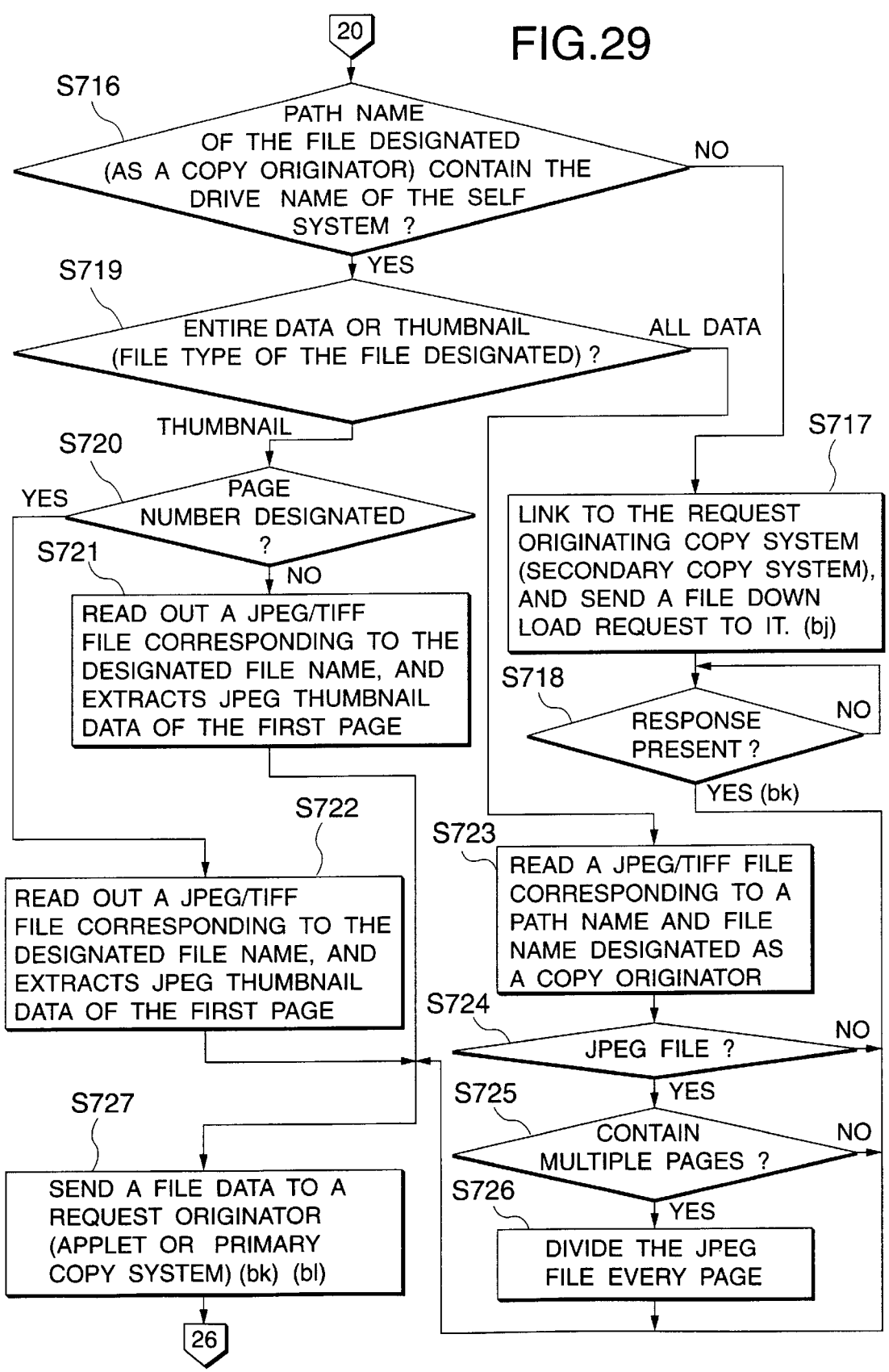
FIG. 29 is a flow chart showing a process executed by control portions.
Figure 30:
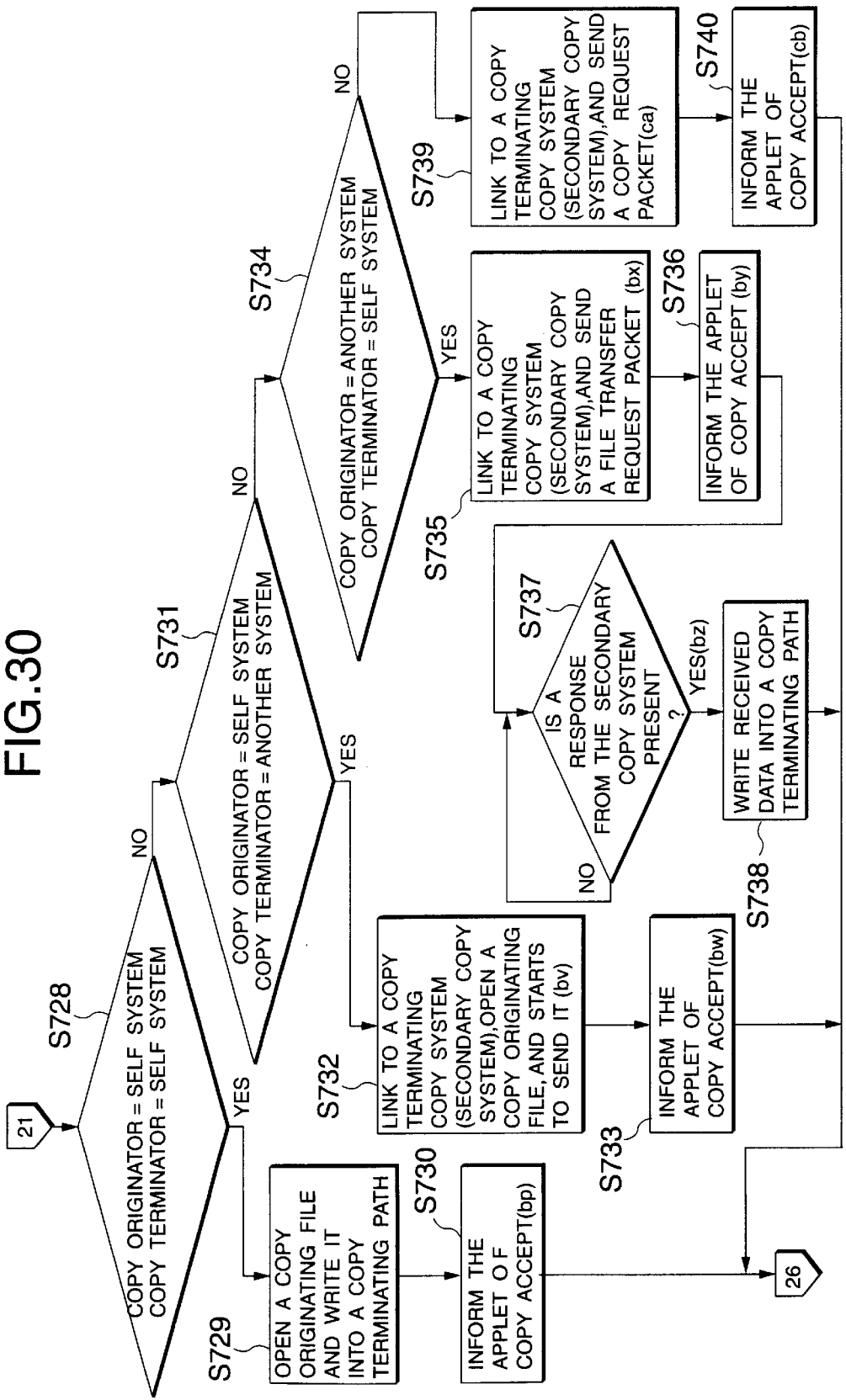
FIG. 30 is a flow chart showing a process executed by control portions.
Figure 31:
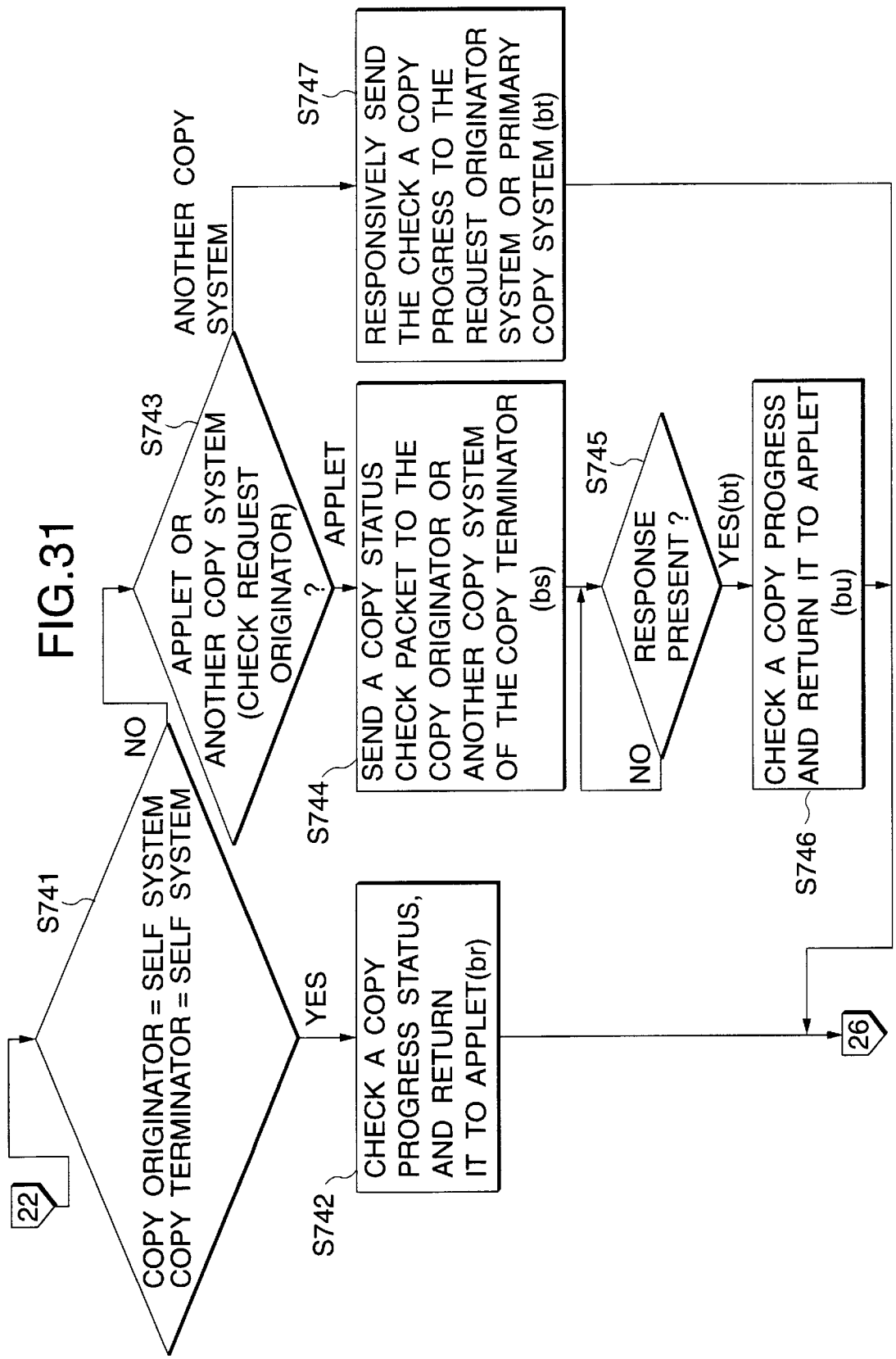
FIG. 31 is a flow chart showing a process executed by control portions.
Figure 32:
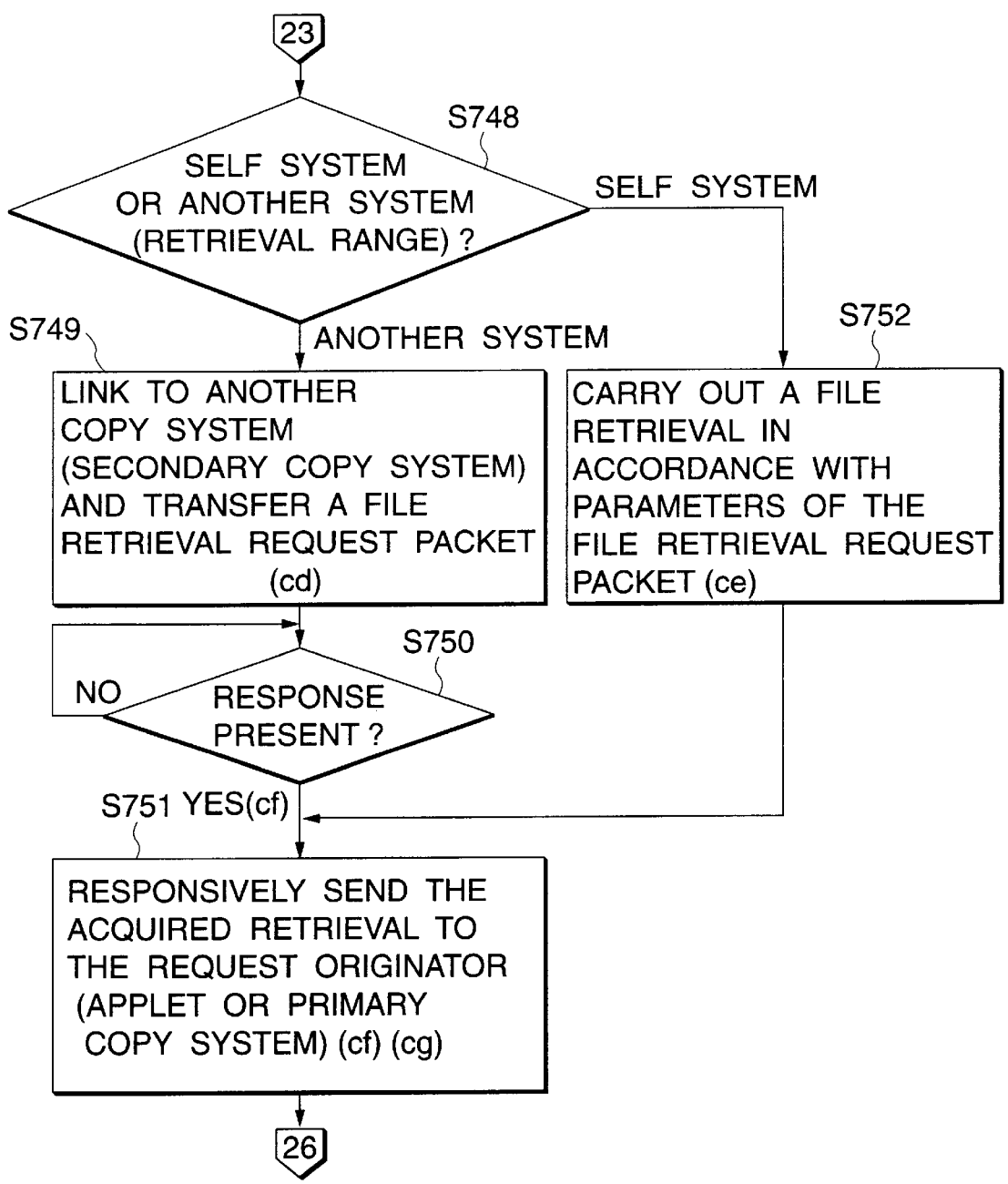
FIG. 32 is a flow chart showing a process executed by control portions.
Figure 33:
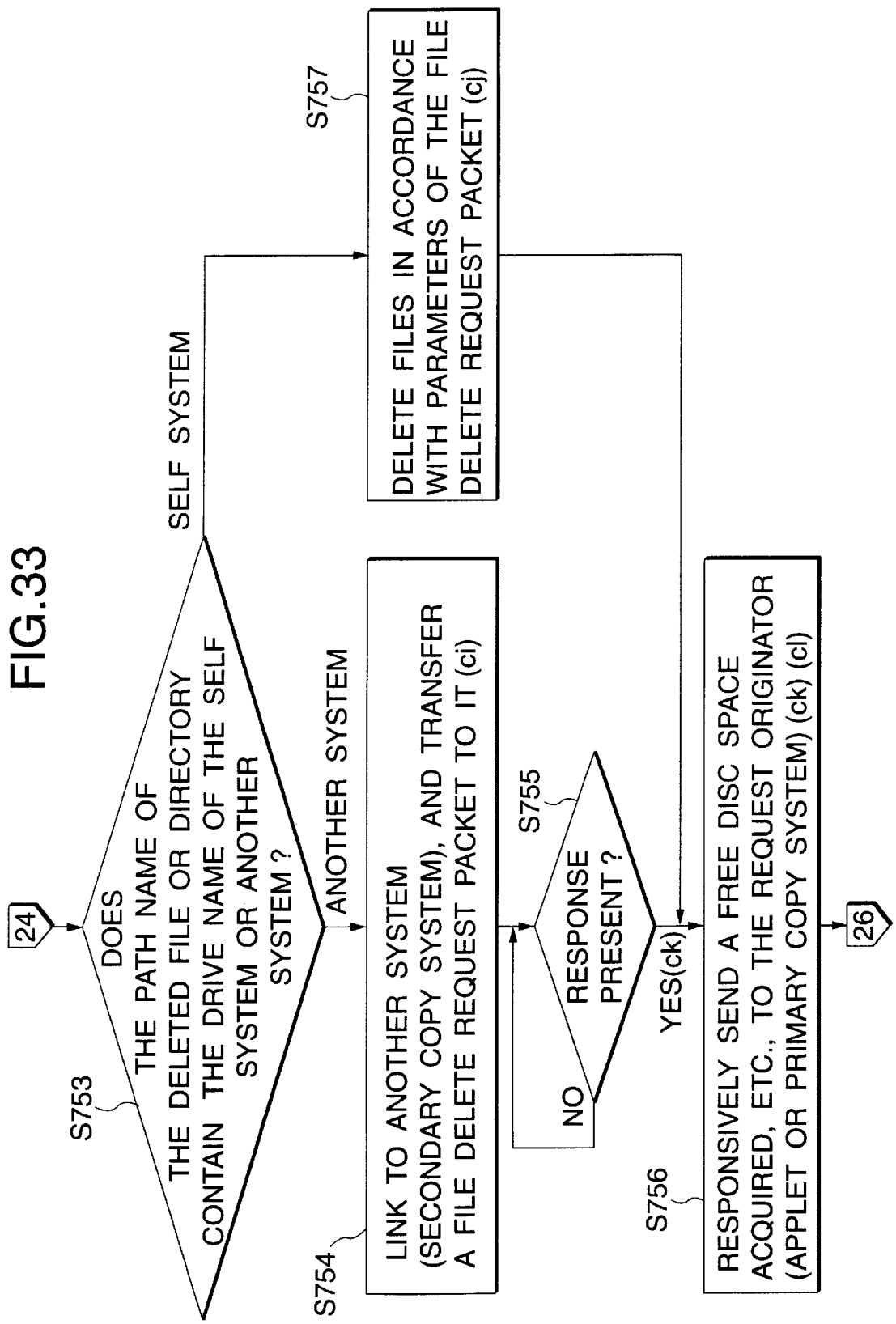
FIG. 33 is a flow chart showing a process executed by control portions.
Figure 34:
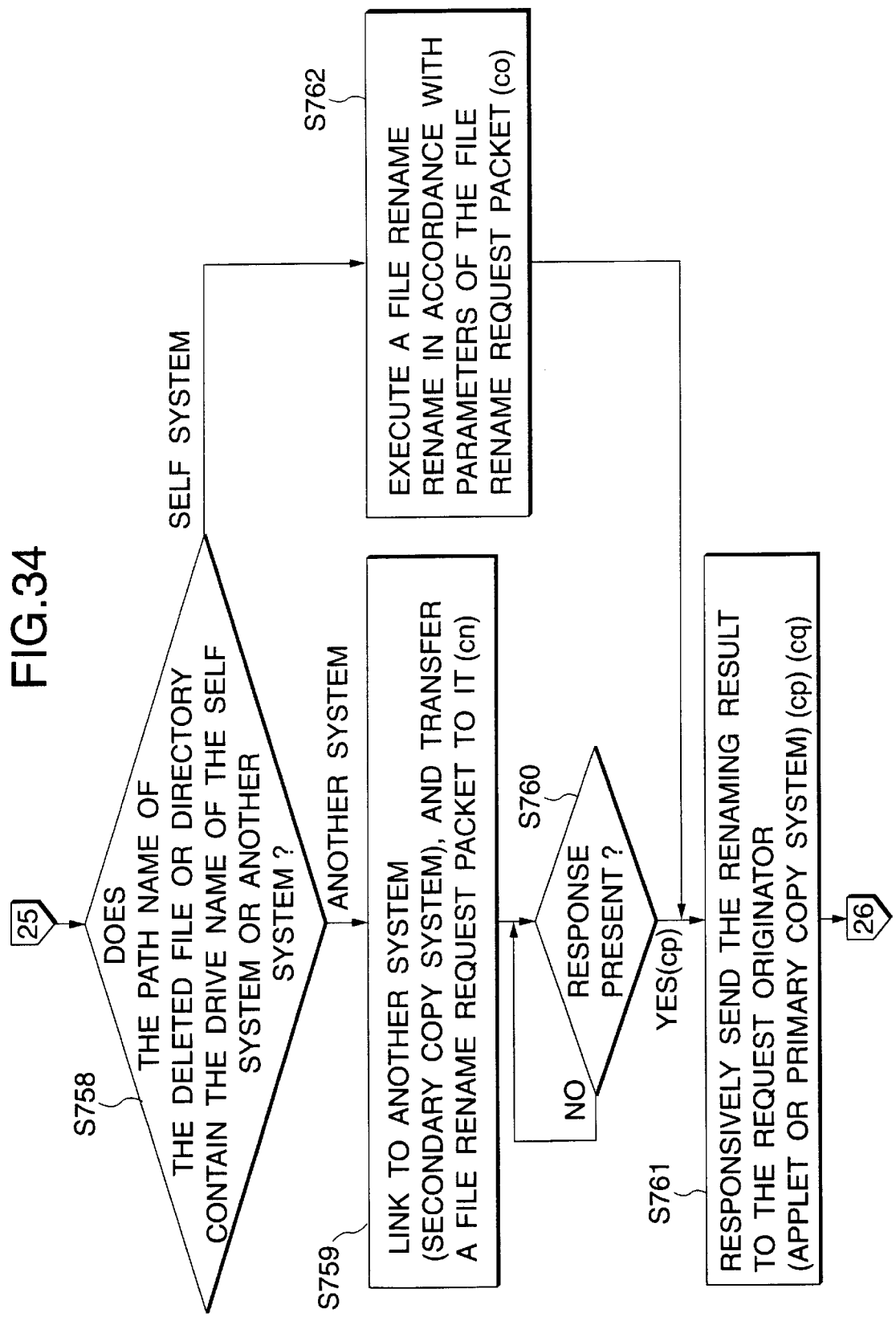
FIG. 34 is a flow chart showing a process executed by control portions.

A process by the network reception portion 111 executed on the copy server 10 will be described by use of a flow chart shown in FIG. 26. As shown in FIG. 26, the network reception portion 111, in a step S601, waits for a packet from the copy server 10 (control portion 112) any of the client terminals 2 or another copy system 1' by way of the network NW. When receiving a packet, it selects an idle control portion 112 on the basis of a control management table (FIG. 41) stored in the RAM 11, in a step S602.

In the step S603, for the control portion 112 selected in the step S602, the network reception portion 111 changes the information recorded in the control portion management table from "idle" to "busy".

In the next step S604, the network reception portion 111 takes a message from the packet received in the step S601, and sends it to the control portion 112 selected in the step S602. Upon completion of the S604 execution, the network reception portion 111 returns to the step S601, and waits for the next incoming packet.

(8) Control Portion

Next, a process by the control portion 112 will be described by use of flow charts shown in FIGS. 27 through 34. Each control portion 112 waits for a message (see S604) from the network reception portion 111, in a step S701.

When receiving a message from the network reception portion 111, the control portion 112, in a step S702, checks a kind of the received message. When the received message is the URL (see S401) of the "WebExplore", the control portion 112 advances from the process from the step S702 to a step S703.

In the step S703, the control portion 112 dynamically forms hypertext data "WebExplore. html" on the basis of the contents stored in the copy server 10 of the self system (the names and IP addresses of another copy system 1" and the client terminals 2, which are previously registered as the devices to and from which the image files are transmitted and received, class file names of the Java Applet 133, and other parameters).

In the next step S704, the control portion 112 sends the hypertext "WebExplore. html" formed in the step S703 to the request-originating client terminal 2 (web browser 301). Thereafter, the control portion 112, in a step S710, changes its own information stored in the control portion management table (i.e., information corresponding to a use control portion number received from the network reception portion 111) from "busy" to "idle", and returns to the step S701.

When the message received from the network reception portion 111 is a class file request message of the Java Applet (see s403), the control portion 112 advances from the step S702 to a step S705.

In the step S705, it receives class files requested in the class file request message from the HDD control portion 113, and successively sends them to the client terminal 2 requesting them (communication portion 302) (corresponding to a program transmitting portion). Thereafter, the control portion 112, in a step S710, changes its own information recorded in the control portion management table from "busy" to "idle", and returns to the step S701.

When the message received from the control portion 112 is a file list request from the Java Applet 133 or the another copy system 1' (see S508, S712), the control portion 112 advances from the step S702 to a step S711.

In the step S711, the control portion 112 checks if the bus name designated by the file list request contains the drive name of the self system. When it contains the drive name of the self system, the control portion 112, in a step S712, links to the request-originating copy system 1 (secondary copy system) indicated by the bus name, and transfers a file list request packet to it. The control portion 112, in the next step S713, waits for a response of the file information to the file list request packet transferred in the step S712, and when receiving a response, it advances to a step S715.

When the bus name designated by the file list request contains the drive name of the self system, the control portion 112, in a step S714, reads out file information of the file information indicated by the bus name, and advances to a step S715.

In the step S715, the control portion 112, in a step S714, sends the file information read out b the control portion per se in the step S714 to the Java Applet 133 which originates a file list request or the primary copy system 1 (corresponding to the management information responding portion) or it sends the file information that is received from the secondary copy system 1' in the step S713, to the Java Applet 133 from which a file list request originates (corresponding to the management information responding portion). Thereafter, the control portion 112 changes its own information recorded in the control management table from "busy" to "idle", and returns to the step S701.

When the message received from the control portion 112 is a file down load request (see S511, S526, S531, S717) from the Java Applet 133 or another copy system 1', the control portion 112 advances from the step S702 to a step S716.

In the step S716, the control portion 112 checks the path name designated by the file down load request (path name designated as a copy originator in the case of the file down load request sent in the step S531) contains the drive name of the self system. When it does not contain the drive name of the self system, the control portion 112, in a step S717, links to a request originating copy system (secondary copy system) 1' indicated by the path name, and sends a file down load request packet to it. The control portion 112 waits for a response of the image file to the file down load request packet transferred in the step S717, and when receiving a response, it advances to a step S727.

When the path name designated by the file down load request contains the drive name of the self system, the control portion 112, in a step S719, checks if a file type designated by the file down load request is JPEG thumbnail file or an image file containing all data items. When the JPEG thumbnail file is designated (see S515, S526, S717), it advances to a step S720.

In the step S720, the control portion 112 checks if the file down load request contains a page number designation. When it does not contain the page number designation (see S515, S717), the control portion 112, in a step S721, reads out a JPEG file or a TIFF file corresponding to the file name designated by the file down load request from the hard disc 13, and takes the JPEG file data from the "JPEG thumbnail area" 62, 72 for the first page, and stores those into the JPEG file (JPEG thumbnail file) (rough image JPEG file). Upon completion of the S721 execution, the control portion 112 advances to a step S727.

When the file down load request contains the page number designation (see S526, S717), the control portion 112, in a step S722, reads a JPEG file or a TIFF file corresponding to the file name designated by the full down load request, takes JPEG thumbnail data from the "JPEG thumbnail areas" 62, 72 for the page of the designated page number, and stores it into the JPEG file (JPEG thumbnail file) (rough image JPEG file). Upon completion of the S722 execution, the control portion 112 advances to a step S727.

When a file type designated by the file down load request is an image file containing all data pieces (see S531, S717), the control portion 112 advances from the step S719 to step S723. In the step S723, it reads out a JPEG file or TIFF file corresponding to the path name or file name designated as a copy originator in the file down load request, from the hard disc 13.

In the next step S724, the control portion 112 checks if the image file read out in the step S723 is a JPEG file or a TIFF file. When it is a TIFF file, it advances to a step S727. When it is a JPEG file, the control portion 112, in step S725, checks if it is a JPEG multi-page file (see FIG. 38) or a JPEG single page file (see FIG. 37). When it is the JPEG single page file, the control portion 112 advances to a step S727. When it is the JPEG multi-page file, the control portion 112 advances to a step S112.

In the step S726, the control portion 112 decomposes the JPEG multi-page file read out in the step S723 into a plurality of JPEG files consisting of "total JPEG data areas" 60-1 to X for the individual pages. Upon completion of the S726 execution, the control portion 112 advances to a step S727.

In the step S727, the control portion 112 sends a JPEG file storing the JPEG thumbnail data extracted in the step S721 or S722, a JPEG file or a TIFF file read out in the step S723, or a plurality of JPEG files decomposed in the step S726 to the Java Applet 133 or the primary copy system 1' (corresponding to image file sending portion, rough image JPEG file reponding portion). Or it sends a JPEG file or a TIFF file that is received from the secondary copy system 1' in the step S718 to the Java Applet 133 from which the file down load request originates (corresponding to the rough image JPEG file responding portion). Thereafter, the control portion 112, in a step S710, changes its own information recorded in the control portion management table from "busy" to "idle", and then returns to the step S701.

When a message received from the control portion 112 is a file copy request (see S535, S739) from the Java Applet 133 or another copy system 1, the control portion 112 advances from the step S702 to a step S728.

In the step S728, the control portion 112 checks if the copy originating path name or the copy terminating path name designated by the file copy request contains the drive name of the self system. When the copy originating path name or the copy terminating path name contains the drive name of the self system, the control portion 112, in a step S729, reads out a copy originating file (JPEG file or TIFF file) specified by the copy originating path name or file name designated by the file copy request, and writes it into a directory in the hard disc 13 that is specified by the copy terminating path name. In the next step S730, the control portion 112 sends a response that the copy is normally accepted to the Java Applet 133 only when it is directly requested by the Java Applet 133.

When the copy originating path name or copy terminating path designated by the file copy request contains a drive in another system, the control portion 112 advances to a step S731. In the step S731, the control portion 112 checks if the copy originating path name designated by the file copy request contains the drive name of the self system, and the copy terminating path name contains the drive name of another system. When the copy originating path name contains the drive name of the self system, and the copy terminating path name contains the drive name of another system, the control portion 112, in a step S732, links to the copy terminating system (secondary copy system) 1', and reads out a copy originating file (JPEG file or TIFF file) specified by the copy originating path name or file name designated by the file copy request from the hard disc 13, and designates a copy terminating path and sends it to the terminating system. In the next step S S733, the control portion 112 sends a response that the copy is normally accepted tot he Java Applet 133 only when it is directly requested by the Java Applet 133.

When the copy originating path name designated by the file copy request contains the drive name of another system, the control portion 112 advances to a step S734. In the step S734, the control portion 112 checks if the copy originating path name designated by the file copy request contains the drive name of the another system, and the copy originating path name contains the drive name of the self system. When the copy originating path name contains the drive name of the another system, and the copy originating path name contains the drive name of the self system, the control portion 112, in a step S735, links to the copy originating system (secondary copy system ) 1', and sends to it a file transfer request packet designating the copy originating file name and the copy terminating path name. In the next step S736, the control portion 112 sends a response that the copy is normally accepted to the Java Applet 133. In the next step S737, the control portion 112 waits till the copy originating system responds to the file transfer request file sent in the step S736, and sends the image file (JPEG file or TIFF file) to the control portion. When the response of the image file (see S708), the control portion 112, in the next step S738, writes the received image file data into a directory corresponding to the copy terminating path name designated by the file copy request.

When the copy terminating path name designated by the file copy request contains the drive name in another system, the control portion 112 advances to step S739. In this step, the control portion 112 links to the copy originating system (secondary copy system) 1', and send a file copy request packet to it. In the next step S740, the control portion 112 sends a response that the copy is normally accepted to the HDD control portion 113.

When any of S730, S733, S738, and S740 ends, the control portion 112, in step S710, changes the information recorded in the control management table from "busy" to "idle", and returns to the step S701.

When the message received from the control portion 112 is an image file sent by another copy system 1', the control portion 112 advances from the step S702 to a step S706.

In the step S706, the control portion 112 writes the received image file data into a directory corresponding to the copy terminating path designated. In the next step S707, the control portion 112 checks if the image file data reception ends. If not yet, it returns to the step S706, and when the data reception ends, it changes its own information recorded in the control portion management table from "busy" to "idle" in a step S710, and returns to the step S701.

When the message received from the control portion 112 is a file transfer request (see S735) from another copy system 1', the control portion 112 advances from the step S702 to step S708.

In the step S708, the control portion 112 reads out a copying originating path name designated by a file transfer request and a copy originating file (JPEG file or TIFF file) specified by the file name, and sends them to the copy terminating system (primary copy system) from which the request originates. In the next step S709, the control portion 112 checks if the entire file data transmission ends. When not yet, it returns to the step S708, and when the entire data transmission ends, it changes, in a step S701, its own information recorded in the control portion management table from "busy" to "idle", and returns to the step S701.

When the message received from the control portion 112 is a copy status check from the Java Applet 133 or another copy system 1' (see S538, S744), the control portion 112 advances from the step S702 to a step S741.

In the step S741, the control portion 112 checks if the copy originating path name designated in the copy status check and the copy terminating path name contain both the drive name of the self system. When the copy originating path name and the copy terminating path name contain both the drive name of the self system, the control portion 112, in a step S742, checks a progress of the copying operation on the basis of a process number, copy originating path name and its file name, and a copy terminating path name, which are designated in the copy status check. And it returns its process progress (%) to the Java Applet 133.

When either of the copy originating path name designated in the file copy status check and the copy terminating path name contains the drive name of another copy system, the control portion 112 advances to a step S743. In a step S743, the control portion 112 checks whether a request originator of the copy status check is the Java Applet 133 or another copy system 1'. When it is the Java Applet 133, the control portion 112, in a step S744, sends an additional copy status check to the another copy system 1' as the copy terminator or copy originator. In the next step S745, the control portion 112 waits for a response (see S747) from the another copy system 1' which receives a copy status check packet sent in the step S744. When a response is received, the control portion 112 advances to a step S746.

In the step S746, the control portion 112 checks a copy operation progress in the self system and a copy status (process progress) responded from the another copy system in the step S745, on the basis of the process number, copy originating path name and its file name, and a copy terminating path name, which are designated in the copy status check, and returns its process progress (%) to the Java Applet 133.

When the request originator of the copy status check is another copy system (primary copy system) 1', the control portion 112, in a step S747, checks a copy operation progress on the basis of the process number, copy originator path name and its file name, and copy terminator path name, which are designated in the copy status check, and sends its process progress (%) to the primary copy system 1' as the request originator.

When any of S742, S746, and S747 ends, the control portion 112, in the step S710, changes its own information recorded in the control portion management table from "busy" to "idle", and returns to the step S701.

When the message received from the control portion 112 is a file retrieval request from the Java Applet 133 or another copy system 1' (see S544, S752), the control portion 112 advances from the step S702 to a step S748.

In the step S748, the control portion 112 checks if a retrieval range designated in the file retrieval request is that of the self system or another system. When it is that of another system, the control portion 112, in a step S749, links to another system (secondary copy system), and sends a file retrieval request packet to it. The control portion 112, in the next step S750, waits for a response of the retrieval result (see S751) to the file retrieval request packet sent in the step S749, and when receiving a response, it advances to a step S751.

When the retrieval range designated in the file retrieval request is that of the self system, the control portion 112, in a step S752, executes a file retrieval in the hard disc 13 of the self system in accordance with the retrieval range designated in the file retrieval request and the file name or directory name of an object to be retrieved. After the step S752 is executed, the control portion 112 advances to a step S751.

In the step S751, the control portion 112 sends the retrieval result acquired by the file retrieval in the step S752 to the Java Applet 133 as the file retrieval request originator or the primary copy system 1. Or it sends the file retrieval result that is received from the secondary copy system 1' in the step S70 to the Java Applet 133 as the file retrieval request originator. Thereafter, the control portion 112, instep S710, changes its own information recorded in the control portion management table from "busy" to "idle", and returns to a step S701.

When the message received from the control portion 112 is a file delete request from the HDD control portion 113 or the another copy system 1' (see S550, S754), the control portion 112 advances from the step S702 to a step S753.

In the step S753, the control portion 112 checks if the path name of the deleted file or directory designated in the file delete request contains the drive name of the self system. When it contains the drive name of another system, the control portion 112, in a step S754, links to another system (secondary copy system), and transfers a file delete request packet to it. The control portion 112, in the next step S755, waits for a response of the delete result to the file delete request packet transferred in the step S754 (see S756), and when receiving a response, it advances to a step S756.

When the path name of the deleted file or directory designated in the file delete request contains the drive name of the self system, the control portion 112, in a step S757, deletes the deleted file or the directory in accordance with the file name of the path name and the deleted file or the directory designated in the file delete request. After executing the step S757, the control portion 112 advances to a step S756.

In the step S756, the control portion 112 sends the result of the deletion in the step S757 (including information of a free disc space in which the deleted file or directory and a total disc space or space) to the Java Applet 133 of the file delete request or the primary copy system 1. Or it sends, in a step S755, the file deletion result received from the secondary copy system 1' to the Java Applet 133 as the file deletion request originator. Thereafter, the control portion 112, in a step S710, changes its won information recorded in the control portion management table from "busy" to "idle", and returns to a step S701.

When the message received from the control portion 112 is a file name request from the Java Applet 133 or the secondary copy system 1', the control portion 112 advances from the step S702 to a step S758.

In the step S758, the control portion 112 checks the path name of the renamed file or directory designated in the file name request contains the drive name of the self system or another system. When the path name contains the drive name of another system, the control portion 112, in a step S759, links to another system (secondary copy system), and sends a file rename request packet to it. The control portion 112, in the next step S760, waits for a response of the result of renaming for the file rename request packet transferred in the step S759 (see S761), and when receiving the response, it advances to a step S761.

When the path name of the renamed file or directory designated in the file rename request contains the drive name of the self system, the control portion 112, in the step S762, specifies the path name and file or directory name of the renamed file designated in the file rename request, in accordance with the path name and the file or directory name of the renamed file designated in the file rename request. And it changes their names to new names designated in the file rename request. After the step S762, the control portion 112 advances to a step S761.

In the step S761, the control portion 112 sends the renaming result (the renaming normally ends) (S762) to the Java Applet 133 or the copy system 1 as the file rename request originator. Or it sends the file renaming result received from the secondary copy system 1' in the step S760 to the Java Applet 133 as the file name request originator. Subsequently, the control portion 112, in a step S710, changes its own information recorded in the control portion management table from "busy" to "idle", and returns to a step S701.

III. Operations

Exemplar operations of the network copy file management system thus arranged will be described in detail. In the description to follow, it is assumed that a first copy system 1 is located near a client terminal 2 operated by an operator, and a second copy system 1'. The operator will set an original document on the scanner 20 of the first copy system 1, and operate the touch panel 18 and the keyboard 23. Further, it is assumed that the first copy system 1 serves as a "primary copy system" and the second copy system 1 serves as a "secondary copy system".

(1) Storing of the Image File in a Scan Mode

To begin with, an operation of the network copy file management system when the first copy system 1 is placed to a scan mode, and image information on the original is read, will first be described with reference to a time chart shown in FIG. 46. In this case, before operation, the operator depresses the scan mode button 53 displayed on the touch panel 18, and sets various parameters on the scan mode basic operation user interface (FIG. 36), and sets an original document on the flat bed or the ADF of the scanner 20.

After the above preparatory operation, the operator depresses the start key of the keyboard 23. Then, the operation panel portion 118 sends a key information message containing those parameters and key depression to the management portion 114 (S006). Upon receipt of the key information message, the management portion 114 holds those parameters contained in the key information message and sends a scanner operation check request message to the scanner portion 115 (S114). Upon receipt of the scanner operation check request message, the scanner portion 115 responsively sends the scanner 20 being busy or idle to the management portion 114 (S203). The management portion 114, after receiving the response, operates: When the response is a busy status, it sends a display select message in which a display number for busy display to the operation panel portion 118, when the response is an idle status, sends a display number for scan progress to the same (S122, S124). The operation panel portion 118, after receiving the display select message, carries out a display process according to the display number (S008).

When the response from the SCSI interface 15 is an idle status, the management portion 114 sends a "scan and HDD storage request message" attached with various parameters contained in the key information message to the HDD control portion 113 (S123). After receiving the "scan and HDD storage request message" from the management portion 114, the HDD control portion 113 sends a scan request message attached with the parameters that are attached to the "scan and HDD storage request message" to the scanner portion 115 (S303). In turn, the scanner portion 115 instructs the scanner 20 to scan original documents that are located on the flat bed or the ADF of the scanner 20 page by page in accordance with those parameters attached to the scan request message (S211).

The scanner portion 115 sends scan data to the HDD control portion 113 every time it receives scan data of a predetermined number of lines from the scanner 20 (S213). When the sending of the scan data of the final line of pages ends, the scanner portion 115 sends a scan end message to the HDD control portion 113 (S217, S218). When no page is left, the HDD control portion 113 which sends a process end message to the management portion 114 (S219) forms a JPEG file or a TIFF file in accordance with the file parameters contained in the "scan and HDD storage request message". When original documents of a plural number of pages are set in either image file, image data (JPEG data or 24-bit RGB data) is formed every page by use of the scan data received from the scanner portion 115, and stored into the image file. Further, it forms JPEG thumbnail data which is compressed reducing the resolution of the scan data, and stores into the image file. When the image file is formed in this way, the HDD control portion 113 sends a process end message to the management portion 114 (S363, S374).

When receiving a process end message from both the scanner portion 115 and the HDD control portion 113, the management portion 114 sends a display select message in which a display number for displaying the ordinary scan mode basic operation user interface to the operation panel portion 118 (S105). Upon receipt of the display select message, the operation panel portion 118 displays the original scan mode basic operation user interface on the screen of the LCD 19 (S008).

(2) File Operation from the Client Terminal

Next, a file operation to the primary copy system 1 from the web browser 301 on the client terminal will be described. In this case, the operator actuates the web browser 301 on the client terminal 2, and inputs a URL of "WebExplore" of the primary copy system 1 on the web browser 301, and sends it through the communication portion 302 to the network NW (S401). In turn, the network reception portion 111 which is executed in the copy server 10 of the primary copy system 1 receives the URL, and transfers it to any of the control portions 112 which is managed as an idle one in the control portion management table (S601 to S604).

In turn, the control portion 112 dynamically forms hypertext "WebExplore.html" containing information of the P addresses and names another copy system and another client terminal 2 which are registered as a terminating station of the image file in the self system 1, class file names of the Java Applet, and the like (S704).

Upon receipt of the hypertext "WebExplor.html", the web browser 301 sends to the copy server 10 a request of sending the class files of the Java Applet in which the Applet class file names are described in the hypertext "WebExplore.html" (s403). Upon receipt of the request, the network reception portion 111 transfers the request to any of the control portions 112 being in a standby state (S601, S604). Upon receipt of the class file request, the control portion 112 successively reads out the requested class files from the hard disc 13 in accordance with the Applet class file names, and transfers them to the web browser 301 of the client terminal 2 (S705).

When all the class files necessary for the activation are arranged on the RAM 32 of the client terminal 2 in this way, the web browser 301 activates the Java Applet 133 (S405). The Java Applet 133 is displayed on a specified area on the display screen by the web browser 301, and displays an initial dialog box 80 shown in FIG. 42.

(A) File List Display

An operation of the network copy file management system when any of the directory names is selected under the display of the initial dialog box (S505), and the directory name is clicked, will be described.

When the directory name of the primary copy system 1 is clicked, and in this state, the primary copy system 1 or the directory name of its lower layer displayed in the initial dialog box 80 is clicked by the operator, the Java Applet 133, as shown in FIG. 47, sends to the primary copy system 1 a file list request packet which designates a path name corresponding to the clicked directory name (S508). Upon receipt of the file list request packet, the input/output control unit 12 reads out file information (subdirectory names, and file names, file size, time stamp, file attributes and the number of pages of image files) in the directory corresponding to the path name designated in the file list request packet, from the hard disc 13 (S714), and responsively sends the file information to the Java Applet 133 (s715). The Java Applet 133, upon receipt of the file information, displays subdirectory names, which are based on the received file information, in a tree fashion in the lower layer of the directory name clicked by the operator in the left window 85 (S510). At the same time, the HDD control portion 113, as shown in FIG. 44, displays a list of received file information (file list display) in the right window 86 of the initial dialog box 80 (S512).

When the directory name of the primary copy system 1 is clicked and in this state, a secondary copy system 1' or the directory names under it displayed in the left window 85 of the initial dialog box 80, the Java Applet 133, as shown in FIG. 48, sends a file list request packet designating the path name corresponding to the clicked directory name to the primary copy system 1 (S508).

The control portion 112 which received the file list request packet sends a file list request packet corresponding to the path name designated in the file list request packet to the secondary copy system 1' (S712).

The control portion 112 of the secondary copy system 1', which receives the file list request packet, reads out of the hard disc 13 file information (subdirectory names, and fine names, file size, time stamps and attributes and the number of pages of the image files) of the directory corresponding to the path name designated in the file list request packet (S714), and responsively sends the file information to the primary copy system 1 of the request originator (S715).

The control portion 112 of the primary copy system 1, which receives the file information, responsively sends the received file information to the Java Applet 133 of the request originator (S715). The Java Applet which receives the file information displays a tree structure of subdirectory names on the basis of the received file information in the lower layer of the directory name clicked by the operator in the left window 85 of the initial dialog box (s510). At the same time, the HDD control portion 113, as shown in FIG. 44, displays a list of the received file information in the right window 86 of the initial dialog box (S512).

(B) Thumbnail Display

An operation of the network copy file management system when the thumbnail display is selected (S505) and a directory name is clicked in a state that the initial dialog box is displayed, will be described.

When the directory name in the primary copy system 1 is clicked, and in this state, the operator clicks the primary copy system 1 displayed in the left window 85 of the initial dialog box 80 and the directory names in the lower layers, the file information, as shown in FIG. 49, is responsively applied to the Java Applet 133 as in the case of the file list display, and is displayed in a tree structure in the left window 85 of the initial dialog box 80 (S508, S714, S715, S509, S510).

Subsequently, the Java Applet 133 sets a display type parameter as a thumbnail on the first file name contained in the received file information, and sends a file down load request packet in which a path name and a file name are set to the primary copy system 1 (S515). The control portion 112 which receives the file down load request packet reads out an image file corresponding to the path name and file name designated in the file down load request packet from the hard disc 13, and extracts JPEG thumbnail data of the first page from the image file, and sends the JPEG thumbnail data of the first page in the image file to the Java Applet 133 of the request originator (S721, S727). When a plurality of file names are contained in the file information, the file down load request packet transmission (S515) and the JPEG thumbnail file transmission (S727), which are described above, are repeated on the fist file names to a given number of file names (equal to the number of display thumbnails set in advance by the operator).

When receiving the JPEG thumbnails on a predetermined number or all of the file names in the file information, the Java Applet 133, as shown in FIG. 45, displays the thumbnails on the basis of the JPEG thumbnail files already received, in the right window 86 of the initial dialog box 80.

When the directory name in the secondary copy system 1', and in this state, the operator clicks a secondary copy system 1' and a directory name in the lower layer thereof, displayed in the left window 85 of the initial dialog box 80, the file information, as shown in FIG. 50, is responsively sent to the Java Applet 133 as in the case of the file list display, and a tree structure is displayed in the left window 85 of the initial dialog box 80 (S508, S712, S714, S715, S509, S510)

Subsequently, the Java Applet 133 sets the display type parameter as a thumbnail on the fist file name of those contained in the file information received and sends a file down load request packet in which the path name and its file name are set to the primary copy system 1 (S515).

The control portion 112 which receives the file down load request packet sends a file down load request packet to the secondary copy system 1' corresponding to the path name designated in the file down load request packet (S717).

The secondary copy system 1', which receives this down load request packet, reads out from the hard disc 13 an image file corresponding to the path name and file name designated in the file down load request packet, extracts the first, true JPEG thumbnail data from the image file, and sends the JPEG thumbnail file storing the JPEG thumbnail data to the primary copy system 1 of the request originator (S721, S727).

The control portion 112 of the primary copy system 1, which receives the JPEG thumbnail file, sends the received thumbnail file to the Java Applet 133 of the request originator (S727).

When a plurality of file names is contained in the file information, the file down load request packet transmission and transfer (S515, S717), and the JPEG thumbnail file transmission (S727) which are described above, are repeated on the fist file names to a given number of file names (equal to the number of display thumbnails set in advance by the operator).

When receiving the JPEG thumbnail files on a predetermined number of or all of the file names in the file information, the Java Applet 133, as shown in FIG. 45, displays the thumbnails on the basis of the respective thumbnail files received and saved in the right window 86 of the initial dialog box 80.

(C) File Copy

An operation of the network copy file management system when a file list display or a thumbnail display is performed, and in this state, any of the file names is drugged and dropped onto a directory name, will be described.

When the directory of the dragged file name is in the primary copy system 1 and the dropped directory is my computer or the directory in its lower layer, the Java Applet 133, as shown in FIG. 51, sets the dragged file name and its path name as a copy originator, and sends a file down load request packet in which the path name corresponding to the dropped directory in the self client terminal 2 is set as a copy terminator to the primary copy system 1 (S531).

The control portion 112 of the primary copy system 1 which receives the file down load request packet reads out the path name and file name designated as a copy originator in the file down load request packet from the hard disc 13 (S723), and sends it to the Java Applet 133 (S727).

The Java Applet 133 which receives the image file writes the received image file into a directory corresponding to the path name designated as the copy terminator in the hard disc 38 (S533).

Figure 52:
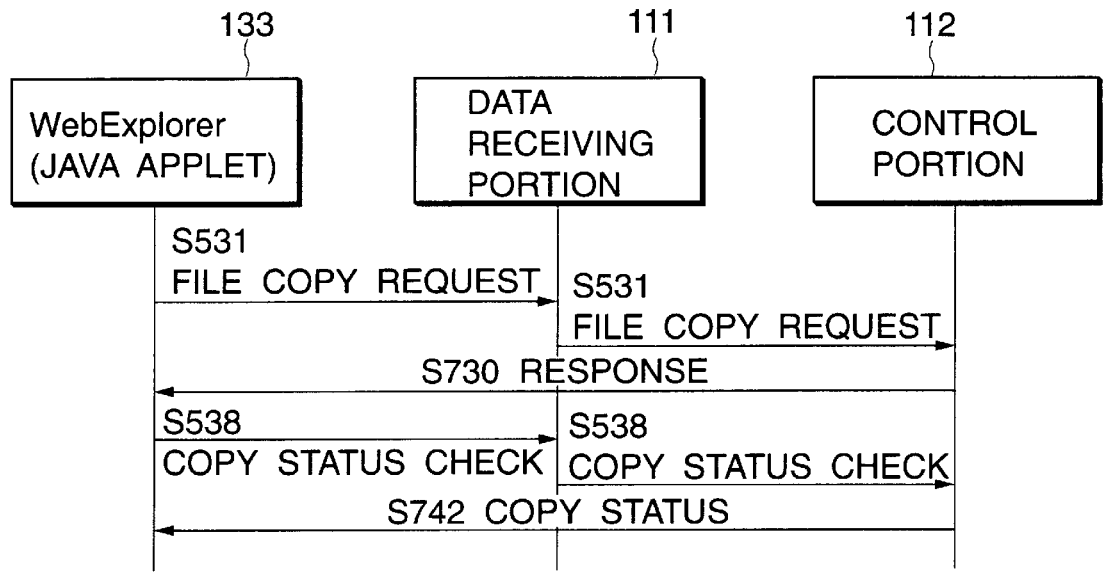
FIG. 52 is time chart showing a message transmission when an image file is copied in the primary copy system.

When the directory of the dragged file name is in the primary copy system 1 and the dropped directory is in the primary copy system 1, the Java Applet 133, as shown in FIG. 52, sets the dragged file name and its path name as a copy originator, and sends a file down request packet in which the path name corresponding to the dropped directory in the primary copy system 1 as a copy terminator to the primary copy system 1 (S531).

The control portion 112 of the primary copy system 1 which receives the file down load request packet reads out from the hard disc 13 an image file corresponding to the path name and file name designated as the copy originator in the file down load request packet, and writes them into a directory corresponding to the path name designated as the copy terminator in the hard disc 13 (S729). At the same time, the control portion 112 responsively sends a message that the copy is accepted to the Java Applet 133 (S730).

The Java Applet 133 which receives the message sends a copy status check packet in which the file name and path name of the copy originator and the path name of the copy terminator to the primary copy system 1 (S538).

The control portion 112 which receives the copy status check packet returns a copy progress status (error or progress information) to the hard disc 13 of the request originator (S742).

The Java Applet 133 which receives the copy progress status performs an error display (S542), an in-progress display (540) or an end display (S541) in accordance with the copy progress status.

Figure 53:
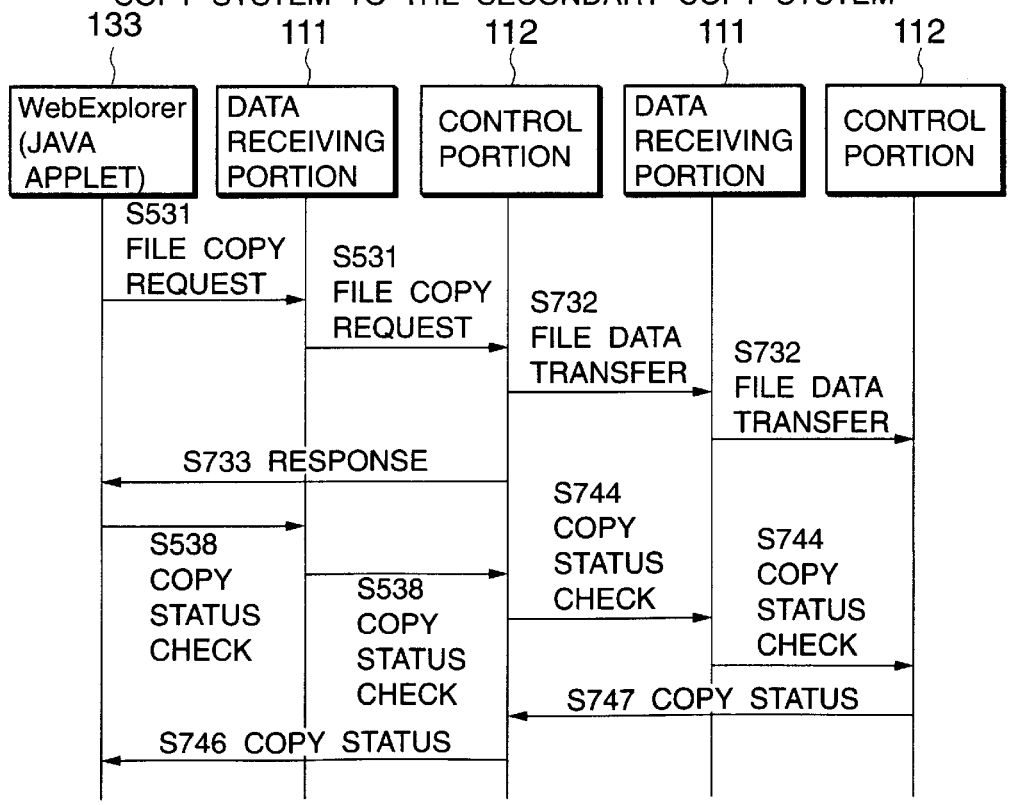
FIG. 53 is a time chart showing a message transmission when an image file is copied from the primary copy system to the secondary copy system.

When the directory of the dragged file name is in the primary copy system 1 and the dropped directory is in the secondary copy system 1', the Java Applet 133, as shown in FIG. 53, sends to the primary copy system 1 a file down load request packet in which the dragged file name and its path name are set as a copy originator, and the path name corresponding to the dripped directory in the secondary copy system 1' is set as a copy terminator (S531).

The control portion 112 of the primary copy system 1 which receives the file down load request packet reads out an image file corresponding to the path name and file name designated as a copy originator in the file down load request packet from the hard disc 13, and sends the image file attached with the copy originator path name to the secondary copy system 1' corresponding to the copy originator path name (S732).

The control portion 112 of the secondary copy system 1' which receives the transmission file writes the received image file into a directory corresponding to the path name designated as the copy originator in the hard disc 13 (S706).

At the same time, the control portion 112 of the primary copy system 1 responsively sends a message that the copy is accepted to the Java Applet 133 (S733).

The Java Applet 133 which receives this message sends a copy status check packet in which the file name and path name are set for the copy originator and the path name is set for the copy terminator to the primary copy system 1 (S538).

The control portion 112 of the primary copy system 1 which receives this copy status check packet sends a copy status check packet to the secondary copy system 1' corresponding to the path name designated as the copy terminator (S744).

The control portion 112 of the secondary copy system 1' which receives the copy status check packet returns a copy progress status (error or progress information) to the primary copy system 1 of the request originator (S747).

The control portion 112 of the primary copy system 1 which receives the copy progress status determines a total copy progress status (error or progress information) on the basis of the received copy progress status of the secondary copy system 1' and the copy progress status in the self system, and returns the copy progress status to the Java Applet 133 (S746). The Java Applet 133 that receives the copy progress status carries out an error display (S542), a progress display (S540), or an end display (S541).

(D) File Retrieval

Next, an operation of the network copy file management system when a retrieved file name or directory name and a retrieval range are input into a retrieval dialog (not shown) under the file list display and thumbnail display, will be described.

When the input retrieval range is in the primary copy system 1, the Java Applet 133, as shown in FIG. 54, sends to the primary copy system 1 a file retrieval request packet in which the input retrieval range and retrieved file name or directory name in the primary copy system 1 are set (S544).

The control portion 112 of the primary copy system 1 which receives the file retrieval request packet retrieves a directory having a file having a retrieved file name designated in the file retrieval request packet and a directory having a retrieved directory name designated in a retrieval range designated in the file retrieval request packet (S752). And it responsively sends the retrieval result to the Java Applet 133 (S751).

The Java Applet 133 which receives the retrieval result displays the retrieval result (S547).

When the input retrieval is in the secondary copy system 1', the Java Applet 133, as shown in FIG. 55, sends a file retrieval request packet in which the input retrieval range in the secondary copy system 1' and the retrieved file or directory name are set to the primary copy system 1 (S544).

The control portion 112 that receives the file retrieval request packet transfers the file retrieval request packet to the secondary copy system 1' (S749).

The control portion 112 of the secondary copy system 1' which receives the file retrieval request packet retrieves a file of a retrieved file name designated within a retrieval range designated in the file retrieval request packet or a directory having a retrieved directory name designated within the same range (S752). And it responsively sends the retrieval result tot he primary copy system 1 of the request originator (S751).

The control portion 112 of the primary copy system 1 which receives the retrieval result sends the retrieval result to the Java Applet 133 (S751).

The Java Applet 133 which receives the retrieval result displays the received retrieval result (S547).

(E) File Delete

An operation of the network copy file management system when the file list and the thumbnail are displayed and in this state, a file name or a thumbnail is clicked and then "delete" of the "file" is clicked in the tool bar 83 or the delete button 83d is clicked, will now be described.

When the clicked deleted file or directory exits in the primary copy system 1, the Java Applet 133, a shown in FIG. 56, sends a file delete request packet in which the clicked deleted file name or directory name, and its path name are set to the primary copy system 1 (S550).

The control portion 112 of the primary copy system 1 which receives the file delete request packet deletes from the hard disc 13 a deleted file corresponding to the path name and deleted file name designated by the file delete request packet or the deleted file corresponding to the deleted directory name (S757). And it responsively sends the deleted result (including information of a free disk space that may be used by the directory specified by the path name) to the Java Applet 133 (S756).

The Java Applet 133 that receives the delete result displays a free disc space in the delete result received on the status bar 84 (S554).

When the clicked deleted file or directory exists within the secondary copy system 1', the Java Applet 133, as shown in FIG. 57, sends a file delete request packet in which the clicked deleted file name or directory name and its path name are set to the primary copy system 1 (S550).

The control portion 112 of the primary copy system 1 which receives the file delete request packet sends a file delete request packet to the secondary copy system 1' (S754).

The control portion 112 of the secondary copy system 1' which receives the file delete request packet deletes from the hard disc 13 a deleted file corresponding to a path name designated by the file delete request packet and a deleted file name or directory (S757). And it sends the delete result (information including a free disc space that may be used by a directory specified by the path name and a total disc space) to the primary copy system 1 of the request originator (S756).

The control portion 112 of the primary copy system 1 that receives the delete result sends the delete result to the Java Applet 133 (S756).

The Java Applet 133 that receives the delete result displays a free disc space in the received delete result on the status bar 84 (S554).

(F) File Rename

An operation of the network copy file management system when a file name or a thumbnail is clicked under the file list display or thumbnail display, and then the delete button 83d is clicked, and a new file name or directory name is input, will be described.

Figure 58:
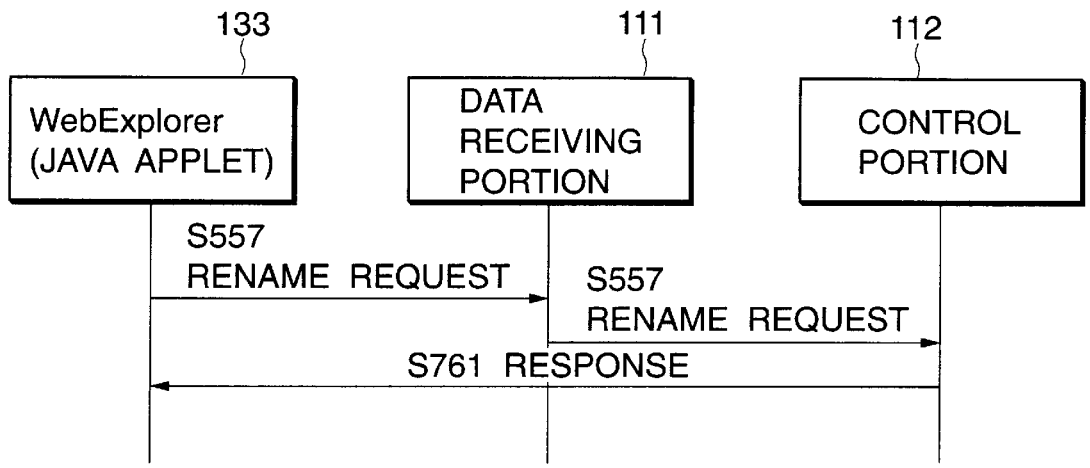
FIG. 58 is a time chart showing a message transmission at the time of renaming in the primary copy system.

When the clicked renamed file or directory is in the primary copy system 1, the Java Applet 133, as shown in FIG. 58, it sends to the primary copy system 1 a file rename request packet in which the clicked renamed file or directory name and its path name, and a new file or directory name are set (S557).

The control portion 112 of the primary copy system 1 which receives the file rename request packet changes the file or directory names corresponding to the path name and the renamed file or directory specified in the file rename request packet to new names designated by the file rename request packet in the hard disc 13 (S762). And it sends the renamed result to the Java Applet 133 (S761).

The Java Applet 133 that receives the rename result renews the names displayed on the renamed file or directory on the basis of the renaming result received (S561).

Figure 59:
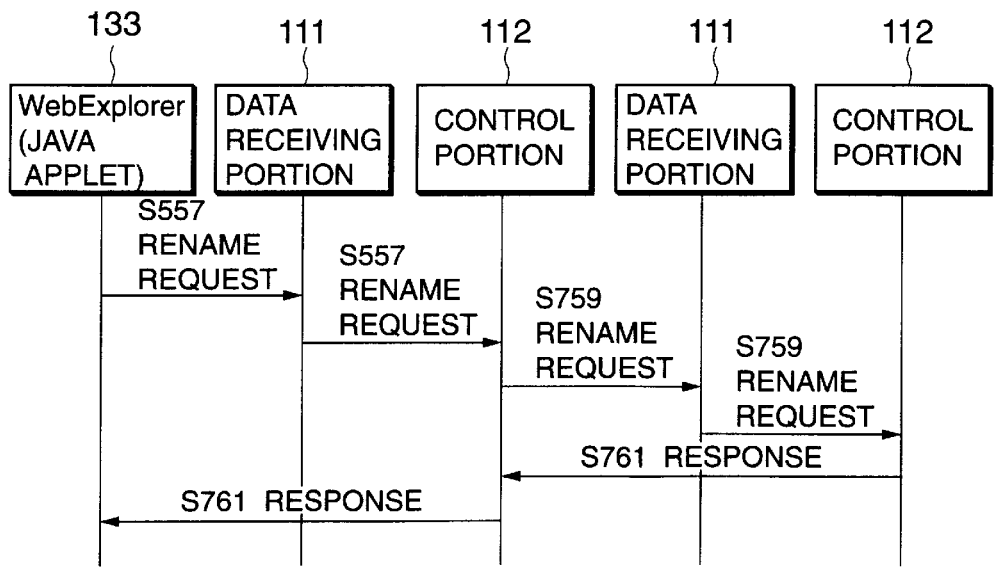
FIG. 59 is a time chart showing a message transmission at the time of renaming in the secondary copy system.

When the clicked renamed file or directory is in the secondary copy system 1', the Java Applet 133, as shown in FIG. 59, sends the file rename request packet in which the clicked renamed file or directory name and its path name, and the new file or directory name are set to the primary copy system 1 (S557).

The control portion 112 of the primary copy system 1 that receives the file rename request packet sends the file rename request packet to the primary copy system 1 (S759).

The control portion 112 of the secondary copy system 1' that receives the file rename request packet changes the path name specified by the file rename request packet and the file or directory name corresponding to the renamed file or directory name to new names designated by the file rename request packet, in the hard disc 13 (S762). And it responsively sends the renaming result to the primary copy system 1 (S761).

The control portion 112 of the primary copy system 1 that receives the renaming result is transferred to the Java Applet 133 (S761).

The Java Applet 133 that receives the renaming result renews the name displayed on the renamed file or directory (S561).

(3) Effects of the Embodiment

As described above, in the network copy file management system of the embodiment, the operator depresses the scan mode button 53 of the touch panel 18 of the copy server 10 and the start key of the keyboard 23. Data of image information of an original document located on the flat bed or the ADF of the scanner 20 is read. However, the image information is not immediately printed on a print sheet by the printer 21, but the image data is stored into an image file (JPEG or TIFF file), and stored into the hard disc 13. Then, the operator down loads the class files of the Java Applet 133 from the copy server 10, and the Java Applet 133 is executed. As a result, management information of image files (file names, file size, time stamps, file attributes, the number of pages of image data stored in the image files) and rough images of image data stored in the image files (thumbnails), which are stored in the hard disc 13 of the copy server 10, are selectively displayed on the display device 40 of the client terminal. Further, a specific image file per se stored in the hard disc 13 of the copy server 10 may be down loaded into the client terminal 2. Accordingly, the operator on the client terminal 2 may display an actual image by the image data stored in the image file, and visually check its state (density, resolution, arrangement, color tone, etc.).

As seen from the foregoing description, the image reading portion of the copy system reads image information on an original document to produce image data. The image data is stored in the form of image files into the disc of the copy system. In response to a request connected to the copy system through a computer network, management information of a plurality of image files within a requested range may be displayed on the display screen. When any of the thus displayed management information pieces is specified by the operator, the copy system is requested to down load the image file corresponding to the specified management information, and the requested image file may be down loaded into the client terminal. As a result, an image by the image data in the image file may be displayed on the display screen of the client terminal. Therefore, the operator can check a state of the image before it is printed on a print sheet by the printer.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A network copy file management system comprising a copy system and a terminal which are interconnected through a network, such that said copy system and said terminal are in direct communication with one another via said network, (A) said copy system comprising:
a scanner for reading information from an original as image data;
a printer for printing;
an operation panel which accepts a first execution command for a copy process to cause said printer to print the image data read out by said scanner;
a control unit for executing said copy process;
an image data converter which converts the image data read out by said scanner into an image file;
a storage portion for storing said image file, wherein said operation panel further accepts a second execution command for an image-file storing process, in accordance with which said control unit causes said image data converter to convert the image data into the image file, and then stores the image file into said storage portion;
a management information responding portion, wherein when said terminal requests management information for one or more image files within a predetermined range stored in said storage portion, said management information responding portion sends the requested management information for each image file within the predetermined range to said terminal, the management information including a plurality of data items associated with a particular image file; and
an image file transmitting portion, wherein when said terminal requests the image files corresponding to one or more of the data items of the management information transmitted to said terminal, said image file transmitting portion reads out said requested image files from said storage portion and sends said readout image files to said terminal; and (B) said terminal comprising:
a management information request portion for requesting said copy system to send the management information for image files within a predetermined range;
a display portion for displaying the data items of the management information that said copy system sends in response to the request;
an input portion which accepts selection data input by an operator, said selection data specifying the image files corresponding to the data items of the management information displayed on said display portion; and
an image file request portion for requesting the image files specified by the selection data accepted by said input portion from said copy system.

2. A copy system comprising:
a scanner for reading information from an original as image data;
a printer for printing;
an operation panel which accepts a first execution command for a copy process to cause said printer to print the image data read out by said scanner;
a control unit for executing said copy process;
a network control portion connected to a network, said network control portion in direct communication with a terminal via said network;
an image data converter which converts the image data read out by said scanner into an image file; and
a storage portion for storing said image file, wherein said operation panel further accepts a second execution command for an image-file storing process, in accordance with which said control unit causes said data converter to convert the image data into the image file, and then stores the image file into said storage portion;
a management information responding portion, wherein when said terminal requests management information for one or more image files within a predetermined range stored in said storage portion, said management information responding portion sends the requested management information for each image file within the predetermined range to said terminal, the management information including a plurality of data items associated with a particular image file; and
an image file transmitting portion, wherein when said terminal requests the image files corresponding to one or more of the data items of the management information transmitted to said terminal, said image file transmitting portion reads out said requested image files from said storage portion and sends said read out image files to said terminal.

3. A copy system according to claim 2, further comprising:
a computer readable medium storing a program for causing a computer included in said terminal to request said management information responding portion to send the management information for the image files within the predetermined range, to display the data items of the management information received from said management information responding portion in response to the request, and to request said image file transmitting portion to send the image files corresponding to the data items of the management information specified by an operator; and a program transmitting portion for transmitting said program stored in said computer readable medium to said terminal in response to a request from said terminal.

4. A copy system according to claim 3, wherein said program is a Java Applet, and wherein said computer readable medium stores hypertext data to be requested by a web browser executed by a processor of said terminal, said hypertext data containing a description to cause said web browser to request said program transmitting portion to download said program.

5. A copy system according to claim 2, wherein said image data converter converts the image data into an image file having a proprietary format, said image file transmitting portion which, in response to an image file transmission request, converts said image file into an image file having a general format, and then sends the converted image file.

6. A copy system according to claim 5, wherein said proprietary format is a JPEG file formed in a manner that the image data is JPEG compressed to generate fine image JPEG data, and rough image JPEG data is generated by reducing a resolution of the image data and then JPEG compressing the image data, and said fine image JPEG data and said rough image JPEG data are combined into one image data.

7. A copy system according to claim 5, wherein when the original includes a plurality of pages, said proprietary format is a JPEG file formed by combining fine and rough image JPEG data generated for each page into one image data.

8. A copy server comprising:

an image data input portion for inputting image data read by a scanner;

a print data output portion for outputting print data to a printer;

an operation panel connecting portion for accepting various execution commands;

a network control portion connected to a network, said network control portion in direct communication with a terminal through the network;

an image data converter which converts image data input through said image data input portion into an image file;

a storage portion for storing said image file;

a management information responding portion, wherein when said terminal requests management information for one or more image files within a predetermined range stored in said storage portion, said management information responding portion sends the requested management information for each image file within the predetermined range to said terminal, the management information including a plurality of data items associated with a particular image file;

an image file transmitting portion, wherein when said terminal requests the image files corresponding to one or more data items of the management information transmitted to said terminal, said image file transmitting portion reads out said requested image files from said storage portion and sends said readout image files to said terminal;

a computer readable medium storing a program for causing a computer included in said terminal to request said management information responding portion to send the management information for the image files within the predetermined range, to display the data items of the management information received from said management information responding portion in response to the request, and to request said image file transmitting portion to send the image files corresponding to the specified data items of the management information; and a program transmitting portion for transmitting said program stored in said computer readable medium to said terminal in response to a request from said terminal.

9. A copy server according to claim 8, wherein said program is a Java Applet, and wherein said computer readable medium stores hypertext data to be requested by a web browser executed by a processor of said terminal, said hypertext data containing a description to cause the web browser to request said program transmitting portion to down load said program.

10. A copy server according to claim 9, wherein said Java Applet running on said terminal receives incoming management information for the image files within the predetermined range and displays the data items of the management information on a display unit of said terminal.

11. A copy server according to claim 9, wherein said network control portion is in direct communication with a third network device via the network, said management information responding portion transmits said third network device information, said Java Applet running on said terminal requests said third network device to send second management information according to said third network device information, receives said second management information, and displays incoming combined management information, said combined management information including the management information for the image files in said terminal and the management information from said third network device.

12. A copy server according to claim 8, wherein said image data converter converts the image data into an image file having a proprietary format, said image file transmitting portion which, in response to an image file transmission request, converts said image file into an image file having a general format, and then sends the converted image file.

13. A copy server according to claim 12, wherein said proprietary format is a JPEG file formed in a manner that image data is JPEG compressed to generate fine image JPEG data, and rough image JPEG data is generated by reducing a resolution of the image data and then JPEG compressing the image data, and said fine image JPEG data and said rough image JPEG data are combined into one image data.

14. A copy server according to claim 12, wherein when the original includes a plurality of pages, said proprietary format is a JPEG file formed by combining fine and rough image JPEG data generated for each page into one image data.

15. A file server comprising:

an image data input portion for inputting image data;

a network control portion connected to a network, said network control portion in direct communication with a terminal through the network;

an image data converter which converts image data input through said image data input portion into an image file;

a storage portion for storing said image file;

a management information responding portion, wherein when said terminal requests management information for one or more image files within a predetermined range stored in said storage portion, said management information responding portion sends the requested management information for each image file within the predetermined range to said terminal, the management information including a plurality of data items associated with a particular image file;

an image data transmitting portion, wherein when said terminal requests said image data transmitting portion to send the image files corresponding to one or more data items of the management information transmitted to said terminal, said image data transmitting portion reads out the requested image files from said storage portion and send the read out image files to said terminal;

a computer readable medium storing (i) a Java Applet for causing a computer included in said terminal to request said management information responding portion to send the management information for the image files within the predetermined range, to display the data items of the management information received from said management information responding portion in response to the request and the data items of the management information for the image files in said terminal, and to request said image file transmitting portion to send the image files corresponding to specified management information when one or more of the data items of the management information being displayed is specified by an operator, and (ii) hypertext data to be requested by a web browser executed by said terminal, said hypertext data containing a description to cause said web browser to request said file server to download said Java Applet; and a program transmitting portion for sending said Java Applet stored in said computer readable medium to said terminal in response to the download request.

16. A computer readable medium storing:

(A) a program causing a first computer having an image data input portion for inputting image data, a network control portion connected to a network wherein said network control portion is in direct communication with a terminal via said network, and a storage portion for storing image files converted from image data input through said image data input portion, to store said image files into said storage portion, when said terminal requests management information for one or more image files within a predetermined range stored in said storage portion, to send the requested management information for each image file within the predetermined range to said terminal, and when said terminal requests the image files corresponding to one or more data items of the management information sent to said terminal, to read out said requested image files from said storage portion and to send the read out image files to said terminal;

(B) a Java Applet to cause the computer included in each terminal to request management information for the image files within the predetermined range, to display the data items of the management information received from said management information responding portion in response to the request and the data items of the management information for the image files in said terminal, and to request the first computer to send the image files corresponding to one or more of the displayed data items specified by the operator; and (C) hypertext data to be requested by a web browser executed by said terminal, said hypertext data containing a description to cause said web browser to request the first computer to download said Java Applet.

* * * * *